US012803735B2

(12) United States Patent
Agiwal et al.

(10) Patent No.: US 12,803,735 B2

(45) Date of Patent: Nov. 17, 2026

(54) APPARATUS AND METHOD OF BEAM RECOVERY ON SECONDARY CELL

(71) Applicant: Samsung Electronics Co., Ltd., Suwon-si (KR)

(72) Inventors: Anil Agiwal, Suwon-si (KR); Byounghoon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 18/627,777

(22) Filed: Apr. 5, 2024

(65) Prior Publication Data

US 2024/0251452 A1 Jul. 25, 2024

Related U.S. Application Data

(63) Continuation of application No. 16/960,213, filed as application No. PCT/KR2019/000220 on Jan. 7, 2019, now Pat. No. 11,956,827.

(60) Provisional application No. 62/613,977, filed on Jan. 5, 2018.

(51) Int. Cl.

| | |
|---|---|
| ***H04L 5/00*** | (2006.01) |
| ***H04B 7/06*** | (2006.01) |
| ***H04L 41/0668*** | (2022.01) |
| ***H04W 56/00*** | (2009.01) |
| ***H04W 72/23*** | (2023.01) |
| ***H04W 74/0833*** | (2024.01) |
| *H04W 74/0838* | (2024.01) |

(52) U.S. Cl.

CPC ....... *H04L 5/0048* (2013.01); *H04B 7/06964* (2023.05); *H04L 41/0668* (2013.01); *H04W 56/001* (2013.01); *H04W 72/23* (2023.01); *H04W 74/0833* (2013.01); *H04W 74/0838* (2024.01)

(58) Field of Classification Search

None

See application file for complete search history.

(56) References Cited

U.S. PATENT DOCUMENTS

| | | | |
|---|---|---|---|
| 10,334,554 | B2 | 6/2019 | Lee et al. |
| 10,855,359 | B2 | 12/2020 | Zhou et al. |
| 2013/0163543 | A1 | 6/2013 | Freda et al. |

(Continued)

FOREIGN PATENT DOCUMENTS

| | | |
|---|---|---|
| WO | 2015/137636 A2 | 9/2015 |

OTHER PUBLICATIONS

European Office Action dated Nov. 3, 2025, issued in European Patent Application No. 19736169.4.

(Continued)

*Primary Examiner* — Saumit Shah

(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for internet of things (IoT) are provided. The communication method and system includes intelligent services based on the 5G communication technology and the IoT-related technology, such as smart home, smart building, smart city, smart car, connected car, health care, digital education, smart retail, security and safety services. A system and a method of beam failure recovery on Secondary cell are provided.

20 Claims, 32 Drawing Sheets

(56) References Cited

U.S. PATENT DOCUMENTS

| | | | |
|---|---|---|---|
| 2013/0258972 | A1 | 10/2013 | Kim et al. |
| 2015/0156799 | A1 | 6/2015 | Hapsari et al. |
| 2015/0181479 | A1 | 6/2015 | Lin et al. |
| 2015/0236774 | A1 | 8/2015 | Son et al. |
| 2015/0263837 | A1 | 9/2015 | Patel et al. |
| 2015/0373720 | A1 | 12/2015 | Uchino et al. |
| 2016/0309498 | A1 | 10/2016 | Luo et al. |
| 2016/0316466 | A1 | 10/2016 | Liu et al. |
| 2016/0323835 | A1 | 11/2016 | Chen et al. |
| 2017/0078001 | A1 | 3/2017 | Kim et al. |
| 2017/0207843 | A1 | 7/2017 | Jung et al. |
| 2017/0311173 | A1 | 10/2017 | Zhou |
| 2017/0353912 | A1 | 12/2017 | Einhaus et al. |
| 2017/0353973 | A1 | 12/2017 | Dinan |
| 2018/0007731 | A1 | 1/2018 | Park et al. |
| 2018/0054792 | A1 | 2/2018 | Lee et al. |
| 2018/0219664 | A1 | 8/2018 | Guo et al. |
| 2018/0220458 | A1 | 8/2018 | Ouchi et al. |
| 2018/0227862 | A1 | 8/2018 | Liu et al. |
| 2018/0227899 | A1 | 8/2018 | Yu et al. |
| 2018/0235008 | A1 | 8/2018 | Park et al. |
| 2018/0279358 | A1 | 9/2018 | Babaei et al. |
| 2018/0324862 | A1 | 11/2018 | Mallick et al. |
| 2019/0037423 | A1 | 1/2019 | Yu et al. |
| 2019/0037498 | A1 | 1/2019 | Tseng et al. |
| 2019/0053294 | A1 | 2/2019 | Xia et al. |
| 2019/0075524 | A1 | 3/2019 | Zhou et al. |
| 2019/0089447 | A1 | 3/2019 | Sang et al. |
| 2019/0098520 | A1 | 3/2019 | Kim |
| 2019/0132778 | A1* | 5/2019 | Park ...................... H04W 16/28 |
| 2019/0149365 | A1 | 5/2019 | Chatterjee et al. |
| 2019/0166539 | A1* | 5/2019 | Chen ................. H04W 36/0088 |
| 2019/0166645 | A1 | 5/2019 | Sadiq et al. |
| 2019/0182870 | A1 | 6/2019 | Shih et al. |
| 2019/0190582 | A1 | 6/2019 | Guo et al. |
| 2019/0200248 | A1 | 6/2019 | Basu Mallick et al. |
| 2019/0207662 | A1 | 7/2019 | Zhou et al. |
| 2019/0208548 | A1 | 7/2019 | Shih et al. |
| 2019/0215048 | A1 | 7/2019 | Cirik et al. |
| 2019/0215706 | A1 | 7/2019 | Tsai |
| 2019/0230545 | A1 | 7/2019 | Liou et al. |
| 2019/0254013 | A1 | 8/2019 | Chang et al. |
| 2019/0274169 | A1 | 9/2019 | Tsai et al. |
| 2019/0327765 | A1 | 10/2019 | Mukherjee et al. |
| 2019/0349815 | A1 | 11/2019 | Tiirola et al. |
| 2020/0196327 | A1 | 6/2020 | Zhang et al. |
| 2020/0267797 | A1 | 8/2020 | Wei et al. |
| 2020/0314665 | A1 | 10/2020 | Cheng et al. |
| 2020/0374960 | A1 | 11/2020 | Deenoo et al. |
| 2021/0105813 | A1* | 4/2021 | Lee ..................... H04W 74/085 |

OTHER PUBLICATIONS

3rd Generation Partnership Project; Technical Specification Group Radio Access Network; NR; Medium Access Control (MAC) protocol specification (Release 15), 3GPP TS 38.321 V1.2.0 (Dec. 2017), Dec. 11, 2017.

Korean Office Action dated Jun. 5, 2024, issued in Korean Patent Application No. 10-2020-7022745.

European Office Action dated Sep. 27, 2024, issued in European Patent Application No. 19736169.4.

ETSI MCC, Report of 3GPP TSG RAN2#100 meeting, Reno, Nevada, USA, R2-1801701, 3GPP TSG-RAN WG2 meeting #101, Feb. 27, 2018.

Samsung (Rapporteur), List of open issues on NR MAC, R2-1804571, 3GPP TSG-RAN WG2 Meeting #101bis, Apr. 5, 2018.

Korean Notice of Allowance dated Feb. 21, 2025, issued in Korean Patent Application No. 10-2020-7022745.

3GPP TS 38.331 V15.0.0, '3GPP; TSG RAN; NR Radio Resource Control (RRC) protocol specification (Release 15)', Jan. 4, 2018, https://portal.3gpp.org/desktopmodules/Specifications/SpecificationDetails.aspx?specificationId=3197, See sections 5.3.5.3, 6.3.2.

ZTE Corporation et al., 'Discussion on the beam failure recovery impact on RAN2', R2-1713954, 3GPP TSG-RAN WG2 Meeting #100, Reno, USA, Nov. 24, 2017, http://www.3gpp.org/ftp/TSG_RAN/WG2_RL2/TSGR2_100/Docs/, See sections 1-2, 5.1.2.

ZTE, 'Consideration on the RLF and beam failure in NR', R2-1708118, 3GPP TSG-RAN WG2 Meeting #99, Berlin, Germany, Aug. 11, 2017, http://www.3gpp.org/ftp/TSG_RAN/WG2_RL2/TSGR2_99/Docs/, See section 2.2.

3GPP TS 38.213 V15.0.0, '3GPP; TSG RAN; NR; Physical layer procedures for control (Release 15)', Jan. 3, 2018, https://portal.3gpp.org/desktopmodules/Specifications/SpecificationDetails.aspx?specificationId=3215, See section 6.

Huawei et al., "RAN2 aspects of DL beam management", 3GPP Draft, R2-1710562, RAN2 Aspects of DL Beam Management, 3rd Generation Partnership Project (3GPP), vol. RAN WG2, Prague, Czech Republic, Oct. 9, 2017-Oct. 13, 2017, Oct. 8, 2017.

Interdigital Inc, "Corrections on BFR for SCell", 3GPP Draft, 38.321_CR0102_R2-1806822, Corrections on BFR on Scell, 3rd Generation Partnership Project (3GPP), vol. RAN WG2, Busan, Republic of Korea, May 21, 2018-May 25, 2018, May 11, 2018.

Spreadtrum Communications, "Discussion on multi-beam operation", 3GPP Draft, R1-1813067, Discussion on Multi-Beam Operation, 3rd Generation Partnership Project (3GPP), vol. RAN WG1, Spokane, USA, Nov. 12, 2018-Nov. 16, 2018, Nov. 11, 2018.

Extended European Search Report dated Jul. 23, 2021, issued in European Patent Application No. 19736169.4-1216.

European Office Action dated Dec. 16, 2022, issued in European Patent Application No. 19736169.4-1206.

* cited by examiner

APPARATUS AND METHOD OF BEAM RECOVERY ON SECONDARY CELL

CROSS-REFERENCE TO RELATED APPLICATION(S)

This application is a continuation application of prior application Ser. No. 16/960,213, filed on Jul. 6, 2020, which will be issued as U.S. Pat. No. 11,956,827 on Apr. 9, 2024, which is a U.S. National Stage application under 35 U.S.C. § 371 of an International application number PCT/KR2019/000220, filed on Jan. 7, 2019, which is based on and claims priority of a U.S. Provisional application Ser. No. 62/613,977, filed on Jan. 5, 2018, in the U.S. Patent and Trademark Office, the disclosure of which is incorporated by reference herein in its entirety.

TECHNICAL FIELD

The disclosure relates to a system, a method and an apparatus for beam failure recovery on a secondary cell.

BACKGROUND ART

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G network' or a 'post Long Term Evolution (LTE) System.' The 5G wireless communication system is considered to be implemented not only in lower frequency bands but also in higher frequency (mmWave) bands, e.g., 10 GHz to 100 GHz bands, so as to accomplish higher data rates. These frequency bands can be licensed or unlicensed. To mitigate propagation loss of the radio waves and increase the transmission distance, the beamforming, massive Multiple-Input Multiple-Output (MIMO), Full Dimensional MIMO (FD-MIMO), array antenna, an analog beam forming, and large scale antenna techniques are being considered in the design of the 5G wireless communication system. In addition, in 5G communication systems, development for system network improvement is under way based on advanced small cells, cloud Radio Access Networks (RANs), ultra-dense networks, Device-to-Device (D2D) communication, wireless backhaul, moving network, cooperative communication, Coordinated Multi-Points (CoMP), reception-end interference cancellation and the like. In the 5G system, hybrid Frequency Shift Keying (FSK) and Quadrature Amplitude Modulation (QAM) (FQAM) and Sliding Window Superposition Coding (SWSC) as an Advanced Coding Modulation (ACM), Filter Bank Multi Carrier (FBMC), Non-Orthogonal Multiple Access (NOMA), and Sparse Code Multiple Access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies, such as a sensor network, MTC and M2M communication may be implemented by beamforming, MIMO and array antennas. Application of a cloud RAN as the above-described big data processing technology may also be considered to be as an example of convergence between the 5G technology and the IoT technology.

In the recent years several broadband wireless technologies have been developed to meet the growing number of broadband subscribers and to provide more and better applications and services. The second generation (2G) wireless communication system has been developed to provide voice services while ensuring the mobility of users. The third generation (3G) wireless communication system supports not only the voice service but also data service. The 4G wireless communication system has been developed to provide high-speed data service. However, the 4G wireless communication system suffers from lack of resources to meet the growing demand for high speed data services. Therefore, the 5G wireless communication system is being developed to meet the growing demand of various services with diverse requirement, e.g., high speed data services, support ultra-reliability and low latency applications.

In addition, the 5G wireless communication system is expected to address different use cases having quite different requirements in terms of data rate, latency, reliability, mobility, etc. However, it is expected that the design of the air-interface of the 5G wireless communication system would be flexible enough to serve the User Equipments (UEs) having quite different capabilities depending on the use case and market segment the UE cater service to the end customer. Example use cases the 5G wireless communication system is expected to address is enhanced Mobile Broadband (eMBB), massive MTC (m-MTC), ultra-reliable low latency communication (URLL), etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the IoT/IoE envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the 5G wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

Typically, in a wireless communication network UE can be in one of Radio Resource Control (RRC) idle state or RRC connected state. A UE in RRC Idle performs cell selection and reselection-in other words, it decides on which cell to camp. The RRC idle UE monitors a paging channel to detect incoming calls, and also acquires system information. The system information mainly consists of parameter by which network can control the cell (re)selection process. In RRC connected state, network allocates radio resources to the UE to facilitate the transfer of (unicast) data via shared data channels. To support this operation, the UE monitors an associated control channel used to indicate the dynamic allocation of the shared transmission resources in time and frequency. The UE provide the network with reports of its buffer status and of the downlink channel quality, as well as neighbor cell measurement information to enable network to select the most appropriate cell for the UE. In the RRC connected state UE monitors the DL subframes or Transmit timer interval (TTI) or slot for downlink control information (downlink control information can be transmitted using physical downlink control channel ((e) PDCCH)). Downlink control information can indicate whether the UE is scheduled in downlink (DL) or uplink (UL). If the UE is scheduled in DL then UE decode and receive the downlink packet using the received control information. If the UE is scheduled in UL then UE uses the received control information to transmit the uplink packet. In a beamformed system the downlink control information is transmitted by the base station (BS) using beamforming. BS supports multiple TX beams and transmits using one or more TX beams in subframe or TTI or time slot. UE monitors the subframes or TTIs or time slots for receiving downlink control information (i.e., PDCCH/ePDCCH). The one or more TX beams used by gNB to communicate with a UE are decided based on a beam management procedure which basically comprises of UE measuring the reference signals transmitted using multiple TX beams and reporting one or more suitable TX beams to gNB.

The 5G wireless communication system (also referred as next generation radio or new radio (NR)) supports standalone mode of operation as well dual connectivity (DC). In DC a multiple Rx/Tx UE may be configured to utilize resources provided by two different nodes (or NodeBs (NBs)) connected via non-ideal backhaul. One node acts as the Master Node (MN) and the other as the Secondary Node (SN). The MN and SN are connected via a network interface and at least the MN is connected to the core network. NR also supports Multi-radio access technology (RAT) DC (MR-DC) operation whereby a UE in RRC_CONNECTED is configured to utilize radio resources provided by two distinct schedulers, located in two different nodes connected via a non-ideal backhaul and providing either Evolved Universal Terrestrial Radio Access (E-UTRA) (i.e., if the node is an Next generation eNodeB (ng-eNB) or NR access (i.e., if the node is a gNB).

In NR for a UE in RRC_CONNECTED not configured with carrier aggregation (CA)/DC there is only one serving cell comprising of the primary cell. For a UE in RRC_CONNECTED configured with CA/DC the term 'serving cells' is used to denote the set of cells comprising of the Special Cell(s) and all secondary cells.

In NR the term Master Cell Group (MCG) refers to a group of serving cells associated with the MN, comprising of the Primary Cell (PCell) and optionally one or more Secondary Cells (SCells). In NR the term Secondary Cell Group (SCG) refers to a group of serving cells associated with the SN, comprising of the Primary SCG Cell (PSCell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, SCell is a cell providing additional radio resources on top of Special Cell. PSCell refers to a serving cell in SCG in which the UE performs random access when performing the Reconfiguration with Synchronization procedure. For DC operation the term SpCell (i.e., Special Cell) refers to the PCell of the MCG or the PSCell of the SCG, otherwise the term SpCell refers to the PCell.

The 5G wireless communication system supports a beam failure recovery mechanism at UE for PCell or PSCell. This comprises of beam failure detection, new candidate beam identification, beam failure recovery request transmission and monitoring response for beam failure recovery request. UE monitors synchronization signals (SS) or Channel State Information-Reference Signals (CSI-RSs) transmitted periodically by the serving cell (PCell or PSCell) to assess if a beam failure trigger condition has been met and also to identify a new candidate beam. A beam failure is detected on a serving cell if number of detected beam failure instance exceeds a configured maximum number within a defined time duration (beamFailureDetectionTimer). A Beam Failure Instance means that all serving beam fails (i.e., hypothetical PDCCH Block Error Rate (BLER) determined based on measurement of SS or CSI-RS is above a threshold). A new candidate beam is the CSI-RS or SS Block (SSB) of serving cell whose measured quality (e.g., RSRP) is above a configured threshold.

After detecting beam failure on SpCell, UE starts a beamFailureRecoveryTimer (if configured) and initiates random access procedure on SpCell for beam failure recovery.

1) UE selects contention free (dedicatedly signaled to UE) Physical Random Access Channel (PRACH) occasion and/or preamble corresponding to SpCell's new candidate beam and transmits the preamble.
2) UE then starts the bfr-ResponseWindow at the start of the first PDCCH occasion after a fixed duration of X symbols from the end of the preamble transmission.
3) UE monitors the PDCCH of the SpCell for response to beam failure recovery request identified by the Cell-Radio Network Temporary Identifier (C-RNTI) while bfr-ResponseWindow is running. UE may monitor PDCCH in beam failure recovery search space, if configured.
4) If UE receives a PDCCH transmission addressed to the C-RNTI from the SpCell, UE considers the Beam Failure Recovery Request procedure successfully completed and beamFailureRecoveryTimer is stopped. If the bfr-ResponseWindow is expired, UE performs 1), 2) and 3) again.

UE may be configured with Secondary serving cell(s) in addition to SpCell. In case of beam failure detection on SCell, the existing beam failure recovery procedure of initiating random access procedure on SpCell does not work. The reason is that PRACH occasions and/or preambles for preamble transmission on SpCell are mapped to SS or CSI-RS transmitted on SpCell and hence cannot indicate candidate beam of SCell. Additionally reception of PDCCH addressed to C-RNTI on SpCell cannot represent response for beam recovery request for SCell as PDCCH addressed to C-RNTI may be transmitted by gNB for DL/UL assignment for SpCell. So an enhanced method of beam failure recovery on SCell is needed.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

An object of the disclosure is directed to provision of a system and a method of beam failure recovery on Secondary Cell.

Another object of the disclosure is directed to provision of Discontinuous Reception (DRX) operation for beam failure recovery.

Solution to Problem

In accordance with the first aspect of the disclosure, a method by a terminal for beam failure recovery is provided. The method comprises receiving first configuration information on a special cell (SpCell) and second configuration information on a secondary cell (SCell) from a base station, detecting beam failure on the SCell, selecting a physical random access channel (PRACH) preamble and a PRACH occasion configured for beam failure recovery request transmission on the SCell based on the second configuration information, and transmitting the selected PRACH preamble over the selected PRACH occasion to the base station.

In accordance with the second aspect of the disclosure, a method by a base station for beam failure recovery is provided. The method comprises assigning PRACH preambles and PRACH occasions for beam failure recovery request for a SpCell and a SCell to a terminal, receiving a PRACH preamble for the beam failure recovery request over a PRACH occasion from the terminal, identifying a cell in which the beam failure recovery request is received based on the PRACH preamble and the PRACH occasion in which the beam failure recovery request is received, and the PRACH preambles and the PRACH occasions assigned to the terminal, and transmitting a beam failure recovery request response to the terminal based on the identification of the cell.

In accordance with the third aspect of the disclosure, a terminal including a transceiver and a controller is provided. The transceiver is configured to receive signals from a base station, and to transmit signals to the base station. The controller is coupled with the transceiver and configured to control the transceiver to receive first configuration information on a SpCell and second configuration information on a SCell from the base station, to detect beam failure on the SCell, to select a PRACH preamble and a PRACH occasion configured for beam failure recovery request transmission on the SCell based on the second configuration information, and to control the transceiver to transmit the selected PRACH preamble over the selected PRACH occasion to the base station.

In accordance with the fourth aspect of the disclosure, a base station including a transceiver and a controller is provided. The transceiver is configured to receive signals from a terminal, and to transmit signals to the terminal. The controller is coupled with the transceiver and configured to assign PRACH preambles and PRACH occasions for beam failure recovery request for a SpCell and a SCell to the terminal, to control the transceiver to receive a PRACH preamble for the beam failure recovery request over a PRACH occasion from the terminal, to identify a cell in which the beam failure recovery request is received based on the PRACH preamble and the PRACH occasion in which the beam failure recovery request is received and the PRACH preambles and the PRACH occasions assigned to the terminal, and to control the transceiver to transmit a beam failure recovery request response to the terminal based on the identification of the cell.

In accordance with the fifth aspect of the disclosure, a method by a terminal for monitoring a control channel is provided. The method comprises transmitting a beam failure recovery request to a base station, determining active time including a time duration to monitor a beam failure recovery response on the control channel in response to the beam failure recovery request, and monitoring the control channel based on the terminal being in the active time.

In accordance with the sixth aspect of the disclosure, a terminal including a transceiver and a controller is provided. The transceiver is configured to receive signals from a base station, and to transmit signals to the base station. The controller is coupled with the transceiver and configured to control the transceiver to transmit a beam failure recovery request to the base station, determine active time including a time duration to monitor a beam failure recovery response on the control channel in response to the beam failure recovery request, and monitor the control channel based on the terminal being in the active time.

Other aspects, advantages, and salient features of the disclosure will become apparent to those skilled in the art from the following detailed description, which, taken in conjunction with the annexed drawings, discloses various embodiments of the disclosure.

Advantageous Effects of Invention

The disclosure provides methods to perform beam failure recovery on SCell. As a result beam failure on SCell can be detected and recovered quickly unlike the existing method wherein beam failure recovery on SCell is not performed by a terminal leading to data interruption.

Although a portion of beam failure recovery (bfr)-Response Window belongs to On Duration of Discontinuous Reception (DRX) cycle or the entire bfr-Response Window is outside the On Duration, a terminal can receive a beam failure recovery response and hence can recover from beam failure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR THE INVENTION

Figure 1:
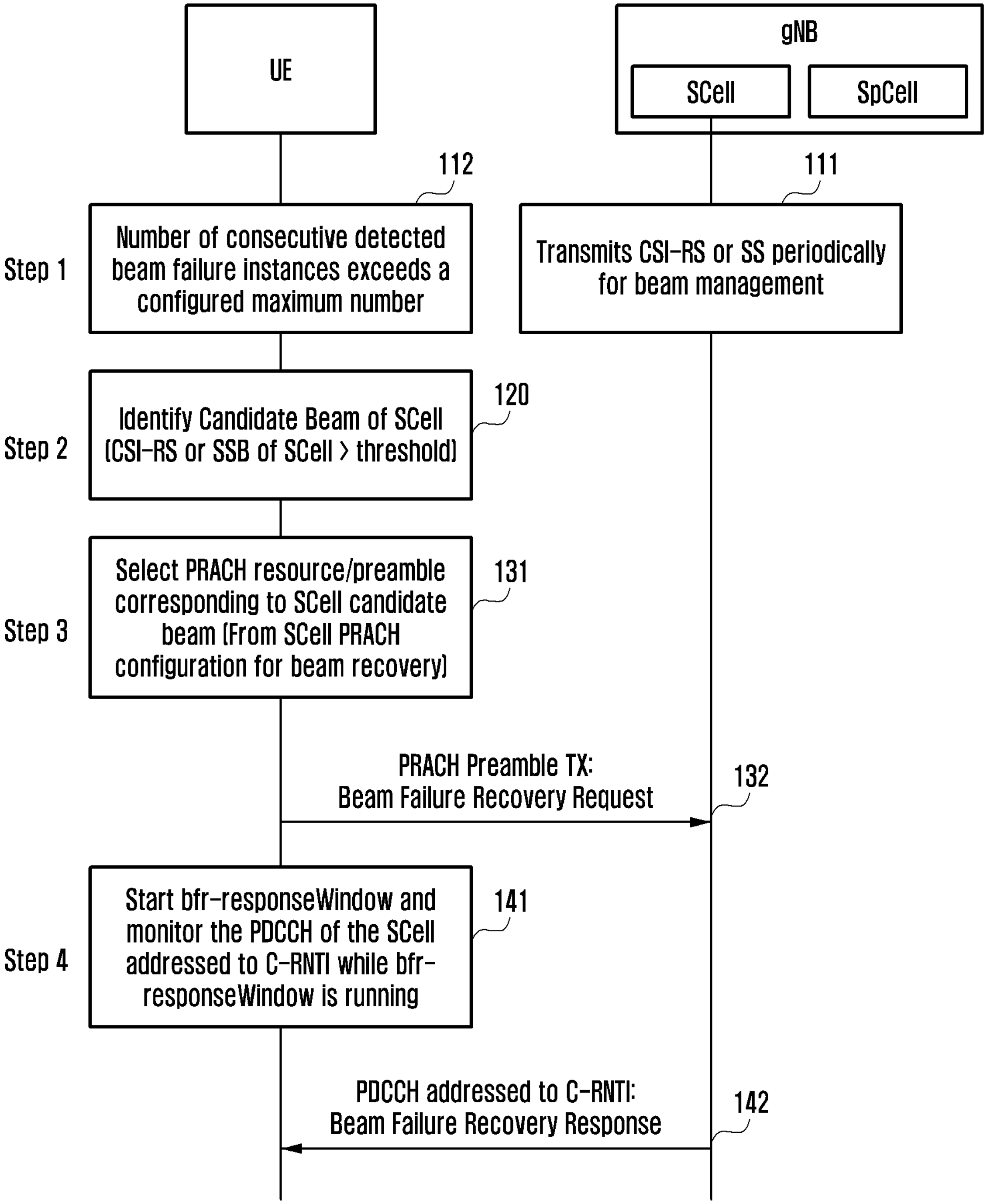
FIG. 1 illustrates beam failure recovery procedure for secondary cell (SCell) based on Method 1 according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the description, for Dual/Multi Connectivity operation the term Special Cell (SpCell) refers to the Primary Cell (PCell) of the Master Cell Group (MCG) or the Primary Secondary Cell Group Cell (PSCell) of the Secondary Cell Group (SCG) depending on if the Media Access Control (MAC) entity is associated to the MCG or the SCG, respectively. There is one MAC entity per Cell Group (CG) in UE. Otherwise the term SpCell refers to the PCell.

Method 1

FIG. 1 illustrates beam failure recovery procedure for SCell (i.e., secondary cell other than PSCell) based on Method 1 according to an embodiment of the disclosure.

For beam failure recovery on SCell, it is proposed that UE is configured with dedicated Physical Random Access Channel (PRACH) preambles and/or PRACH occasions for beam failure recovery on SCell. This configuration can be provided to UE in Radio Resource Control (RRC) message. In case UE is configured with multiple SCells, this configuration can be provided independently for each SCell on which beam failure recovery is needed. This is a significant change from the existing system wherein PRACH preambles and/or PRACH occasions for beam failure recovery are only provided for SpCell. PRACH preamble(s) and/or PRACH occasion(s) of SCell for beam failure recovery are associated to beams (i.e., synchronization signal blocks (SSBs) or Channel State Information Reference Signals (CSI RSs)) of that SCell. The beamFailureRecoveryConfig Information Element (IE) which is used to configure the UE with Random Access Channel (RACH) resources (i.e., preambles/PRACH occasions) and candidate beams for beam failure recovery in case of beam failure detection can be included for one or more SCells in RRCReconfiguration message (sent by gNB to UE).

Beam Failure Detection (Step 1): The SCell transmits synchronization signals (SSs) or CSI-RSs periodically for beam management at operation 111. UE monitors SSs or CSI-RSs transmitted periodically by the SCell to assess if a beam failure trigger condition has been met and also to identify a new candidate beam. The signal (SS or CSI-RS) to measure for detecting beam failure on an SCell can be configured by gNB in RRCReconfiguration message. The UE detects a beam failure on SCell if number of detected beam failure instances within a defined time duration (beamFailureDetectionTimer) exceeds a configured maximum number (pre-defined or signaled to UE by gNB in RRC message) at operation 112. A Beam Failure Instance means that all serving beam fails (i.e., hypothetical Physical Downlink Control Channel (PDCCH) Block Error Rate (BLER) determined based on measurement of SS or CSI-RS is above a threshold).

Candidate Beam Selection (Step 2): For beam failure recovery on SCell, it is proposed that UE is configured with dedicated PRACH preambles and/or PRACH occasions on SCell. This configuration can be provided to UE in RRC message. The UE identifies candidate beam of SCell at operation 120. PRACH preamble and/or PRACH occasions for beam failure recovery are associated to beam (i.e., SSB or CSI RS) on SCell. The UE may identify the SS blocks with SS-Reference Signals Received Power (SS-RSRP) above rsrp-ThresholdSSB among the SS blocks in candidateBeamRSList or the CSI-RSs with CSI-RSRP above csirs-dedicatedRACH-Threshold among the CSI-RSs in candidateBeamRSList. If at least one of the SS blocks with SS-RSRP above rsrp-ThresholdSSB among the SS blocks in candidateBeamRSList or the CSI-RSs with CSI-RSRP above csirs-dedicatedRACH-Threshold among the CSI-RSs in candidateBeamRSList is available then UE selects an SS block with SS-RSRP above rsrp-ThresholdSSB among the SS blocks in candidateBeamRSList or a CSI-RS with CSI-RSRP above csirs-dedicatedRACH-Threshold among the CSI-RSs in candidateBeamRSList. candidateBeamRSList, csirs-dedicatedRACH-Threshold and rsrp-ThresholdSSB are signaled by gNB to UE.

Beam Failure Recovery Request Transmission (Step 3): For Beam Failure Recovery Request Transmission for recovering beam of SCell, it is proposed that UE select PRACH preamble corresponding to the selected SS block or CSI-RS from the set of Random Access Preamble(s) configured for beam failure recovery request transmission on SCell at operation 131. If multiple PRACH preambles are mapped to selected SS block or CSI-RS, UE selects one PRACH preamble randomly from the mapped PRACH preambles. UE selects the next available PRACH occasion corresponding to the selected SS block or CSI-RS permitted by the restrictions given by the ra-ssb-OccasionMaskIndex (ra-ssb-OccasionMaskIndex indicates which of the RACH occasions among the RACH occasions corresponding to a selected SS block or CSI-RS UE is allowed to use) if configured from the set of RACH occasions for beam failure recovery request transmission on SCell at operation 131. UE then transmits selected PRACH preamble over the selected PRACH occasion of SCell at operation 132. After reception of the Beam Failure Recovery Request from a UE, the SCell can share this information with SpCell.

Beam Failure Recovery Request Response (Step 4): For receiving response for Beam Failure Recovery Request transmitted by UE for recovering beam of SCell, it is proposed that UE start the bfr-ResponseWindow (i.e., ra-response Window configured in beam failure recovery configuration) at the start of the first PDCCH occasion after a fixed duration of X symbols from the end of the preamble transmission and UE monitors the PDCCH of the SCell identified by the Cell-Radio Network Temporary Identifier (C-RNTI) while bfr-ResponseWindow is running at operation 141. UE may monitor PDCCH in beam failure recovery search space, if configured. If the UE receives the PDCCH transmission addressed to the C-RNTI from SCell while bfr-ResponseWindow is running at operation 142, Beam Failure Recovery is considered successfully completed (or random access procedure is successfully completed). In an embodiment, if the UE receives the PDCCH transmission addressed to the C-RNTI from SCell in beam failure recovery search space while bfr-ResponseWindow is running at operation 142, Beam Failure Recovery is considered successfully completed (or random access procedure is successfully completed). This is a significant change from the existing system wherein after transmitting PRACH preamble on SCell, random access response is always received by UE from SpCell. Unlike the existing system, gNB needs to configure beam failure recovery search space on SCell to enable UE to monitor PDCCH for receiving beam failure response on SCell.

In order for this Beam Failure Recovery Response transmission from SCell, the SCell can generate its own Beam Failure Recovery Response for the specific UE, or the SpCell can generate the Beam Failure Recovery Response using the information of the specific UE measurement and SCell beam characteristics for the specific UE and transmit it to the SCell in order for SCell to transmit to the UE.

If the bfr-ResponseWindow is expired, UE performs Steps 2 to 4 again. If the bfr-ResponseWindow is expired and UE has already transmitted PRACH preamble for configured number of times (pre-defined or signaled to UE by gNB in RRC message), Beam Failure Recovery Request procedure (or random access procedure) is considered unsuccessful and UE may trigger radio link failure.

As a result of the proposed procedure, from perspective of random access procedure, after transmitting PRACH preamble, UE decides the response monitoring as follows: 1) if transmitted PRACH preamble is not for beam failure request, UE starts the response window and monitors PDCCH of SpCell to receive response 2) if transmitted PRACH preamble is for beam failure recovery on an SpCell, UE starts the response window and monitors PDCCH of that SpCell to receive response 3) if transmitted PRACH preamble is for beam failure recovery on an SCell, UE starts the response window and monitors PDCCH of that SCell to receive response.

Figure 2A:
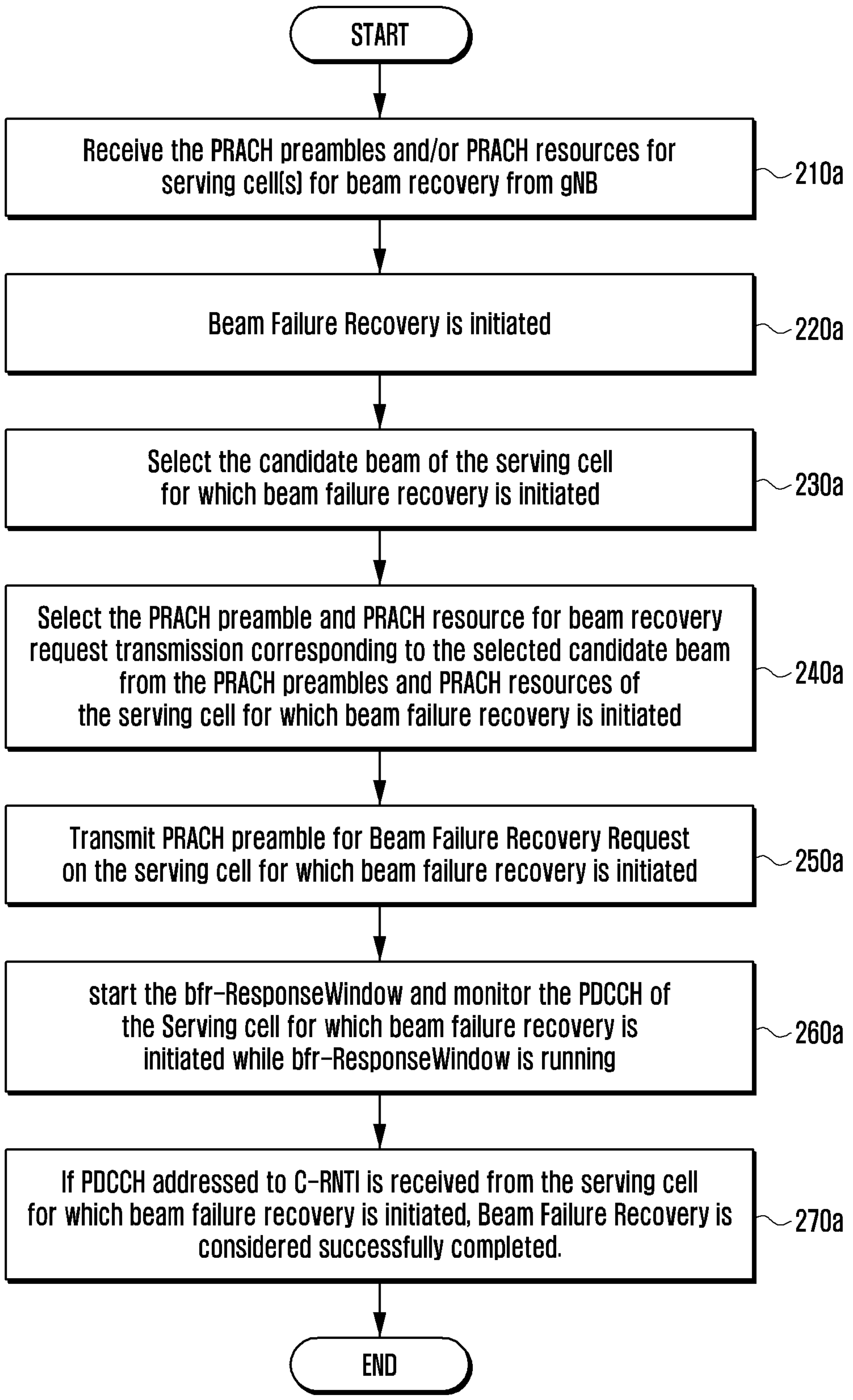
FIG. 2A illustrates a generalized user equipment (UE) procedure for beam failure recovery for any serving cell based on Method 1 according to an embodiment of the disclosure.
Figure 2B:
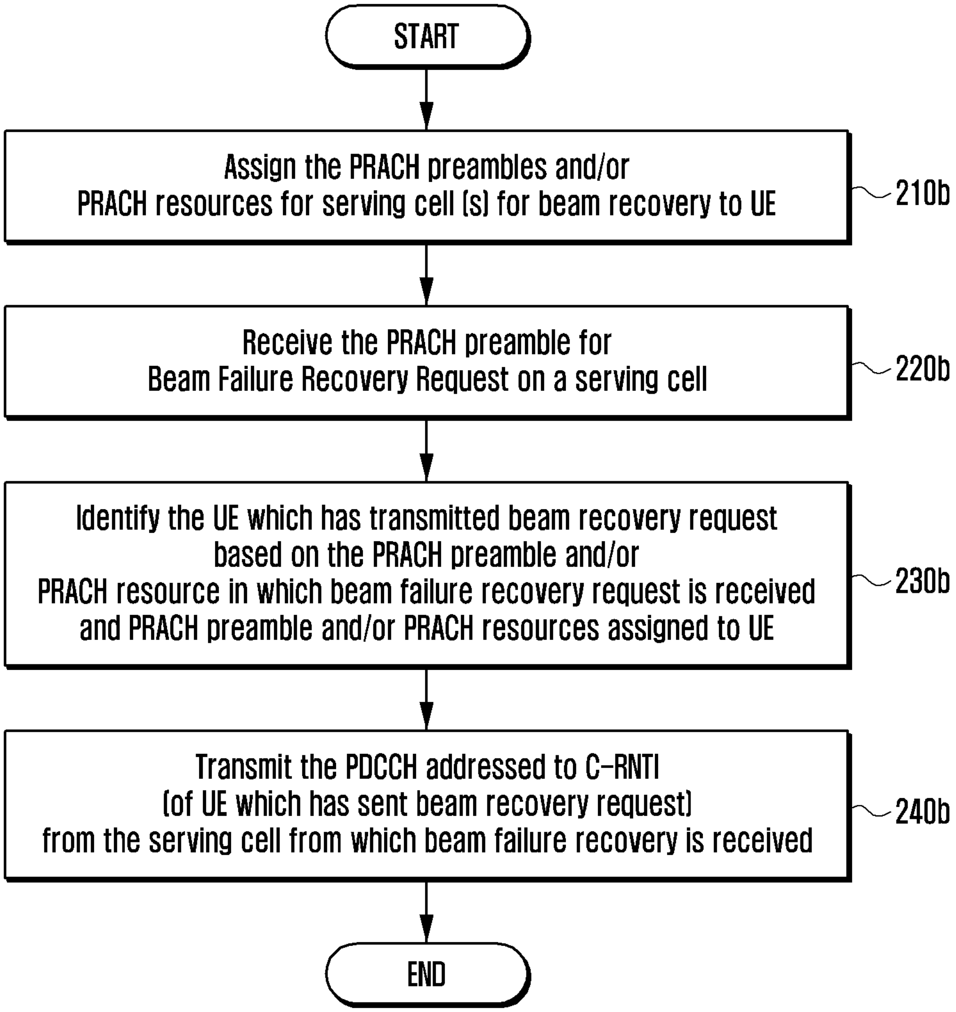
FIG. 2B illustrates the gNB procedure for beam failure recovery for any serving cell based on Method 1 according to an embodiment of the disclosure.

FIGS. 2A and 2B illustrate a generalized UE procedure and the gNB procedure for beam failure recovery for any serving cell based on the above procedure proposed for recovering beam failure.

Referring to FIG. 2A, a UE receives the PRACH preambles and/or PRACH occasions for serving cell(s) for beam failure recovery from gNB at operation 210*a*. If beam failure recovery is initiated at operation 220*a*, the UE selects the candidate beam of the serving cell for which beam failure recovery is initiated at operation 230*a*, and selects the PRACH preamble and PRACH occasion for beam failure recovery request transmission corresponding to the selected candidate beam from the PRACH preambles and PRACH occasions of the serving cell for which beam failure recovery is initiated at operation 240*a*. The UE transmits a PRACH preamble for beam failure recovery request on the serving cell for which beam failure recovery is initiated at operation 250*a*. The UE starts the bfr-ResponseWindow (i.e., ra-response Window configured in beam failure recovery configuration) and monitors the PDCCH of the serving cell for which beam failure recovery is initiated while bfr-ResponseWindow is running at operation 260*a*. If a beam failure recovery response (i.e., PDCCH addressed to C-RNTI) is received from the serving cell for which beam failure recovery is initiated, beam failure recovery is considered successfully completed at operation 270*a*. In an embodiment, if beam failure recovery search space is configured and a beam failure recovery response (i.e., PDCCH addressed to C-RNTI) is received in beam failure recovery search space from the serving cell for which beam failure recovery is initiated, beam failure recovery is considered successfully completed at operation 270*a*. For example, the UE may receive configuration information on the PRACH preambles and/or PRACH occasions for SCell for beam failure recovery from gNB at operation 210*a*. If SCell beam failure recovery is triggered at operation 220*a*, the UE transmits beam failure recovery request on SCell configured RACH resource. The UE may select the candidate beam of SCell at operation 230*a*, select the PRACH preamble and PRACH occasion for beam failure recovery request transmission corresponding to the selected candidate beam from the PRACH preambles and PRACH occasions of SCell at operation 240*a*, and transmit a PRACH preamble for beam failure recovery request on SCell at operation 250*a*. The UE may start the bfr-ResponseWindow (i.e., ra-response Window configured in beam failure recovery configuration) and monitors the PDCCH of SCell while bfr-ResponseWindow is running at operation 260*a*. If a beam failure recovery response is received on PDCCH addressed to C-RNTI from SCell, SCell beam failure recovery may be considered successfully completed at operation 270*a*. In an embodiment, if beam failure recovery search space is configured and a beam failure recovery response (i.e., PDCCH addressed to C-RNTI) is received in beam failure recovery search space from the serving cell for which beam failure recovery is initiated, beam failure recovery is considered successfully completed at operation 270*a*.

Referring to FIG. 2B, a gNB assigns the PRACH preambles and/or PRACH occasions for serving cell(s) for beam failure recovery to UE at operation 210*b*. If the gNB receives the PRACH preamble for beam failure recovery request on a serving cell at operation 220*b*, the gNB identifies the UE which has transmitted beam failure recovery request based on the PRACH preamble and/or PRACH occasion in which beam failure recovery request is received and PRACH preamble and/or PRACH occasions assigned to UE at operation 230*b*. The gNB transmits a beam failure recovery response (i.e., PDCCH addressed to C-RNTI of the UE which has sent beam failure recovery request) from the serving cell from which beam failure recovery is received at operation 240*b*. In an embodiment, if beam failure recovery search space is configured gNB transmits a beam failure recovery response (i.e., PDCCH addressed to C-RNTI of the UE which has sent beam failure recovery request) in beam failure recovery search space of the serving cell from which beam failure recovery is received at operation 240*b*.

Method 2

Figure 3:
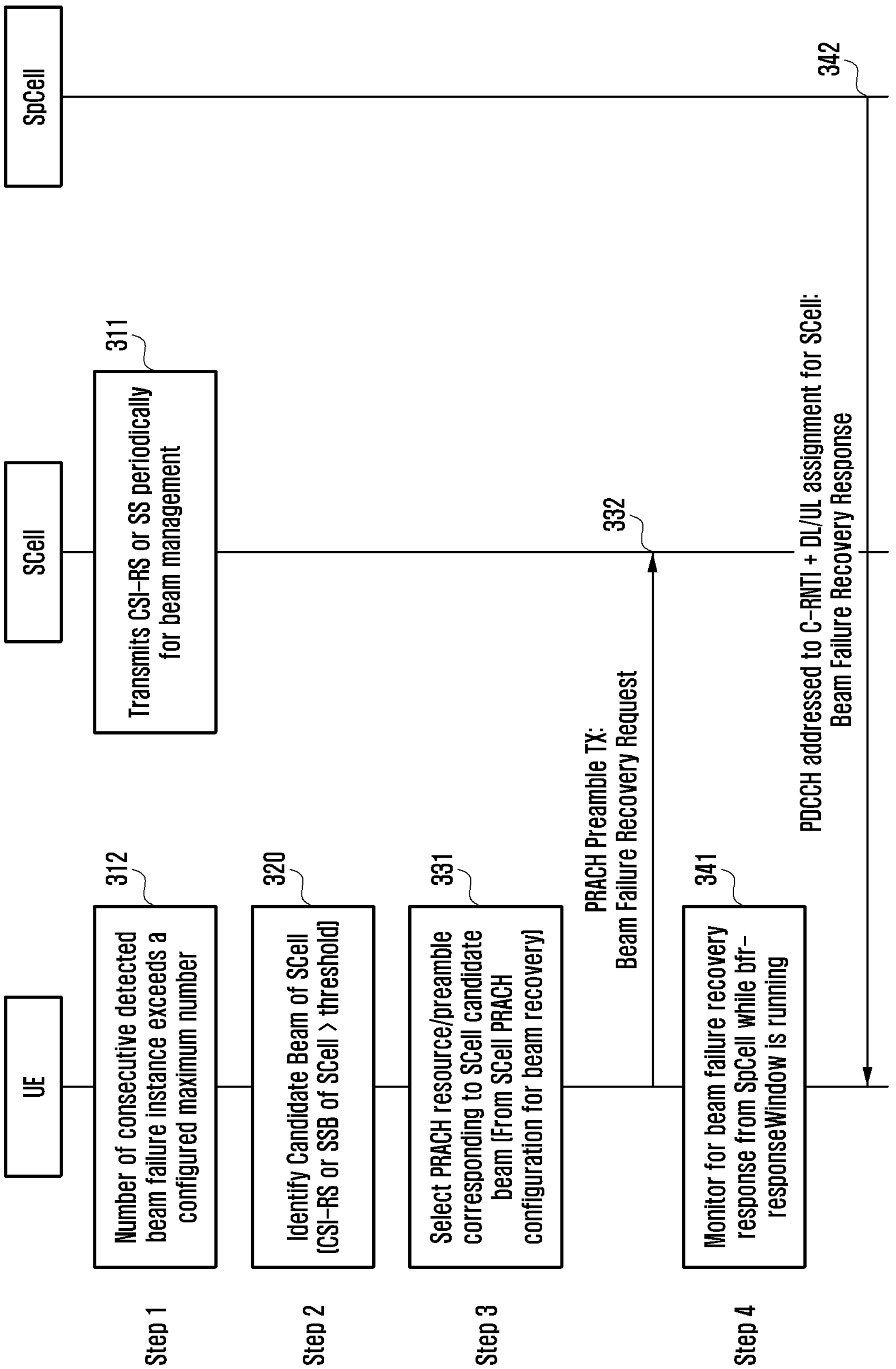
FIG. 3 illustrates beam failure recovery procedure for SCell based on Method 2 according to an embodiment of the disclosure.

FIG. 3 illustrates beam failure recovery procedure for SCell (other than PSCell) based on Method 2 according to an embodiment of the disclosure.

For beam failure recovery on SCell, it is proposed that UE is configured with dedicated PRACH preambles and/or PRACH occasions for beam failure recovery on SCell. This configuration can be provided to UE in RRC message. In case UE is configured with multiple SCells, this configuration can be provided independently for each SCell on which beam failure recovery is needed. This is a significant change from the existing system wherein PRACH preambles and/or PRACH occasions for beam failure recovery are only provided for SpCell. PRACH preamble(s) and/or PRACH occasion(s) of SCell for beam failure recovery are associated to beams (i.e., SSBs or CSI RSs) of that SCell. The beamFailureRecoveryConfig IE which is used to configure the UE with RACH resources (i.e., preambles/PRACH occasions) and candidate beams for beam failure recovery in case of beam failure detection can be included for one or more SCells in RRCReconfiguration message (sent by gNB to UE).

Beam Failure Detection (Step 1): The SCell transmits SSs or CSI-RSs periodically for beam management at operation 311. UE monitors SSs or CSI-RSs transmitted periodically by the SCell to assess if a beam failure trigger condition has been met and also to identify a new candidate beam. The signal (SS or CSI-RS) to measure for detecting beam failure on an SCell can be configured by gNB in RRCReconfiguration message. The UE detects a beam failure on SCell if number of detected beam failure instances within a defined time duration (beamFailureDetectionTimer) exceeds a configured maximum number (pre-defined or signaled to UE by gNB in RRC message) at operation 312. A Beam Failure Instance means that all serving beam fails (i.e., hypothetical PDCCH BLER determined based on measurement of SS or CSI-RS is above a threshold).

Candidate Beam Selection (Step 2): For beam failure recovery on SCell, it is proposed that UE is configured with dedicated PRACH preambles and/or PRACH occasions on SCell. This configuration can be provided to UE in RRC message. The UE identifies candidate beam of SCell at operation 320. PRACH preamble and/or PRACH occasions for beam failure recovery are associated to beam (i.e., SSB or CSI RS) on SCell. The UE may identify the SS blocks with SS-RSRP above rsrp-ThresholdSSB among the SS blocks in candidateBeamRSList or the CSI-RSs with CSI-RSRP above csirs-dedicatedRACH-Threshold among the CSI-RSs in candidateBeamRSList. If at least one of the SS blocks with SS-RSRP above rsrp-ThresholdSSB among the SS blocks in candidateBeamRSList or the CSI-RSs with CSI-RSRP above csirs-dedicatedRACH-Threshold among the CSI-RSs in candidateBeamRSList is available then UE selects an SS block with SS-RSRP above rsrp-ThresholdSSB among the associated SS blocks or a CSI-RS with CSI-RSRP above csirs-dedicatedRACH-Threshold among the associated CSI-RSs. candidateBeamRSList, csirs-dedicatedRACH-Threshold and rsrp-ThresholdSSB are signaled by gNB to UE.

Beam Failure Recovery Request Transmission (Step 3): For Beam Failure Recovery Request Transmission for recovering beam of SCell, it is proposed that UE selects PRACH preamble corresponding to the selected SS block or CSI-RS from the set of Random Access Preambles configured for beam failure recovery request transmission on SCell at operation 331. If multiple PRACH preambles are mapped to selected SS block or CSI-RS, UE selects one PRACH preamble randomly from the mapped PRACH preambles. UE selects the next available PRACH occasion corresponding to the selected SS block or CSI-RS permitted by the restrictions given by the ra-ssb-OccasionMaskIndex (ra-ssb-OccasionMaskIndex indicates which of the RACH occasions among the RACH occasions corresponding to a selected SS block or CSI-RS UE is allowed to use) if configured from the set of Random Access Occasions for beam failure recovery request transmission on SCell at operation 331. UE then transmits selected PRACH preamble over the selected PRACH Occasion of SCell at operation 332. After reception of the Beam Failure Recovery Request from a UE, the SCell shall share this information with SpCell.

Beam Failure Recovery Request Response (Step 4): For receiving response for Beam Failure Recovery Request transmitted by UE for recovering beam of SCell, it is proposed that UE start the bfr-ResponseWindow (i.e., ra-response Window configured in beam failure recovery configuration) at the start of the first PDCCH occasion after a fixed duration of X symbols from the end of the preamble transmission and UE monitors the PDCCH of the SpCell identified by the C-RNTI while bfr-ResponseWindow is running at operation 341. UE may monitor PDCCH in beam failure recovery search space, if configured by gNB. If the UE receives the PDCCH transmission addressed to the C-RNTI from SpCell while bfr-ResponseWindow is running and received PDCCH indicates DL or UL assignment for SCell for which beam recovery request was transmitted at operation 342, Beam Failure Recovery is considered successfully completed (or random access procedure is successfully completed). In an embodiment, if the UE receives the PDCCH transmission addressed to the C-RNTI from SpCell in beam failure recovery search space while bfr-ResponseWindow is running and received PDCCH indicates DL or UL assignment for SCell for which beam recovery request was transmitted at operation 342, Beam Failure Recovery is considered successfully completed (or random access procedure is successfully completed).

In order for this Beam Failure Recovery Response transmission from SpCell, the SCell can generate the Beam Failure Recovery Response for the specific UE, using the information of the current SCell status and the specific UE measurement which is transmitted by UE. After the generation, the Beam Failure Recovery Response can be shared to the SpCell in order for transmission to the UE. Or, in another embodiment, the SpCell can generate the Beam Failure Recovery Response for the specific UE, using the information of the current SCell status and the specific UE measurement which is shared by SCell. In addition, the SpCell includes the information of SCell DL/UL resource for this UE to monitor and transmit a signal into the Beam Failure Recovery Response signal.

If the bfr-ResponseWindow is expired, UE performs Steps 2 to 4 again. If the bfr-ResponseWindow is expired and UE has already transmitted PRACH preamble for configured number of times (pre-defined or signaled to UE by gNB in RRC message), Beam Failure Recovery Request procedure (or random access procedure) is considered unsuccessful and UE may trigger radio link failure.

Figure 4A:
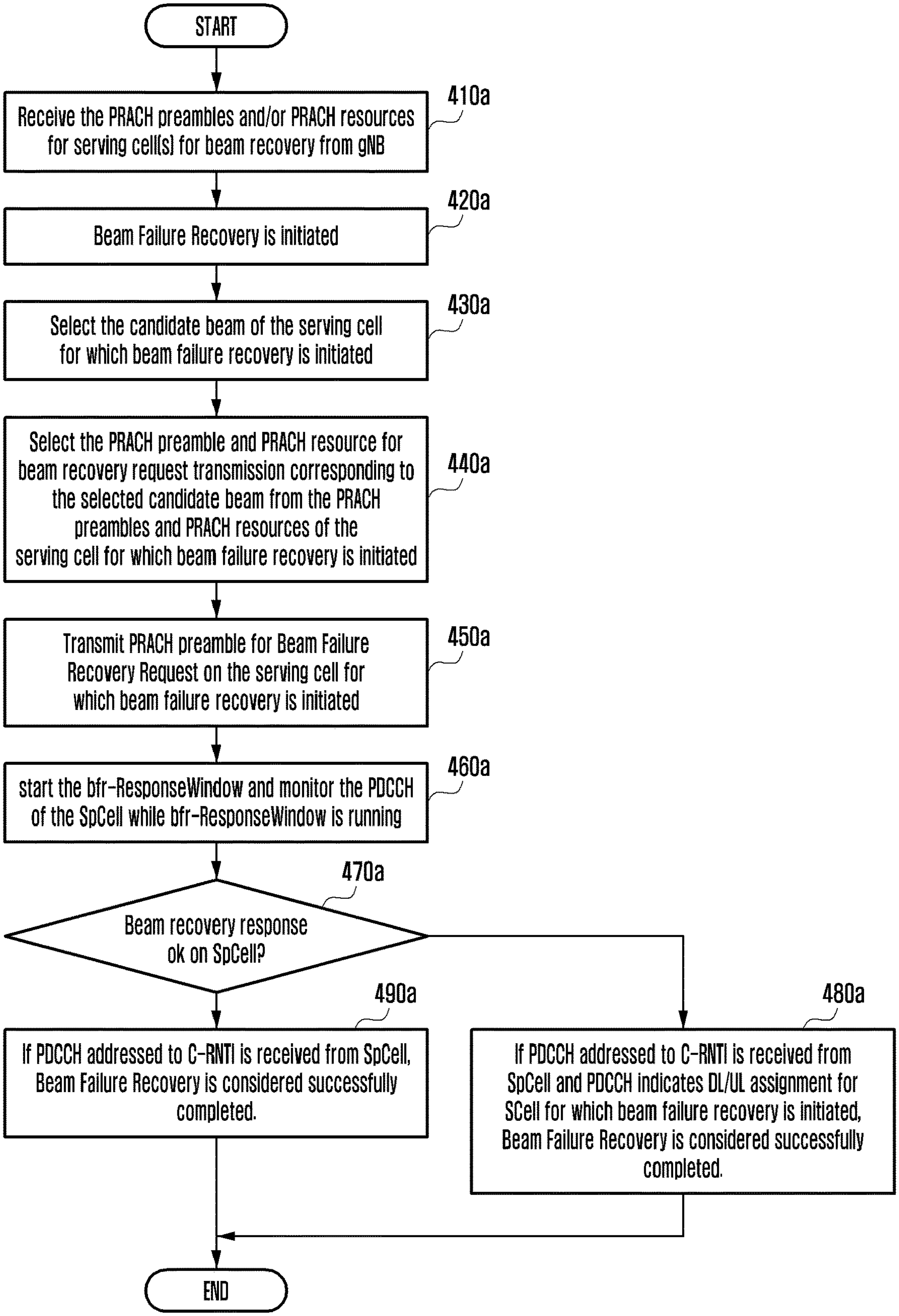
FIG. 4A illustrates a generalized UE procedure for beam failure recovery for any serving cell based on Method 2 according to an embodiment of the disclosure.

FIG. 4A illustrates a generalized UE procedure for beam failure recovery for any serving cell based on the above procedure proposed for recovering beam failure.

The flow chart of FIG. 4A contains both the SpCell beam failure recovery and SCell beam failure recovery procedures. If SpCell beam failure recovery is triggered, the UE transmits beam failure recovery request on SpCell configured RACH resource. Else if SCell beam failure recovery is triggered, the UE transmits beam failure recovery request on SCell configured RACH resource. And, the consequent procedure of the above two cases are also different.

Specifically, a UE receives the PRACH preambles and/or PRACH occasions for serving cell(s) for beam failure recovery from gNB at operation 410*a*. First configuration information on PRACH preambles and/or PRACH occasions for SpCell beam failure recovery and second configuration information on PRACH preambles and/or PRACH occasions for SCell beam failure recovery may be received from gNB. If beam failure recovery is initiated at operation 420*a*, the UE selects the candidate beam of the serving cell for which beam failure recovery is initiated at operation 430*a*, selects the PRACH preamble and PRACH occasion for beam failure recovery request transmission corresponding to the selected candidate beam from the PRACH preambles and PRACH occasions of the serving cell for which beam failure recovery is initiated at operation 440*a*, and transmits a PRACH preamble for beam failure recovery request on the serving cell for which beam failure recovery is initiated at operation 450*a*. If SpCell beam failure recovery is triggered at operation 420*a*, the UE may select the candidate beam of SpCell at operation 430*a*, select the PRACH preamble and PRACH occasion for beam failure recovery request transmission corresponding to the selected candidate beam from the PRACH preambles and PRACH occasions of SpCell at operation 440*a*, and transmit a PRACH preamble for beam failure recovery request on SpCell at operation 450*a*. If SCell beam failure recovery is triggered at operation 420*a*, the UE may select the candidate beam of SCell at operation 430*a*, select the PRACH preamble and PRACH occasion for beam failure recovery request transmission corresponding to the selected candidate beam from the PRACH preambles and PRACH occasions of SCell at operation 440*a*, and transmit a PRACH preamble for beam failure recovery request on SCell at operation 450*a*. The UE starts the bfr-ResponseWindow (i.e., ra-response Window configured in beam failure recovery configuration) and monitors the PDCCH of the SpCell while bfr-ResponseWindow is running at operation 460*a*. In case of beam failure recovery request transmitted on SCell, if the beam failure recovery response, i.e., PDCCH addressed to C-RNTI from SpCell is received wherein the PDCCH indicates DL/UL assignment for SCell for which beam failure recovery is initiated, SCell beam failure recovery is considered successfully completed at operation 470*a*. In an embodiment, in case of beam failure recovery request transmitted on SCell and if beam failure recovery search space is configured and beam failure recovery response, i.e., PDCCH addressed to C-RNTI from SpCell is received wherein the PDCCH indicates DL/UL assignment for SCell for which beam failure recovery is initiated, SCell beam failure recovery is considered successfully completed at operation 470*a*. In case of beam failure recovery request transmitted on SpCell, if the beam failure recovery response, i.e., the PDCCH addressed to C-RNTI from SpCell is received, SpCell beam failure recovery is considered successfully completed at operation 480*a*. In an embodiment, in case of beam failure recovery request transmitted on SpCell and if beam failure recovery search space is configured and if the beam failure recovery response, i.e., the PDCCH addressed to C-RNTI from SpCell is received, SpCell beam failure recovery is considered successfully completed at operation 480*a*.

Figure 4B:
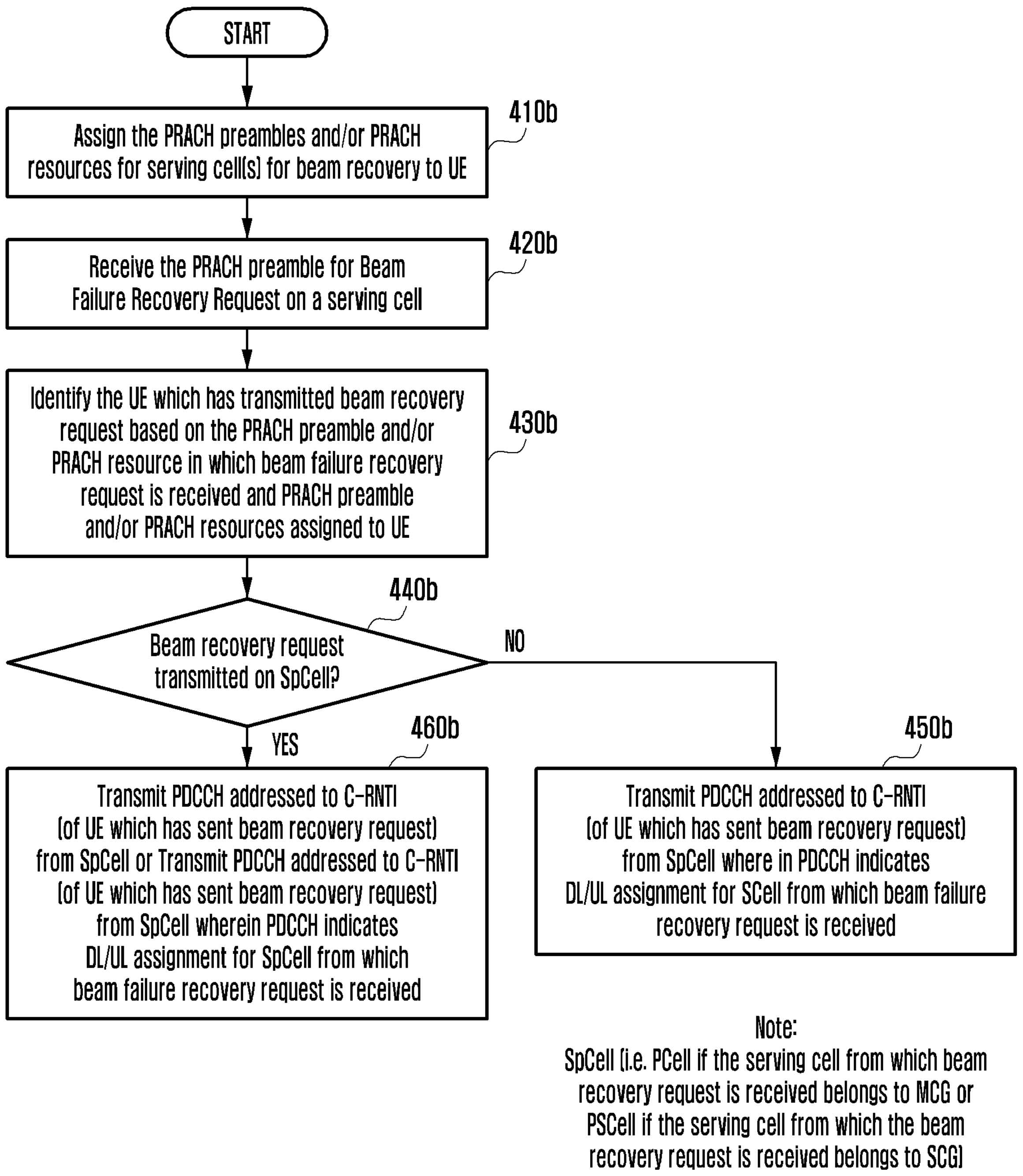
FIG. 4B illustrates the gNB procedure based on Method 2 according to an embodiment of the disclosure.

FIG. 4B illustrates the gNB procedure based on Method 2 according to an embodiment of the disclosure.

The flow chart of FIG. 4B contains both the SpCell beam failure recovery and SCell beam failure recovery procedures. If SpCell beam failure recovery is triggered, the gNB receives beam failure recovery request on SpCell configured RACH resource. Else if SCell beam failure recovery is triggered, the gNB receives beam failure recovery request on SCell configured RACH resource. And, the consequent procedure of the above two cases are also different.

Specifically, a gNB assigns the PRACH preambles and/or PRACH occasions for serving cell(s) for beam failure recovery to UE at operation 410*b*. The gNB may transmit first configuration information on PRACH preambles and/or PRACH occasions for SpCell beam failure recovery and second configuration information on PRACH preambles and/or PRACH occasions for SCell beam failure recovery to UE. The gNB receives the PRACH preamble for beam failure recovery request on a serving cell at operation 420*b*, and identifies the UE which has transmitted beam failure recovery request based on the RPACH preamble and/or PRACH occasion in which beam failure recover request is received and PRACH preamble and/or PRACH occasions assigned to UE at operation 430*b*. If SpCell beam failure recovery is triggered, the gNB may receive beam failure recovery request on SpCell configured RACH resource. Else if SCell beam failure recovery is triggered, the gNB may receive beam failure recovery request on SCell configured RACH resource. If the beam failure recovery request is received on SCell, the gNB transmits a beam failure recovery response, i.e., PDCCH addressed to C-RNTI of UE which has sent the beam failure recovery request from SpCell wherein the PDCCH indicates DL/UL assignment for SCell from which beam failure recovery request is received at operation **440*b*. In an embodiment, if beam failure recovery search space is configured the beam failure recovery response is transmitted in beam failure recovery search space. If the beam failure recovery request is received on SpCell, the gNB transmits a beam failure recovery response on PDCCH addressed to C-RNTI of UE which has sent the beam failure recovery request from SpCell at operation 450*b***. The PDCCH may indicate DL/UL assignment for SpCell from which beam failure recovery request is received. In an embodiment, if beam failure recovery search space is configured the beam failure recovery response is transmitted in beam failure recovery search space. As described above, the term 'SpCell' may refer to PCell if the serving cell from which beam failure recovery request is received belongs to MCG or PSCell if the serving cell from which the beam failure recovery request is received belongs to SCG.

Method 3

Figure 5:
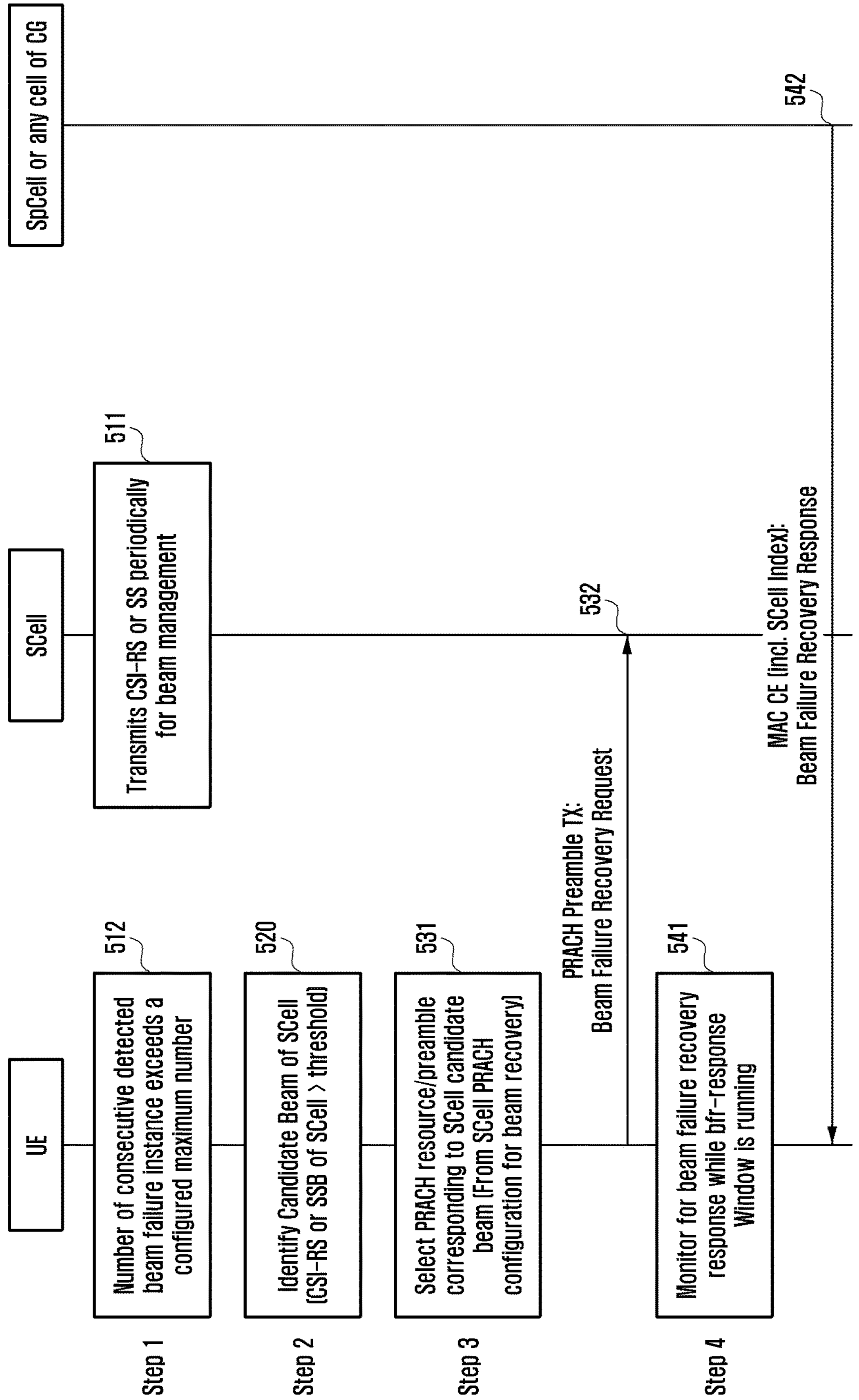
FIG. 5 illustrates beam failure recovery procedure for SCell based on Method 3 according to an embodiment of the disclosure.

FIG. 5 illustrates beam failure recovery procedure for SCell (i.e., secondary cell other than the PSCell) based on Method 3 according to an embodiment of the disclosure.

For beam failure recovery on SCell, it is proposed that UE is configured with dedicated PRACH preambles and/or PRACH occasions for beam failure recovery on SCell. This configuration can be provided to UE in RRC message. In case UE is configured with multiple SCells, this configuration can be provided independently for each SCell on which beam failure recovery is needed. This is a significant change from the existing system wherein PRACH preambles and/or PRACH occasions for beam failure recovery are only provided for SpCell. PRACH preamble(s) and/or PRACH occasion(s) of SCell for beam failure recovery are associated to beams (i.e., SSBs or CSI RSs) of that SCell. The beamFailureRecoveryConfig IE which is used to configure the UE with RACH resources (i.e., preambles/PRACH occasions) and candidate beams for beam failure recovery in case of beam failure detection can be included for one or more SCells in RRCReconfiguration message (sent by gNB to UE).

Beam Failure Detection (Step 1): The SCell transmits SSs or CSI-RSs periodically for beam management at operation 511. UE monitors SSs or CSI-RSs transmitted periodically by the SCell to assess if a beam failure trigger condition has been met and also to identify a new candidate beam. The signal (SS or CSI-RS) to measure for detecting beam failure on an SCell can be configured by gNB in RRCReconfiguration message. The UE detects a beam failure on SCell if number of detected beam failure instances within a defined time duration (beamFailureDetectionTimer) exceeds a configured maximum number (pre-defined or signaled to UE by gNB in RRC message) at operation 512. A Beam Failure Instance means that all serving beam fails (i.e., hypothetical PDCCH BLER determined based on measurement of SS or CSI-RS is above a threshold).

Candidate Beam Selection (Step 2): For beam failure recovery on SCell, it is proposed that UE is configured with dedicated PRACH preambles and/or PRACH occasions on SCell. This configuration can be provided to UE in RRC message. The UE identifies candidate beam of SCell at operation 520. PRACH preamble and/or PRACH occasions of SCell for beam failure recovery are associated to beams (i.e., SSB or CSI RS) of that SCell. The UE may identify the SS blocks with SS-RSRP above rsrp-ThresholdSSB among the SS blocks in candidateBeamRSList or the CSI-RSs with CSI-RSRP above csirs-dedicatedRACH-Threshold among the CSI-RSs in candidateBeamRSList. If at least one of the SS blocks with SS-RSRP above rsrp-ThresholdSSB among the SS blocks in candidateBeamRSList or the CSI-RSs with CSI-RSRP above csirs-dedicatedRACH-Threshold among the CSI-RSs in candidateBeamRSList is available: UE selects an SS block with SS-RSRP above rsrp-ThresholdSSB among the SS blocks in candidateBeamRSList or a CSI-RS with CSI-RSRP above csirs-dedicatedRACH-Threshold among the CSI-RSs in candidateBeamRSList. candidateBeamRSList, csirs-dedicatedRACH-Threshold and rsrp-ThresholdSSB are signaled by gNB to UE.

Beam Failure Recovery Request Transmission (Step 3): For Beam Failure Recovery Request Transmission for recovering beam of SCell, it is proposed that UE select PRACH preamble corresponding to the selected SS block or CSI-RS from the set of Random Access Preambles configured for beam failure recovery request transmission on SCell at operation 531. If multiple PRACH preambles are mapped to selected SS block or CSI-RS, UE selects one PRACH preamble randomly from the mapped PRACH preambles. UE selects the next available PRACH occasion corresponding to the selected SS block or CSI-RS permitted by the restrictions given by the ra-ssb-OccasionMaskIndex (ra-ssb-OccasionMaskIndex indicates which of the RACH occasions among the RACH occasions corresponding to a selected SS block or CSI-RS UE is allowed to use) if configured from the set of Random Access Occasions for beam failure recovery request transmission on SCell at operation 531. UE then transmits selected PRACH preamble over the selected PRACH occasion of SCell at operation 532. After reception of the Beam Failure Recovery Request from a UE, the SCell shall share this information with SpCell.

Beam Failure Recovery Request Response (Step 4): For receiving response for Beam Failure Recovery Request transmitted by UE for recovering beam of SCell, it is proposed that UE start the bfr-ResponseWindow (i.e., ra-response Window configured in beam failure recovery configuration) and monitor for beam failure recovery response while bfr-ResponseWindow is running at operation 541. UE may monitor PDCCH in beam failure recovery search space, if configured.

In an embodiment, beam failure recovery response is a MAC Control Element (CE) and includes the SCell Index of SCell for which beam recovery request was transmitted. In an embodiment $C_i$ field in MAC CE may be included. If there is an SCell configured for the MAC entity with SCellIndex i this field set to one indicates the beam failure recovery response of the SCell with SCellIndex i. A Logical Identifier (LCID) is reserved for beam failure recovery response MAC CE. The LCID in MAC subheader is set to this LCID for beam failure recovery response MAC CE. The MAC CE may also include candidate beam information, i.e., SSB ID or CSI-RS ID. If the UE receives the beam failure recovery response MAC CE including the SCell Index of SCell for which beam recovery request was transmitted while bfr-ResponseWindow is running at operation 542, Beam Failure Recovery is considered successfully completed (or random access procedure is successfully completed).

In another embodiment, beam failure recovery response can be a RRC message and includes the SCell Index of SCell for which beam recovery request was transmitted. The RRC message may also include candidate beam information, i.e., SSB ID or CSI-RS ID. If the UE receives the beam failure recovery response including the SCell Index of SCell for which beam recovery request was transmitted while bfr-ResponseWindow is running Beam Failure Recovery is considered successfully completed (or random access procedure is successfully completed).

In another embodiment, beam failure recovery response can be a PDCCH addressed to C-RNTI including Downlink Control Information (DCI) indicating beam failure recovery response and includes the SCell Index of SCell for which beam failure recovery request was transmitted. The DCI may also include candidate beam information, i.e., SSB ID or CSI-RS ID. If the UE receives the PDCCH addressed to C-RNTI including DCI indicating beam failure recovery response and includes the SCell Index of SCell for which beam failure recovery request was transmitted while bfr-ResponseWindow is running Beam Failure Recovery is considered successfully completed (or random access procedure is successfully completed).

It is to be noted that SCell Index may not be needed in beam failure recovery response if the SCell for which beam failure recovery is initiated is the only SCell in its CG. Or, in another embodiment, the SCell Index may not be needed in beam failure recovery response transmitted by SCell if it is the same SCell as the UE transmits the beam failure recovery request. The beam failure recovery response can be transmitted by gNB from SpCell or any cell of the CG.

In order for this Beam Failure Recovery Response transmission from SpCell, the SCell can generate or approve the Beam Failure Recovery Response for the specific UE, using the information of the current SCell status and the specific UE measurement which is transmitted by UE and shared by SCell to the SpCell. Or, in another embodiment, the SpCell can generate the Beam Failure Recovery Response for the specific UE, using the information of the current SCell status and the specific UE measurement which is shared by SCell.

If the bfr-ResponseWindow is expired, UE performs Steps 2 to 4 again. If the bfr-ResponseWindow is expired and UE has already transmitted PRACH preamble for configured number of times, Beam Failure Recovery Request (or random access) procedure is considered unsuccessful and UE may trigger radio link failure.

Figure 6A:
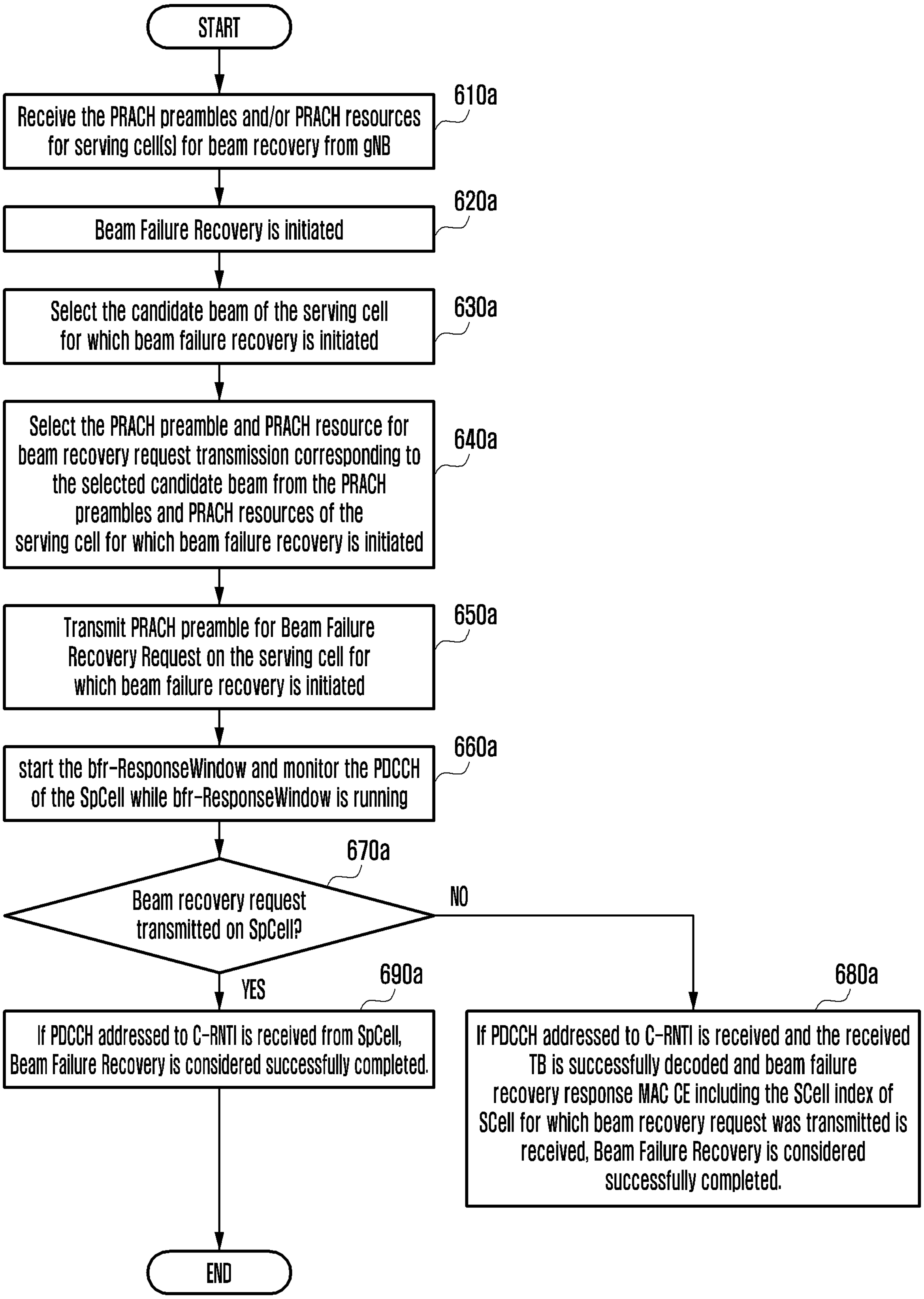
FIG. 6A illustrates a generalized UE procedure for beam failure recovery for any serving cell based on Method 3 according to an embodiment of the disclosure.
Figure 6B:
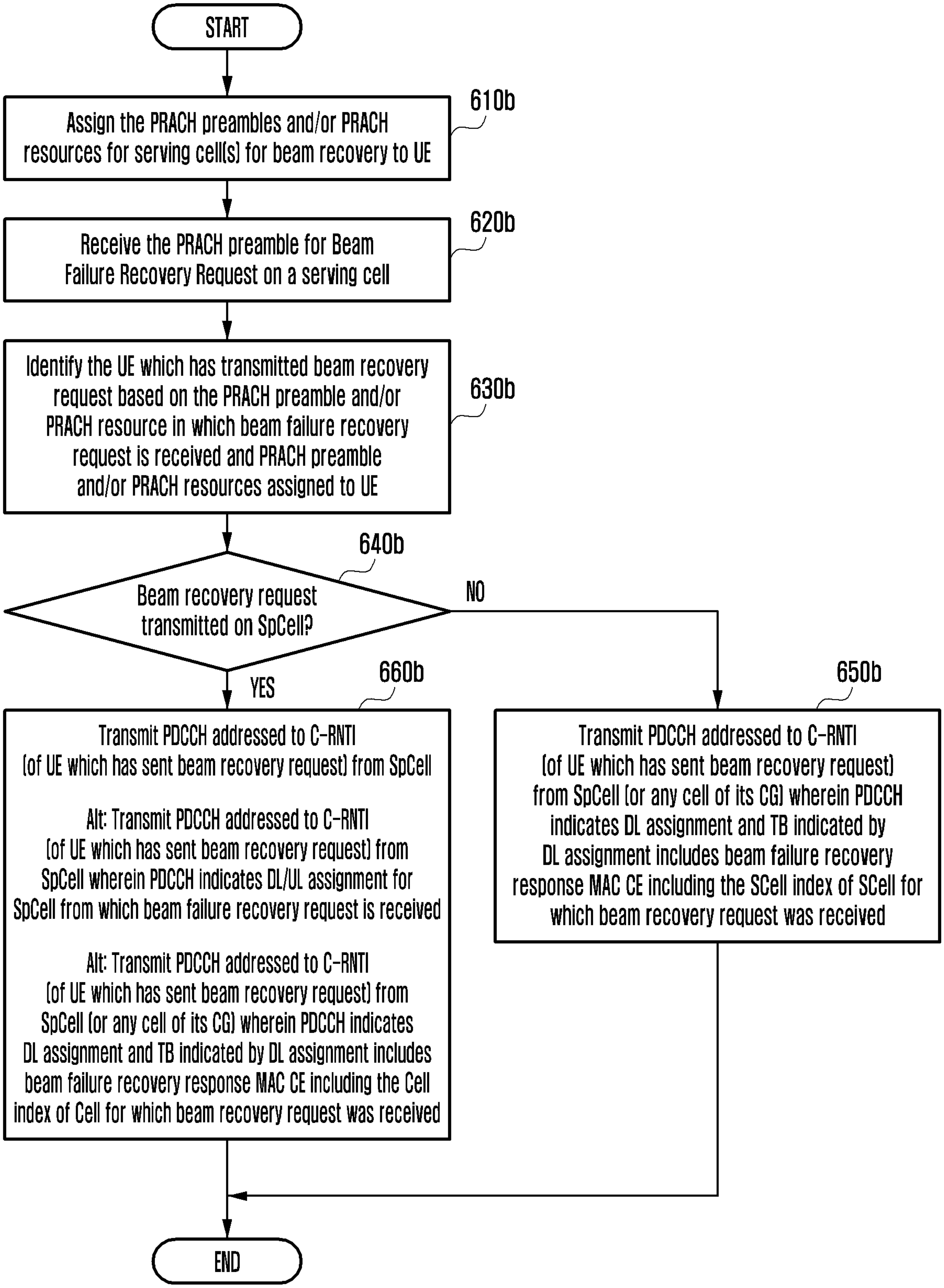
FIG. 6B illustrates the gNB procedure for beam failure recovery for any serving cell based on Method 3 according to an embodiment of the disclosure.

FIGS. 6A and 6B illustrate a generalized UE procedure and the gNB procedure for beam failure recovery for any serving cell based on the above procedure proposed for recovering beam failure.

Referring to FIG. 6A, a UE receives the PRACH preambles and/or PRACH occasions for serving cell(s) for beam failure recovery from gNB at operation 610*a*. First configuration information on PRACH preambles and/or PRACH occasions for SpCell beam failure recovery and second configuration information on PRACH preambles and/or PRACH occasions for SCell beam failure recovery may be received from gNB. If beam failure recovery is initiated at operation 620*a*, the UE selects the candidate beam of the serving cell for which beam failure recovery is initiated at operation 630*a*, selects the PRACH preamble and PRACH occasion for beam failure recovery request transmission corresponding to the selected candidate beam from the PRACH preambles and PRACH occasions of the serving cell for which beam failure recovery is initiated at operation 640*a*, and transmits a PRACH preamble for beam failure recovery request on the serving cell for which beam failure recovery is initiated at operation 650*a*. If SCell beam failure recovery is triggered at operation 620*a*, the UE may select the candidate beam of SCell at operation 630*a*, select the PRACH preamble and PRACH occasion for beam failure recovery request transmission corresponding to the selected candidate beam from the PRACH preambles and PRACH occasions of SCell at operation 640*a*, and transmit a PRACH preamble for beam failure recovery request on SCell at operation 650*a*. The UE starts the bfr-Response-Window and monitors the PDCCH of the SpCell while bfr-ResponseWindow is running at operation 660*a*. In case of beam failure recovery request transmitted on SCell, if the beam failure recovery response is received on the PDCCH addressed to C-RNTI and the received Transport Block (TB) is successfully decoded and beam failure recovery response MAC CE including the SCell index of SCell for which beam failure recovery request was transmitted is received, SCell beam failure recovery is considered successfully completed at operation 670*a*. In case of beam failure recovery request transmitted on SpCell, if the beam failure recovery response is received on the PDCCH addressed to C-RNTI from SpCell, SpCell beam failure recovery is considered successfully completed at operation 680*a*. Alternatively, if the beam failure recovery response is received on the PDCCH addressed to C-RNTI and the received TB is successfully decoded and beam failure recovery response MAC CE including the cell index of SpCell for which beam failure recovery request was transmitted is received, SpCell beam failure recovery is considered successfully completed. Alternatively, if the beam failure recovery response is received on the PDCCH addressed to C-RNTI indicating DL/UL assignment, SpCell beam failure recovery is considered successfully completed.

Referring to FIG. 6B, a gNB assigns the PRACH preambles and/or PRACH occasions for serving cell(s) for beam failure recovery to UE at operation 610*b*. The gNB may transmit first configuration information on PRACH preambles and/or PRACH occasions for SpCell beam failure recovery and second configuration information on PRACH preambles and/or PRACH occasions for SCell beam failure recovery to UE. The gNB receives the PRACH preamble for beam failure recovery request on a serving cell at operation 620*b*, and identifies the UE which has transmitted beam failure recovery request based on the PRACH preamble and/or PRACH occasion in which beam failure recover request is received and PRACH preamble and/or PRACH occasions assigned to UE at operation 630*b*. If SpCell beam failure recovery is triggered, the gNB may receive beam failure recovery request on SpCell configured RACH resource. Else if SCell beam failure recovery is triggered, the gNB may receive beam failure recovery request on SCell configured RACH resource. If the beam failure recovery request is received on SCell, the gNB transmits a beam failure recovery response on PDCCH addressed to C-RNTI of UE which has sent the beam failure recovery request from SpCell (or any cell of its CG) wherein the PDCCH indicates DL assignment and TB indicated by the DL assignment includes beam failure recovery response MAC CE including the SCell index of SCell for which the beam failure recovery request was received at operation 640*b*. If the beam failure recovery request is received on SpCell, the gNB transmits a beam failure recovery response on PDCCH addressed to C-RNTI of UE which has sent the beam failure recovery request from SpCell at operation 650*b*. The PDCCH may indicate DL/UL assignment for SpCell from which beam failure recovery request is received. Alternatively, if the beam failure recovery request is received on SpCell, the gNB transmits a beam failure recovery response on PDCCH addressed to C-RNTI (of UE which has sent the beam failure recovery request) from SpCell (or any cell of its CG) wherein PDCCH indicates DL assignment and TB indicated by the DL assignment includes beam failure recovery response MAC CE including the cell index of cell for which beam failure recovery request was received.

Method 4

Figure 7:
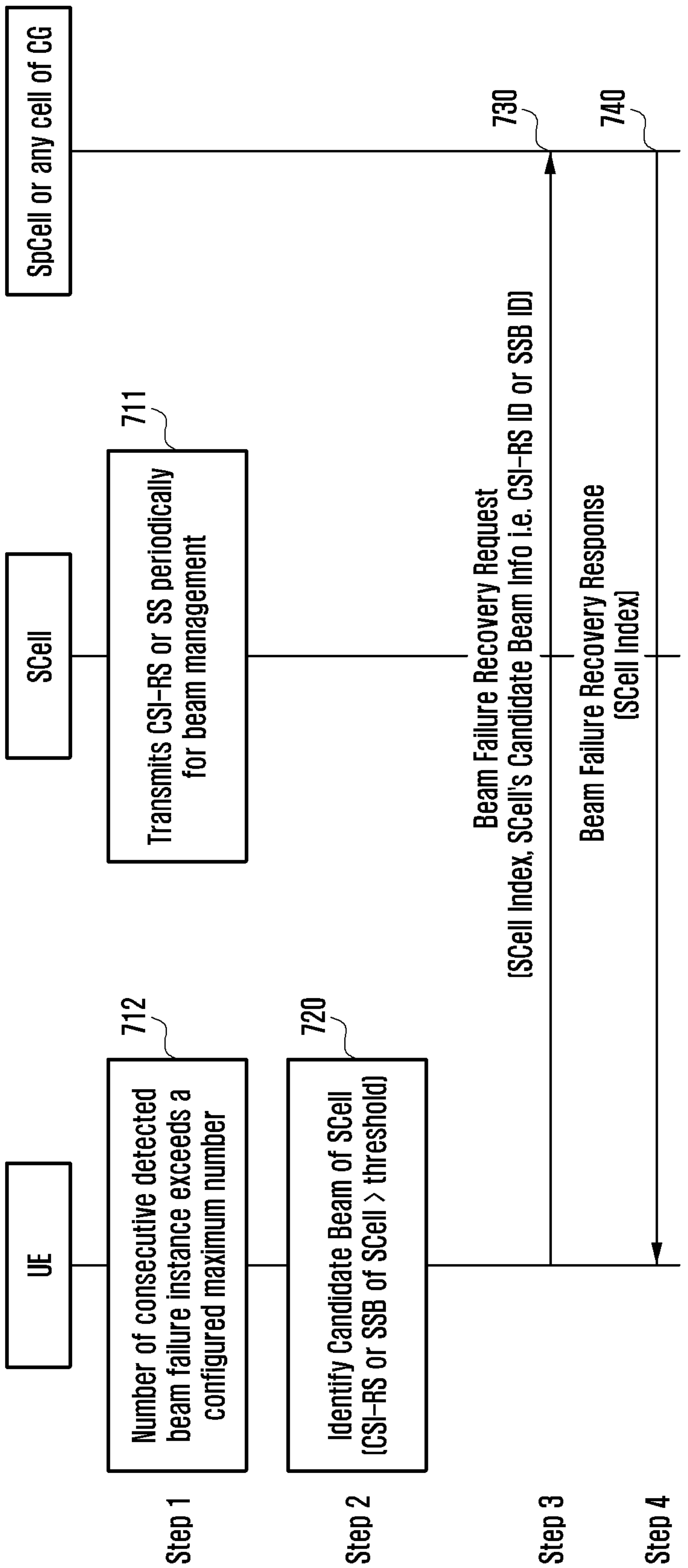
FIG. 7 illustrates beam failure recovery procedure for SCell based on Method 4 according to an embodiment of the disclosure.

FIG. 7 illustrates beam failure recovery procedure for SCell based on Method 4 according to an embodiment of the disclosure.

Beam Failure Detection (Step 1): The SCell transmits SSs or CSI-RSs periodically for beam management at operation 711. UE monitors SSs or CSI-RSs transmitted periodically by the SCell to assess if a beam failure trigger condition has been met and also to identify a new candidate beam. The signal (SS or CSI-RS) to measure for detecting beam failure on an SCell can be configured by gNB in RRCReconfiguration message. The UE detects a beam failure on SCell if number of detected beam failure instances within a defined time duration (beamFailureDetectionTimer) exceeds a configured maximum number (pre-defined or signaled to UE by gNB in RRC message) at operation 712. A Beam Failure Instance means that all serving beam fails (i.e., hypothetical PDCCH BLER determined based on measurement of SS or CSI-RS is above a threshold).

Candidate Beam Selection (Step 2): The UE identifies candidate beam of SCell at operation 720. The UE may identify an SS blocks with SS-RSRP above rsrp-ThresholdSSB or a CSI-RSs with CSI-RSRP above csirs-dedicatedRACH-Threshold, and may select the SS block with SS-RSRP above rsrp-ThresholdSSB or the CSI-RS with CSI-RSRP above csirs-dedicatedRACH-Threshold. csirs-dedicatedRACH-Threshold and rsrp-ThresholdSSB are signaled by gNB to UE for SCell.

Beam Failure Recovery Request Transmission (Step 3): For Beam Failure Recovery Request Transmission for recovering beam of SCell, it is proposed that UE transmits a Beam Failure Recovery Request MAC CE at operation 730. The MAC CE includes the SCell index of the SCell for which beam failure recovery is initiated and MAC CE also includes one or more CSI-RS ID or SSB ID of selected SSB or CSI-RS. In an embodiment $C_i$ field in MAC CE may be included. If there is an SCell configured for the MAC entity with SCellIndex i this field set to one indicates the beam failure recovery request of the SCell with SCellIndex i. An LCID is reserved for beam failure recovery request MAC CE. The LCID in MAC subheader is set to this LCID for beam failure recovery request MAC CE. It is to be noted that MAC entity can send Beam Failure Recovery Request to gNB via any cell of its Cell group. In an embodiment, Beam Failure Recovery Request can be a RRC message instead of MAC CE.

Beam Failure Recovery Request Response (Step 4): For receiving response for Beam Failure Recovery Request transmitted by UE for recovering beam of SCell, it is proposed that UE start the bfr-ResponseWindow (i.e., ra-response Window configured in beam failure recovery configuration) and monitor for beam failure recovery response while bfr-ResponseWindow is running at operation 740.

In an embodiment, beam failure recovery response is a MAC CE and includes the SCell Index of SCell for which beam recovery request was transmitted. In an embodiment $C_i$ field in MAC CE may be included. If there is an SCell configured for the MAC entity with SCellIndex i this field set to one indicates the beam failure recovery response of the SCell with SCellIndex i. An LCID is reserved for beam failure recovery response MAC CE. The LCID in MAC subheader is set to this LCID for beam failure recovery response MAC CE. MAC CE may also include candidate beam information, i.e., SSB ID or CSI RS ID. If the UE receives the beam failure recovery response MAC CE including the SCell Index of SCell for which beam recovery request was transmitted while bfr-ResponseWindow is running, Beam Failure Recovery is considered successfully completed and beamFailureRecoveryTimer is stopped.

In another embodiment, beam failure recovery response can be a RRC message and includes the SCell Index of SCell for which beam recovery request was transmitted. RRC message may also include candidate beam information, i.e., SSB ID or CSI RS ID. If the UE receives the beam failure recovery response including the SCell Index of SCell for which beam recovery request was transmitted while bfr-ResponseWindow is running Beam Failure Recovery is considered successfully completed.

In another embodiment, beam failure recovery response can be a PDCCH addressed to C-RNTI including DCI indicating beam failure recovery response and includes the SCell Index of SCell for which beam recovery request was transmitted. DCI may also include candidate beam information, i.e., SSB ID or CSI RS ID. If the UE receives the PDCCH addressed to C-RNTI including DCI indicating beam failure recovery response and includes the SCell Index of SCell for which beam recovery request was transmitted while bfr-ResponseWindow is running Beam Failure Recovery is considered successfully completed (or random access procedure is successfully completed).

It is to be noted that SCell Index may not be needed in beam failure recovery response if the SCell for which beam recovery is initiated is the only SCell in its CG. Or, in another embodiment, the SCell Index may not be needed in beam failure recovery response transmitted by SCell if it is the same SCell as the UE transmits the beam failure recovery request. The beam failure recovery response can be transmitted by gNB from SpCell or any cell of the CG.

If the bfr-ResponseWindow is expired, UE performs Steps 2 to 4 again. If the bfr-ResponseWindow is expired and UE has already transmitted beam failure recovery request for configured number of times, Beam Failure Recovery Request procedure is considered unsuccessful and UE may trigger radio link failure.

Figure 8:
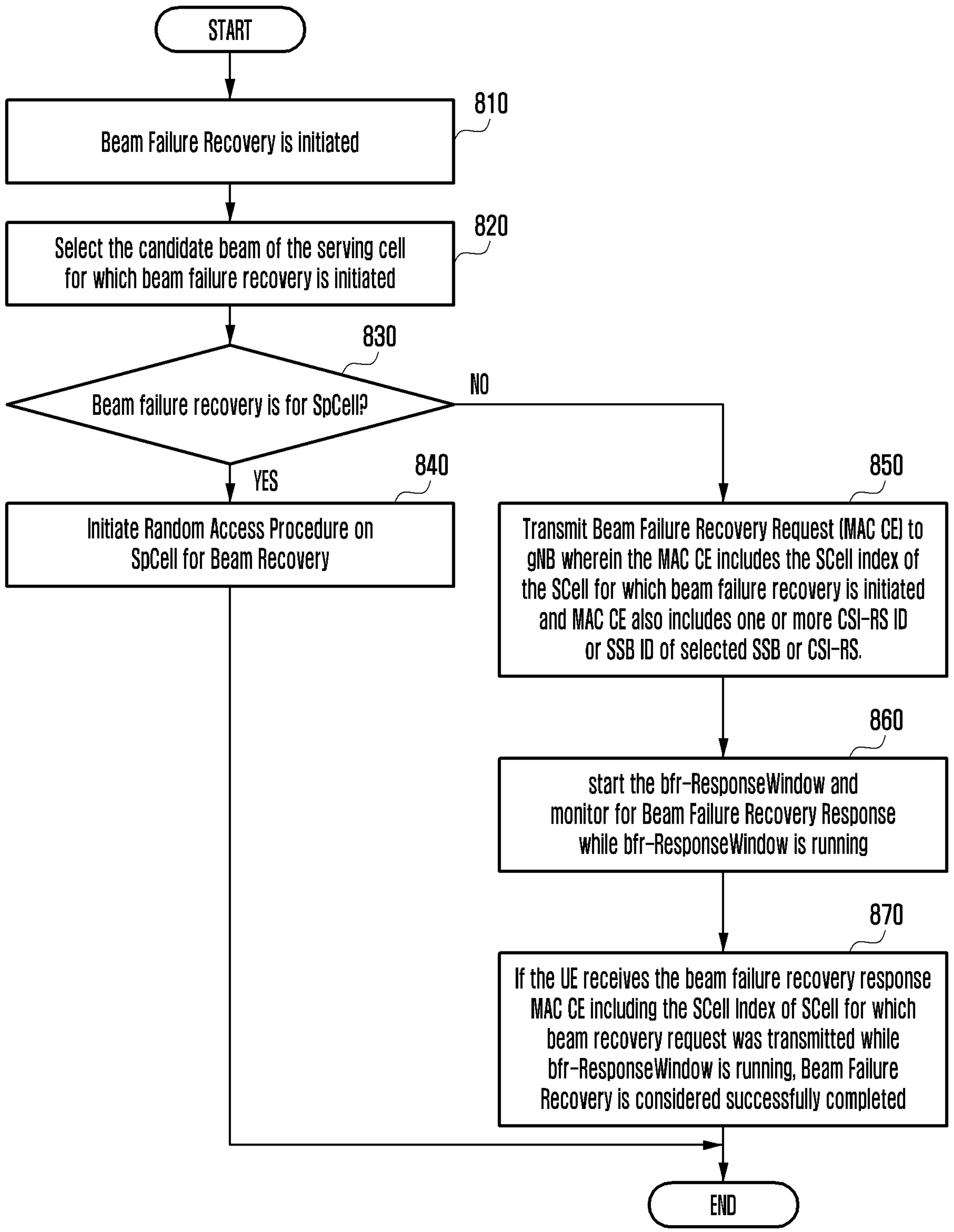
FIG. 8 illustrates a generalized procedure for beam failure recovery for any serving cell based on Method 4 according to an embodiment of the disclosure.

FIG. 8 illustrates a generalized procedure for beam failure recovery for any serving cell based on the above procedure proposed for recovering beam failure.

Referring to FIG. 8, if beam failure recovery is initiated at operation 810, a UE selects the candidate beam of the serving cell for which beam failure recovery is initiated at operation 820, and determines whether beam failure recovery is for SpCell at operation 830. If beam failure recovery is for SpCell, the UE initiates random access procedure on SpCell for beam failure recovery at operation 840.

If beam failure recovery is for SCell, the UE transmit beam failure recovery request (MAC CE) to gNB at operation 850. The MAC CE may include the SCell index of the SCell for which beam failure recovery is initiated. The MAC CE may also include one or more CSI-RS ID or SSB ID of the selected SSB or CSI-RS. The UE starts the bfr-ResponseWindow (i.e., ra-response Window configured in beam failure recovery configuration) and monitors for beam failure recovery response while bif-ResponseWindow is running at operation 860. If the UE receives the beam failure recovery response MAC CE including the SCell index of SCell for which beam failure recovery request was transmitted while bfr-ResponseWindow is running, beam failure recovery is considered successfully completed at operation 870.

Method 5

Figure 9:
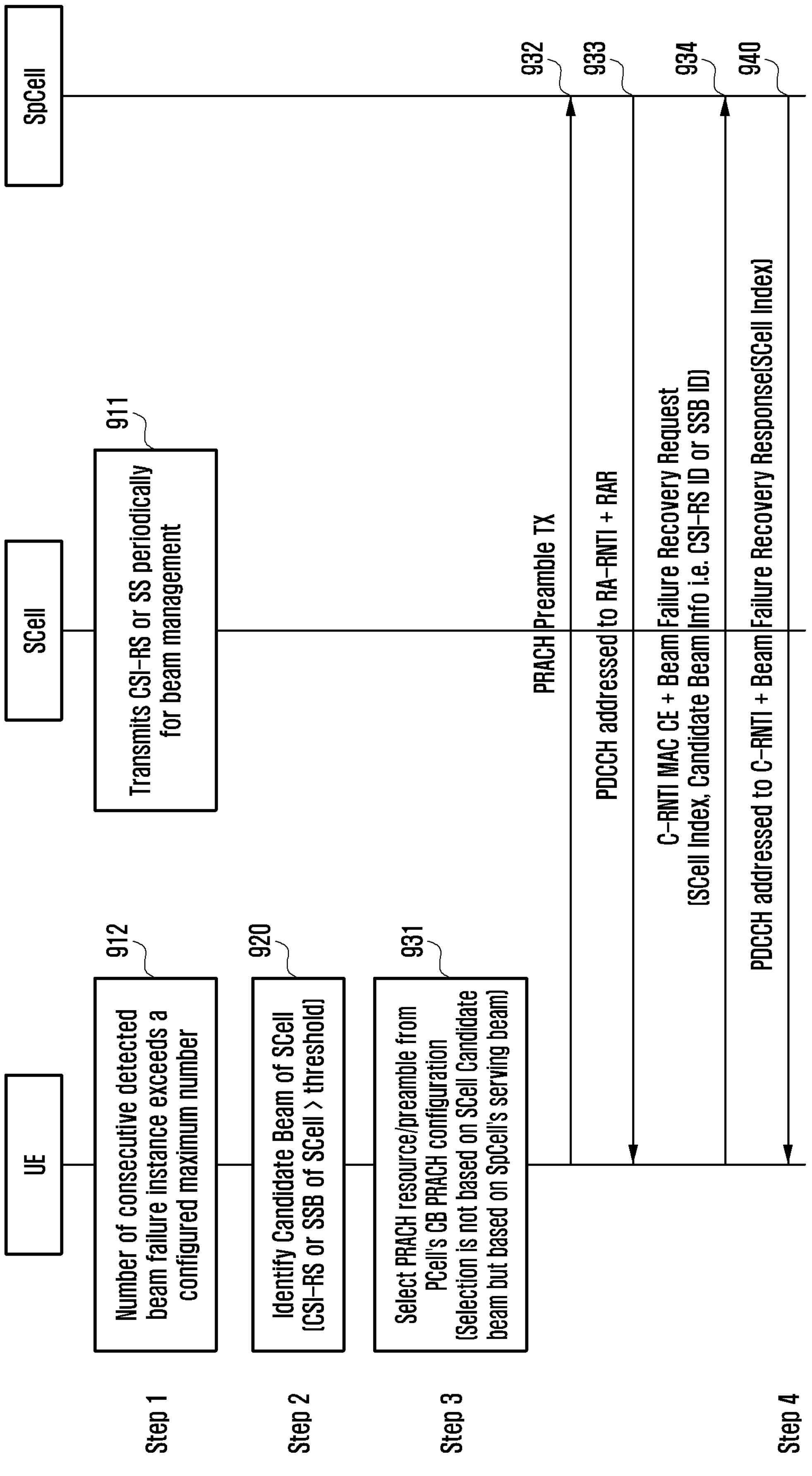
FIG. 9 illustrates beam failure recovery procedure for SCell using the contention-based Random Access Channel (RACH) on Special Cell (SpCell) based on Method 5 according to an embodiment of the disclosure.

FIG. 9 illustrates beam failure recovery procedure for SCell using the contention-based RACH on SpCell based on Method 5 according to an embodiment of the disclosure.

Beam Failure Detection (Step 1): The SCell transmits SSs or CSI-RSs periodically for beam management at operation 911. UE monitors SSs or CSI-RSs transmitted periodically by the SCell to assess if a beam failure trigger condition has been met and also to identify a new candidate beam. The signal (SS or CSI-RS) to measure for detecting beam failure on an SCell can be configured by gNB in RRCReconfiguration message. The UE detects a beam failure on SCell if number of detected beam failure instances within a defined time duration (beamFailureDetectionTimer) exceeds a configured maximum number (pre-defined or signaled to UE by gNB in RRC message) at operation 912. A Beam Failure Instance means that all serving beam fails (i.e., hypothetical PDCCH BLER determined based on measurement of SS or CSI-RS is above a threshold).

Candidate Beam Selection (Step 2): The UE identifies candidate beam of SCell at operation 920. The UE may identify an SS blocks with SS-RSRP above rsrp-ThresholdSSB or a CSI-RSs with CSI-RSRP above csirs-dedicatedRACH-Threshold, and may select the SS block with SS-RSRP above rsrp-ThresholdSSB or the CSI-RS with CSI-RSRP above csirs-dedicatedRACH-Threshold. csirs-dedicatedRACH-Threshold and rsrp-ThresholdSSB are signaled by gNB to UE for SCell.

Beam Failure Recovery Request Transmission (Step 3):

For Beam Failure Recovery Request Transmission for recovering beam of SCell, it is proposed that UE transmits a Beam Failure Recovery Request MAC CE. Here it is assumed that UL grant is not available for transmitting the Beam Failure Recovery Request. So UE initiates the contention based (CB) random access procedure.

Specifically, the UE selects PRACH preamble and/or PRACH occasion from PCell's CB PRACH configuration at operation 931. Selection is not based on SCell candidates beam but based on SpCell's serving beam. The UE transmits a PRACH preamble to SpCell at operation 932, and receives a random access response (RAR) on a PDCCH addressed to RA-RNTI from SpCell at operation 933. In the UL grant received in RAR, UE transmits Beam Failure Recovery Request at operation 934. In the UL grant received in RAR, UE also transmits C-RNTI MAC CE at operation 934. In an embodiment, the beam failure recovery request is a e MAC CE which include the SCell index of the SCell for which beam failure recovery is initiated and the MAC CE may also include one or more CSI-RS ID or SSB ID of selected SSB or CSI-RS. It is to be noted that MAC entity can send Beam Failure Recovery Request to gNB via any cell of its Cell group. In an embodiment, Beam Failure Recovery Request can be a RRC message instead of MAC CE.

Beam Failure Recovery Request Response (Step 4): After transmitting the Beam Failure Recovery Request in UL grant received in RAR at operation 934, contention resolution timer is started. UE monitors for beam failure recovery response while contention resolution timer is running at operation 940.

In an embodiment, beam failure recovery response is a MAC CE and includes the SCell Index of SCell for which beam recovery request was transmitted. In an embodiment $C_i$ field in MAC CE may be included. If there is an SCell configured for the MAC entity with SCellIndex i this field set to one indicates the beam failure recovery response of the SCell with SCellIndex i. An LCID is reserved for beam failure recovery response MAC CE. The LCID in MAC subheader is set to this LCID for beam failure recovery response MAC CE. MAC CE may also include candidate beam information, i.e., SSB ID or CSI RS ID. If the UE receives the beam failure recovery response MAC CE including the SCell Index of SCell for which beam recovery request was transmitted while contention resolution timer is running, Beam Failure Recovery is considered successfully completed.

In another embodiment, beam failure recovery response can be a RRC message and includes the SCell Index of SCell for which beam recovery request was transmitted. RRC message may also include candidate beam information, i.e., SSB ID or CSI RS ID. If the UE receives the beam failure recovery response including the SCell Index of SCell for which beam recovery request was transmitted while contention resolution timer is running Beam Failure Recovery is considered successfully completed.

In another embodiment, beam failure recovery response can be a PDCCH addressed to C-RNTI including DCI indicating beam failure recovery response and includes the SCell Index of SCell for which beam failure recovery request was transmitted. DCI may also include candidate beam information, i.e., SSB ID or CSI RS ID. If the UE receives the PDCCH addressed to C-RNTI including DCI indicating beam failure recovery response and includes the SCell Index of SCell for which beam failure recovery request was transmitted while contention resolution timer is running Beam Failure Recovery is considered successfully completed (or random access procedure is successfully completed).

It is to be noted that SCell Index may not be needed in beam failure recovery response if the SCell for which beam recovery is initiated is the only SCell in its CG. Or, in another embodiment, the SCell Index may not be needed in beam failure recovery response if it is the same SCell as the UE transmits the beam failure recovery request.

If the contention resolution timer is expired, UE performs Steps 2 to 4 again. If the contention resolution timer is expired and UE has already transmitted beam failure recovery request for configured number of times, Beam Failure Recovery Request procedure is considered unsuccessful and UE may trigger radio link failure.

Method 6

Figure 10:
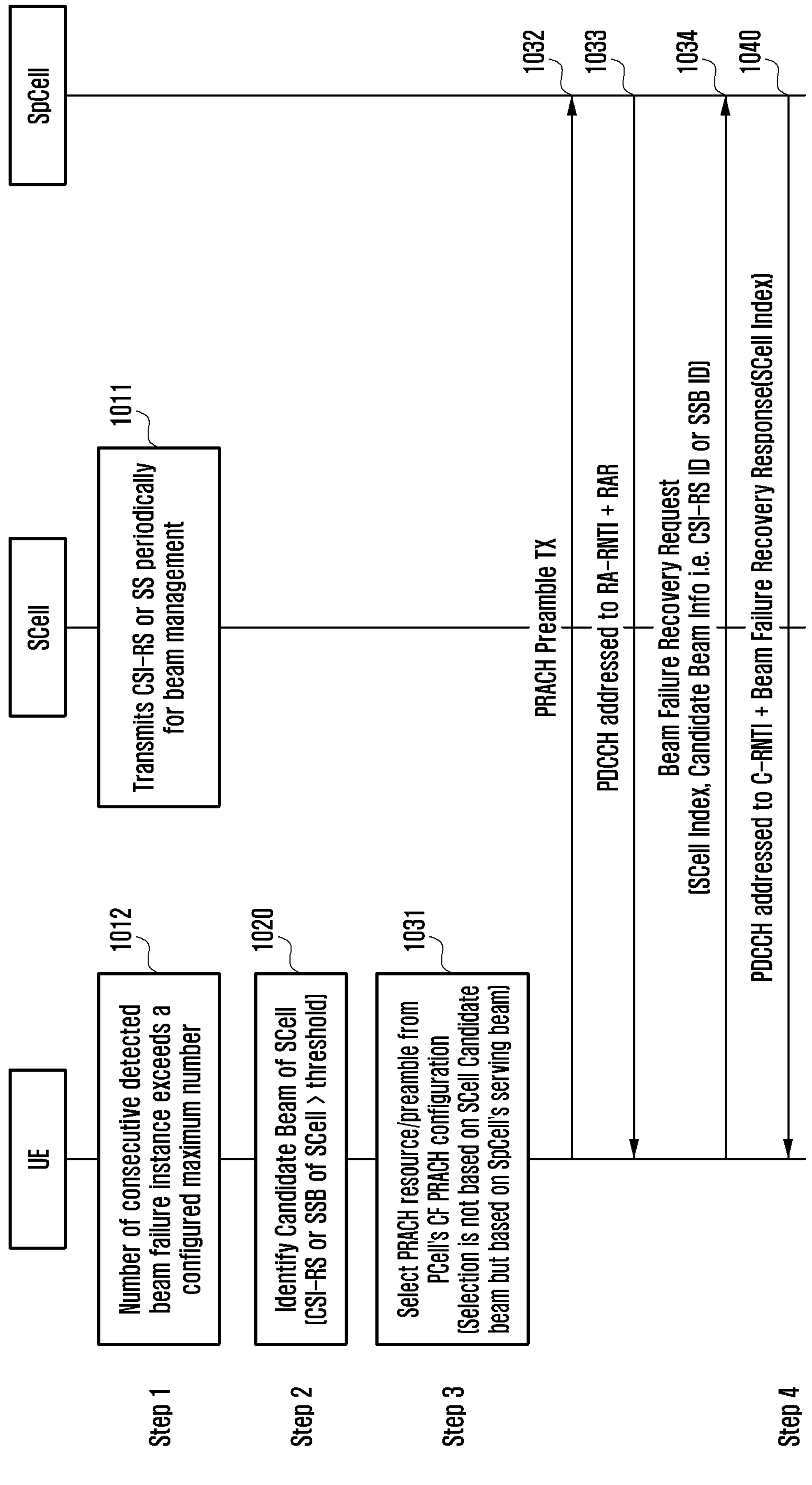
FIG. 10 illustrates beam failure recovery procedure for SCell based on Method 6 according to an embodiment of the disclosure.

FIG. 10 illustrates beam failure recovery procedure for SCell based on Method 6 according to an embodiment of the disclosure.

Beam Failure Detection (Step 1): The SCell transmits SSs or CSI-RSs periodically for beam management at operation 1011. UE monitors SSs or CSI-RSs transmitted periodically by the SCell to assess if a beam failure trigger condition has been met and also to identify a new candidate beam. The signal (SS or CSI-RS) to measure for detecting beam failure on an SCell can be configured by gNB in RRCReconfiguration message. The UE detects a beam failure on SCell if number of detected beam failure instances within a defined time duration (beamFailureDetectionTimer) exceeds a configured maximum number (pre-defined or signaled to UE by gNB in RRC message) at operation 1012. A Beam Failure Instance means that all serving beam fails (i.e., hypothetical PDCCH BLER determined based on measurement of SS or CSI-RS is above a threshold).

Candidate Beam Selection (Step 2): The UE identifies candidate beam of SCell at operation 1020. The UE may identify an SS blocks with SS-RSRP above rsrp-ThresholdSSB or a CSI-RSs with CSI-RSRP above csirs-dedicatedRACH-Threshold, and may select the SS block with SS-RSRP above rsrp-ThresholdSSB or the CSI-RS with CSI-RSRP above csirs-dedicatedRACH-Threshold. csirs-dedicatedRACH-Threshold and rsrp-ThresholdSSB are signaled by gNB to UE for SCell.

Beam Failure Recovery Request Transmission (Step 3):

For Beam Failure Recovery Request Transmission for recovering beam of SCell, it is proposed that UE transmits a Beam Failure Recovery Request MAC CE.

Here it is assumed that UL grant is not available for transmitting the Beam Failure Recovery Request. So UE initiates the contention free random access procedure. UE is assigned contention free (CF) RACH resources for beam failure recovery. Specifically, the UE selects PRACH preamble and/or PRACH occasion from PCell's CF PRACH configuration at operation 1031. Selection is not based on SCell candidates beam but based on SpCell's serving beam. The UE transmits a PRACH preamble to SpCell at operation 1032, and receives a RAR on a PDCCH addressed to RA-RNTI from SpCell at operation 1033. In the UL grant received in RAR, UE transmits Beam Failure Recovery Request at operation 1034. In an embodiment, the beam failure recovery request is a MAC CE and the MAC CE may include the SCell index of the SCell for which beam failure recovery is initiated and the MAC CE may also include one or more CSI-RS ID or SSB ID of selected SSB or CSI-RS. It is to be noted that MAC entity can send Beam Failure Recovery Request to gNB via any cell of its Cell group. In an embodiment, Beam Failure Recovery Request can be a RRC message instead of MAC CE.

Beam Failure Recovery Request Response (Step 4): After transmitting the Beam Failure Recovery Request in UL grant received in RAR at operation 1034, UE monitors for beam failure recovery response at operation 1040.

In an embodiment, beam failure recovery response is a MAC CE and includes the SCell Index of SCell for which beam recovery request was transmitted. In an embodiment $C_i$ field in MAC CE may be included. If there is an SCell configured for the MAC entity with SCellIndex i this field set to one indicates the beam failure recovery response of the SCell with SCellIndex i. An LCID is reserved for beam failure recovery response MAC CE. The LCID in MAC subheader is set to this LCID for beam failure recovery response MAC CE. MAC CE may also include candidate beam information, i.e., SSB ID or CSI RS ID. If the UE receives the beam failure recovery response MAC CE including the SCell Index of SCell for which beam recovery request was transmitted Beam Failure Recovery is considered successfully completed.

In another embodiment, beam failure recovery response can be a RRC message and includes the SCell Index of SCell for which beam recovery request was transmitted. RRC message may also include candidate beam information, i.e., SSB ID or CSI RS ID. If the UE receives the beam failure recovery response including the SCell Index of SCell for which beam recovery request was transmitted Beam Failure Recovery is considered successfully completed.

In another embodiment, beam failure recovery response can be a PDCCH addressed to C-RNTI including DCI indicating beam failure recovery response and includes the SCell Index of SCell for which beam recovery request was transmitted. DCI may also include candidate beam information, i.e., SSB ID or CSI RS ID. If the UE receives the PDCCH addressed to C-RNTI including DCI indicating beam failure recovery response and includes the SCell Index of SCell for which beam recovery request was transmitted Beam Failure Recovery is considered successfully completed (or random access procedure is successfully completed).

It is to be noted that SCell Index may not be needed in beam failure recovery response if the SCell for which beam recovery is initiated is the only SCell in its CG.

Method 7

Figure 11:
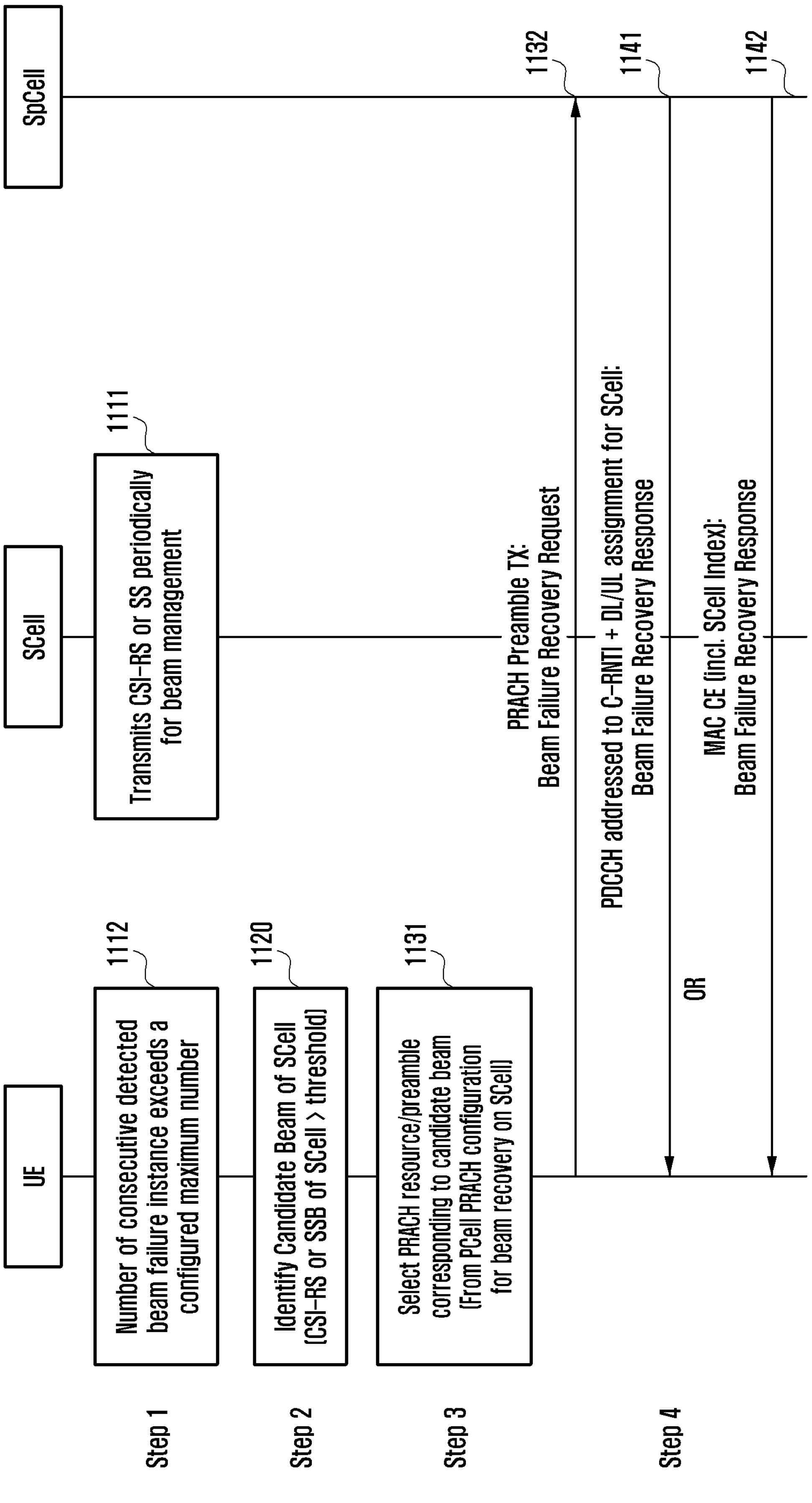
FIG. 11 illustrates beam failure recovery procedure for SCell based on Method 7 according to an embodiment of the disclosure.

FIG. 11 illustrates beam failure recovery procedure for SCell based on Method 7 according to an embodiment of the disclosure.

For beam failure recovery on SCell, it is proposed that UE is configured with PRACH preambles and/or PRACH occasions on SpCell for SCell(s). This configuration can be provided to UE in RRC message. This is a significant change from the existing system wherein PRACH preambles and PRACH occasions of SpCell for beam failure recovery are only provided for SpCell, i.e., mapped to beam (i.e., SSBs or CSI RSs of SpCell). For beam failure recovery on SCell, PRACH preamble(s) and/or PRACH occasion(s) of SpCell are associated to beams (i.e., SSBs or CSI RSs) of SCells. As an example, the PRACH resource configuration of SpCell may have Quasi-co-location information for mapping the beams from SpCell and beams from SCells, simultaneously (i.e., SSB index of SpCell and SSB index of SCell, SSB index of SpCell and CSI_RS index of SCell, CSI RS index of SpCell and SSB index of SCell, CSI RS index of SpCell and CSI RS index of SCell).

Note that this configuration of PRACH resource(s) could be transmitted from SpCell and/or SCell.

Beam Failure Detection (Step 1): The SCell transmits SSs or CSI-RSs periodically for beam management at operation 1111. UE monitors SSs or CSI-RSs transmitted periodically by the SCell to assess if a beam failure trigger condition has been met and also to identify a new candidate beam. The signal (SS or CSI-RS) to measure for detecting beam failure on an SCell can be configured by gNB in RRCReconfiguration message. The UE detects a beam failure on SCell if number of detected beam failure instances within a defined time duration (beamFailureDetectionTimer) exceeds a configured maximum number (pre-defined or signaled to UE by gNB in RRC message) at operation 1112. A Beam Failure Instance means that all serving beam fails (i.e., hypothetical PDCCH BLER determined based on measurement of SS or CSI-RS is above a threshold).

Candidate Beam Selection (Step 2): For beam failure recovery on SCell, it is proposed that UE is configured with PRACH preambles and/or PRACH occasions on SpCell for SCell. This configuration can be provided to UE in RRC message. The UE identifies candidate beam of SCell at operation 1120. For beam failure recovery on SCell PRACH preamble and/or PRACH occasions of SpCell are associated to beam (i.e., SSB or CSI RS) of SCell. The UE may identify the SS blocks of SCell with SS-RSRP above rsrp-ThresholdSSB among the SS blocks in candidateBeamRSList or the CSI-RSs of SCell with CSI-RSRP above csirs-dedicatedRACH-Threshold among the CSI-RSs in candidateBeamRSList. If at least one of the SS blocks of SCell with SS-RSRP above rsrp-ThresholdSSB among the SS blocks in candidateBeamRSList or the CSI-RSs of SCell with CSI-RSRP above csirs-dedicatedRACH-Threshold among the CSI-RSs in candidateBeamRSList is available then UE selects an SS block with SS-RSRP above rsrp-ThresholdSSB among the SS blocks in candidateBeamRSList or a CSI-RS with CSI-RSRP above csirs-dedicatedRACH-Threshold among the CSI-RSs in candidateBeamRSList.

Beam Failure Recovery Request Transmission (Step 3): For Beam Failure Recovery Request Transmission for recovering beam of the SCell, it is proposed that UE select PRACH preamble corresponding to the selected SS block of the said SCell or CSI-RS of the said SCell from the set of SpCell's Random Access Preambles for beam failure recovery request transmission for the said SCell at operation 1131. If multiple PRACH preambles are mapped to selected SS block or CSI-RS, UE selects one PRACH preamble randomly from the mapped PRACH preambles. UE selects the next available PRACH occasion corresponding to the selected SS block of said SCell or CSI-RS of said SCell from the set of Random Access Occasions for beam failure recovery request transmission for the said SCell at operation 1131. UE then transmits selected PRACH preamble over the selected PRACH Occasion of SpCell at operation 1132.

Beam Failure Recovery Request Response (Step 4): In an embodiment, for receiving response for Beam Failure Recovery Request transmitted by UE for recovering beam of SCell, it is proposed that UE start the bfr-ResponseWindow (i.e., ra-response Window configured in beam failure recovery configuration) at the start of the first PDCCH occasion after a fixed duration of X symbols from the end of the preamble transmission and UE monitors the PDCCH of the SpCell identified by the C-RNTI while bfr-ResponseWindow is running. UE may monitor PDCCH in beam failure recovery search space, if configured. If the UE receives the PDCCH transmission addressed to the C-RNTI from SpCell while bfr-ResponseWindow is running and received PDCCH indicates DL or UL assignment for SCell for which beam recovery request was transmitted at operation 1141, Beam Failure Recovery is considered successfully completed (or random access procedure is successfully completed).

In an alternate embodiment, for receiving response for Beam Failure Recovery Request transmitted by UE for recovering beam of SCell, it is proposed that UE start the bfr-ResponseWindow and monitor for beam failure recovery response while bfr-ResponseWindow is running. In an embodiment, beam failure recovery response is a MAC CE and includes the SCell Index of SCell for which beam recovery request was transmitted. In an embodiment $C_i$ field in MAC CE may be included. If there is an SCell configured for the MAC entity with SCellIndex i this field set to one indicates the beam failure recovery response of the SCell with SCellIndex i. An LCID is reserved for beam failure recovery response MAC CE. The LCID in MAC subheader is set to this LCID for beam failure recovery response MAC CE. The MAC CE may also include candidate beam information, i.e., SSB ID or CSI-RS ID. If the UE receives the beam failure recovery response MAC CE including the SCell Index of SCell for which beam recovery request was transmitted while bfr-ResponseWindow is running at operation 1142, Beam Failure Recovery is considered successfully completed (or random access procedure is successfully completed).

In another embodiment, beam failure recovery response can be a RRC message and includes the SCell Index of SCell for which beam recovery request was transmitted. The RRC message may also include candidate beam information, i.e., SSB ID or CSI-RS ID. If the UE receives the beam failure recovery response including the SCell Index of SCell for which beam recovery request was transmitted while bfr-ResponseWindow is running Beam Failure Recovery is considered successfully completed (or random access procedure is successfully completed).

In another embodiment, beam failure recovery response can be a PDCCH addressed to C-RNTI including DCI indicating beam failure recovery response and includes the SCell Index of SCell for which beam recovery request was transmitted. The DCI may also include candidate beam information, i.e., SSB ID or CSI-RS ID. If the UE receives the PDCCH addressed to C-RNTI including DCI indicating beam failure recovery response and includes the SCell Index of SCell for which beam recovery request was transmitted while bfr-ResponseWindow is running Beam Failure Recovery is considered successfully completed (or random access procedure is successfully completed).

It is to be noted that SCell Index may not be needed in beam failure recovery response if the SCell for which beam recovery is initiated is the only SCell in its CG. The beam failure recovery response can be transmitted by gNB from SpCell or any cell of the CG.

If the bfr-ResponseWindow is expired, UE performs Steps 2 to 4 again. If the bfr-ResponseWindow is expired and UE has already transmitted PRACH preamble for configured number of times (pre-defined or signaled to UE by gNB in RRC message), Beam Failure Recovery Request procedure (or random access procedure) is considered unsuccessful and UE may trigger radio link failure.

Figure 12A:
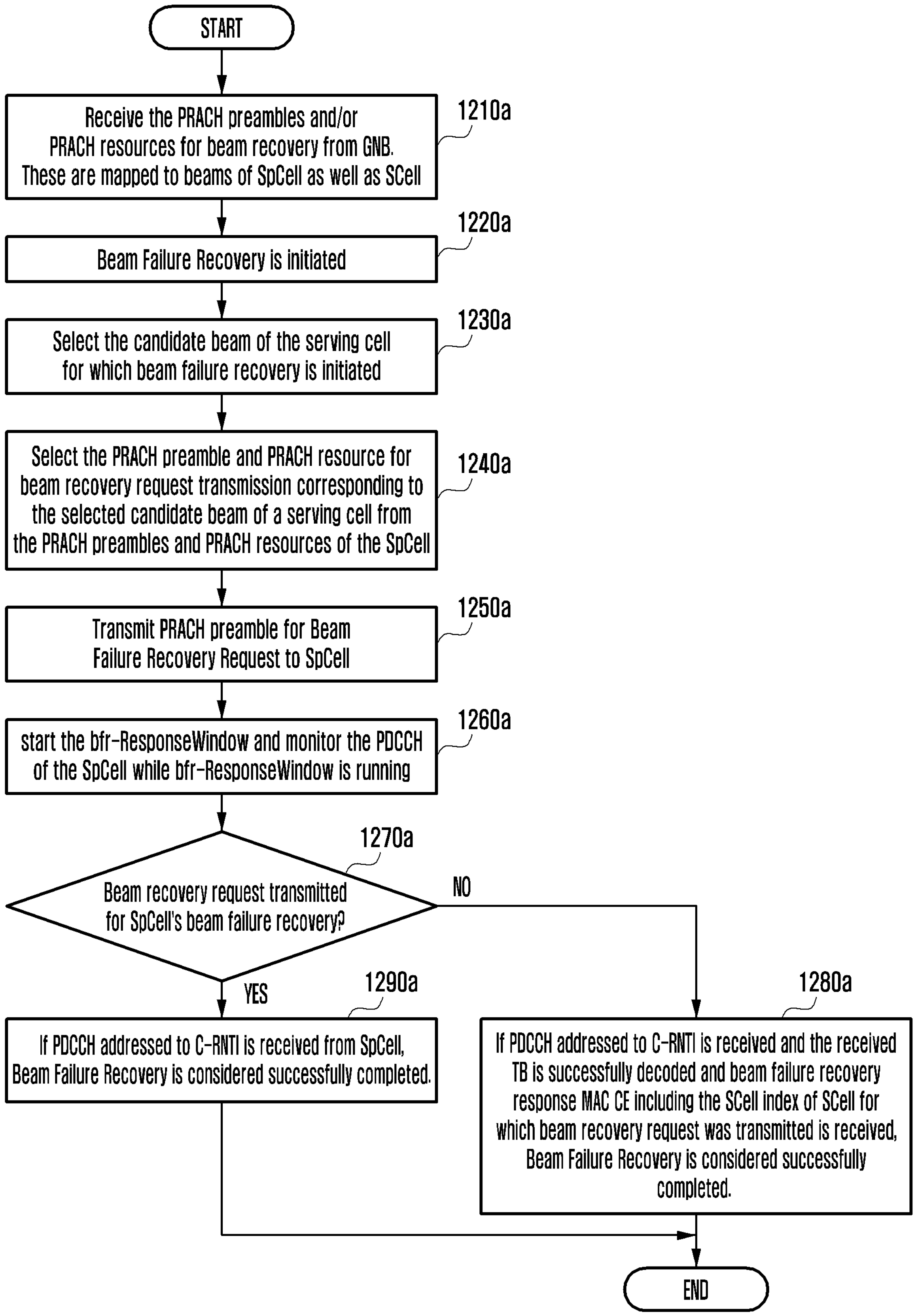
FIG. 12A illustrates a generalized UE procedure for beam failure recovery for any serving cell based on Method 7 according to an embodiment of the disclosure.
Figure 12B:
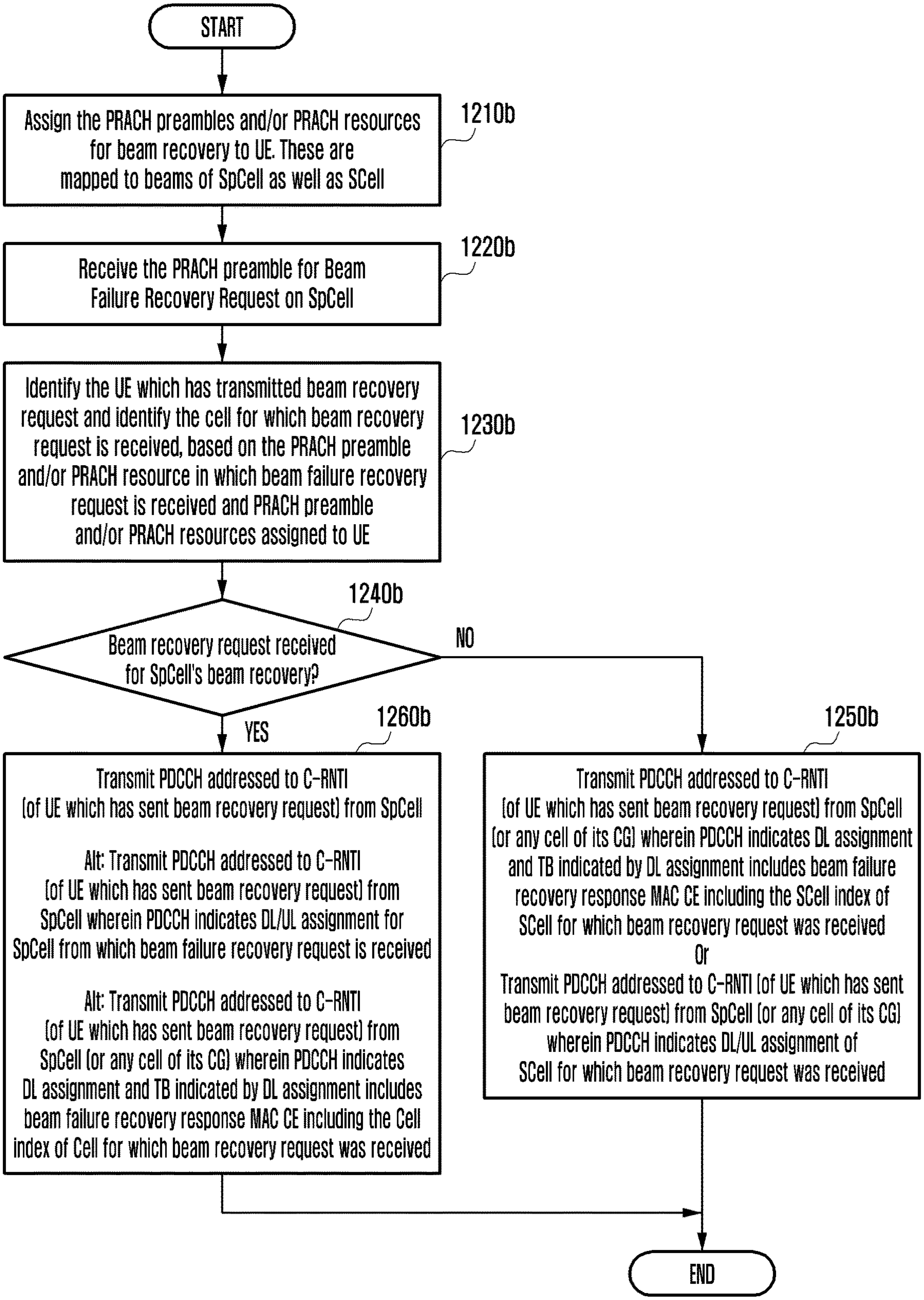
FIG. 12B illustrates the gNB procedure for beam failure recovery for any serving cell based on Method 7 according to an embodiment of the disclosure.

FIGS. 12A and 12B illustrate a generalized UE procedure and the gNB procedure for beam failure recovery for any serving cell based on the above procedure proposed for recovering beam failure.

Referring to FIG. 12A, a UE receives configuration information on the PRACH preambles and/or PRACH occasions for beam failure recovery from gNB at operation 1210*a*. These are mapped to beams of SpCell as well as SCell. If beam failure recovery is initiated at operation 1220*a*, the UE selects the candidate beam of the serving cell for which beam failure recovery is initiated at operation 1230*a*, and selects the PRACH preamble and PRACH occasion for beam failure recovery request transmission corresponding to the selected candidate beam of a serving cell from the PRACH preambles and PRACH occasions of the SpCell at operation 1240*a*. The UE transmits a PRACH preamble for beam failure recovery request to SpCell at operation 1250*a*. The UE starts the bfr-ResponseWindow and monitors the PDCCH of the SpCell while bfr-ResponseWindow is running at operation 1260*a*. In case of beam failure recovery request transmitted for SCell's beam failure recovery, if the beam failure recovery response is received on the PDCCH addressed to C-RNTI and the received TB is successfully decoded and beam failure recovery response MAC CE including the SCell index of SCell for which beam failure recovery request was transmitted is received, SCell beam failure recovery is considered successfully completed at operation 1270*a*. Alternatively, if the beam failure recovery response is received on the PDCCH addressed to C-RNTI indicating DL/UL assignment for SCell for which beam failure recovery request was transmitted received, SCell beam failure recovery is considered successfully completed. In case of beam failure recovery request transmitted for SpCell's beam failure recovery, if the beam failure recovery response is received on the PDCCH addressed to C-RNTI from SpCell, SpCell beam failure recovery is considered successfully completed at operation 1280*a*. Alternatively, if the beam failure recovery response is received on the PDCCH addressed to C-RNTI and the received TB is successfully decoded and beam failure recovery response MAC CE including the cell index of SpCell for which beam failure recovery request was transmitted is received, SpCell beam failure recovery is considered successfully completed. Alternatively, if the beam failure recovery response is received on the PDCCH addressed to C-RNTI indicating DL/UL assignment, SpCell beam failure recovery is considered successfully completed.

Referring to FIG. 12B, a gNB assigns the PRACH preambles and/or PRACH occasions for beam failure recovery to UE at operation 1210*b*. These are mapped to beams of SpCell as well as SCell. The gNB receives the PRACH preamble for beam failure recovery request on SpCell at operation 1220*b*. The gNB identifies the UE which has transmitted beam failure recovery request and identifies the cell for which beam failure recovery request is received, based on the PRACH preamble and/or PRACH occasion in which beam failure recovery request is received and PRACH preamble and/or PRACH occasions assigned to UE at operation 1230*b*. If the beam failure recovery request is received for SCell's beam failure recovery, the gNB transmits a beam failure recovery response on PDCCH addressed to C-RNTI (of UE which has sent the beam failure recovery request) from SpCell (or any cell of its CG) at operation 1240*b*. The PDCCH may indicate DL assignment and TB indicated by the DL assignment may include beam failure recovery response MAC CE including the SCell index of SCell for which the beam failure recovery request was received. Or, the PDCCH may indicate DL/UL assignment of SCell for which the beam failure recovery request was received. If the beam failure recovery request is received for SpCell's beam failure recovery, the gNB transmits a beam failure recovery response on PDCCH addressed to C-RNTI (of UE which has sent the beam failure recovery request) from SpCell at operation 1250*b*. Alternatively, if the beam failure recovery request is received for SpCell's beam failure recovery, the gNB transmits a beam failure recovery response on PDCCH addressed to C-RNTI (of UE which has sent the beam failure recovery request) from SpCell wherein the PDCCH indicates DL/UL assignment for SpCell from which beam failure recovery request is receive. Alternatively, if the beam failure recovery request is received for SpCell's beam failure recovery, the gNB transmits a beam failure recovery response on PDCCH addressed to C-RNTI (of UE which has sent the beam failure recovery request) from SpCell (or any cell of its CG) wherein the PDCCH indicates DL assignment and TB indicated by the DL assignment includes beam failure recovery response MAC CE including the cell index of SpCell for which beam recovery request was received.

Method 8

Figure 13:
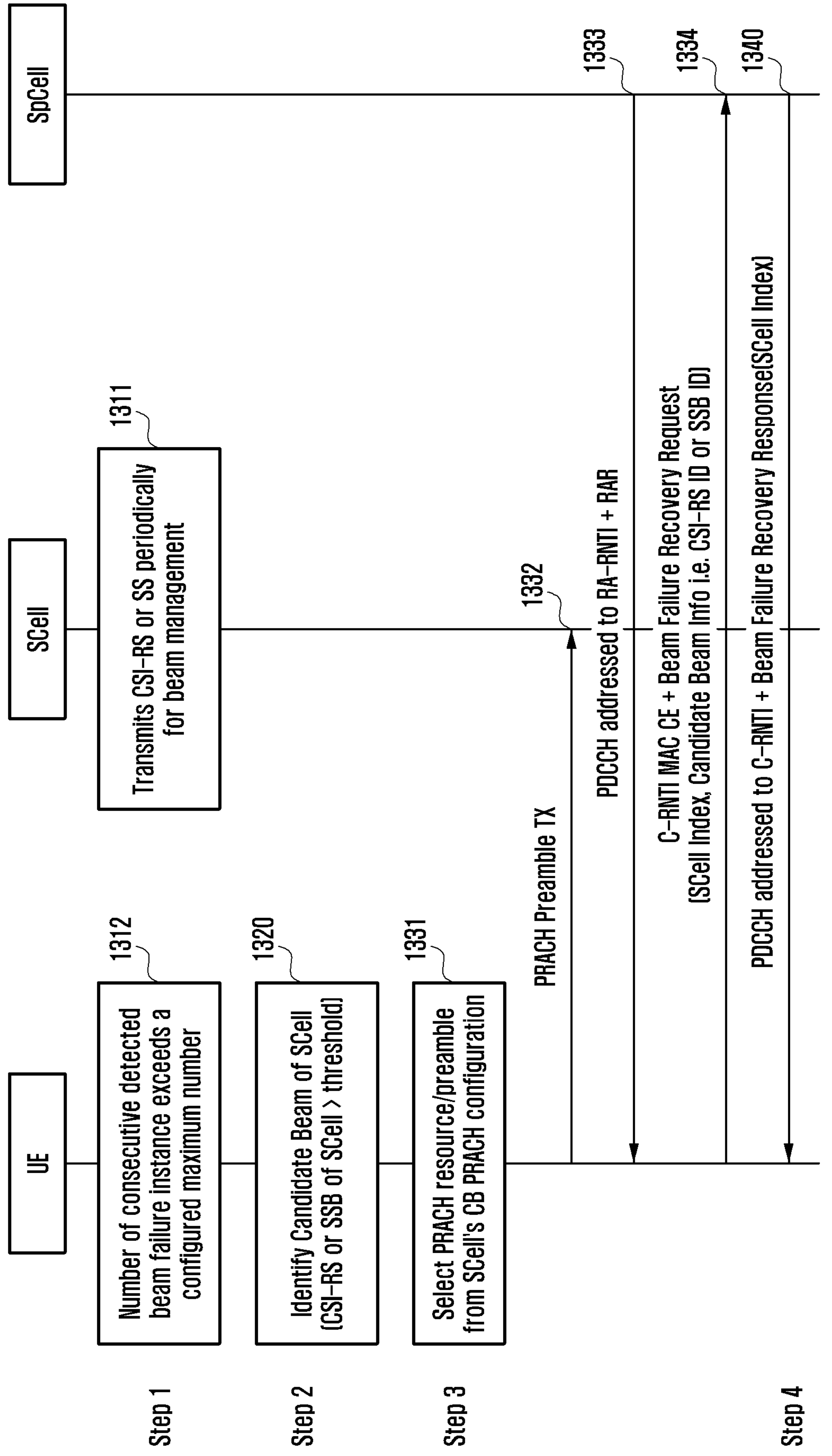
FIG. 13 illustrates beam failure recovery procedure for SCell based on Method 8 according to an embodiment of the disclosure.

FIG. 13 illustrates beam failure recovery procedure for SCell based on Method 8 according to an embodiment of the disclosure.

Beam Failure Detection (Step 1): The SCell transmits SSs or CSI-RSs periodically for beam management at operation 1311. UE monitors SSs or CSI-RSs transmitted periodically by the SCell to assess if a beam failure trigger condition has been met and also to identify a new candidate beam. The signal (SS or CSI-RS) to measure for detecting beam failure on an SCell can be configured by gNB in RRCReconfiguration message. The UE detects a beam failure on SCell if number of detected beam failure instances within a defined time duration (beamFailureDetectionTimer) exceeds a configured maximum number at operation 1312. A Beam Failure Instance means that all serving beam fails (i.e., hypothetical PDCCH BLER determined based on measurement of SS or CSI-RS is above a threshold).

Candidate Beam Selection (Step 2): The UE identifies candidate beam of SCell at operation 1320. The UE may select an SS block with SS-RSRP above rsrp-ThresholdSSB or a CSI-RS with CSI-RSRP above csirs-dedicatedRACH-Threshold.

Beam Failure Recovery Request Transmission (Step 3): For Beam Failure Recovery Request Transmission for recovering beam of the SCell, it is proposed that UE select PRACH preamble corresponding to the selected SS block or CSI-RS from the set of SCell's Random Access Preambles at operation 1331. The UE may select a PRACH preamble from SCell's CB PRACH configuration. If multiple PRACH preambles are mapped to selected SS block or CSI-RS, UE selects one PRACH preamble randomly from the mapped PRACH preambles. UE selects the next available PRACH occasion corresponding to the selected SS block or CSI-RS from the set of Random Access Resources of the SCell at operation 1331. The UE may select a PRACH occasion from SCell's CB PRACH configuration. UE then transmits selected PRACH preamble over the selected PRACH occasion of SCell at operation 1332. UE monitors PDCCH of SpCell for RAR. In response to the PRACH preamble transmission, the UE may receive the RAR on the PDCCH addressed to RA-RNTI at operation 1333. In the UL grant received in RAR, UE transmits Beam Failure Recovery Request at operation 1334. The beam failure recovery request may include C-RNTI MAC CE. The MAC CE may include the SCell index of the SCell for which beam failure recovery is initiated, and the MAC CE may also include one or more CSI-RS ID or SSB ID of the selected SSB or CSI-RS.

Beam Failure Recovery Request Response (Step 4): After transmitting the Beam Failure Recovery Request in UL grant received in RAR at operation 1334, contention resolution timer is started. UE monitors for beam failure recovery response while contention resolution timer is running at operation 1340.

In an embodiment, beam failure recovery response is a MAC CE and includes the SCell Index of SCell for which beam recovery request was transmitted. In an embodiment $C_i$ field in MAC CE may be included. If there is an SCell configured for the MAC entity with SCellIndex i this field set to one indicates the beam failure recovery response of the SCell with SCellIndex i. An LCID is reserved for beam failure recovery response MAC CE. The LCID in MAC subheader is set to this LCID for beam failure recovery response MAC CE. MAC CE may also include candidate beam information, i.e., SSB ID or CSI RS ID. If the UE receives the beam failure recovery response MAC CE including the SCell Index of SCell for which beam recovery request was transmitted while contention resolution timer is running, Beam Failure Recovery is considered successfully completed.

In another embodiment, beam failure recovery response can be a RRC message and includes the SCell Index of SCell for which beam recovery request was transmitted. RRC message may also include candidate beam information, i.e., SSB ID or CSI RS ID. If the UE receives the beam failure recovery response including the SCell Index of SCell for which beam recovery request was transmitted while contention resolution timer is running Beam Failure Recovery is considered successfully completed.

In another embodiment, beam failure recovery response can be a PDCCH addressed to C-RNTI including DCI indicating beam failure recovery response and includes the SCell Index of SCell for which beam recovery request was transmitted. DCI may also include candidate beam information, i.e., SSB ID or CSI RS ID. If the UE receives the PDCCH addressed to C-RNTI including DCI indicating beam failure recovery response and includes the SCell Index of SCell for which beam recovery request was transmitted while contention resolution timer is running Beam Failure Recovery is considered successfully completed (or random access procedure is successfully completed).

It is to be noted that SCell Index may not be needed in beam failure recovery response if the SCell for which beam recovery is initiated is the only SCell in its CG.

If the contention resolution timer is expired, UE performs Steps 2 to 4 again. If the contention resolution timer is expired and UE has already transmitted beam failure recovery request for configured number of times, Beam Failure Recovery Request procedure is considered unsuccessful and UE may trigger radio link failure.

Method 9

Figure 14:
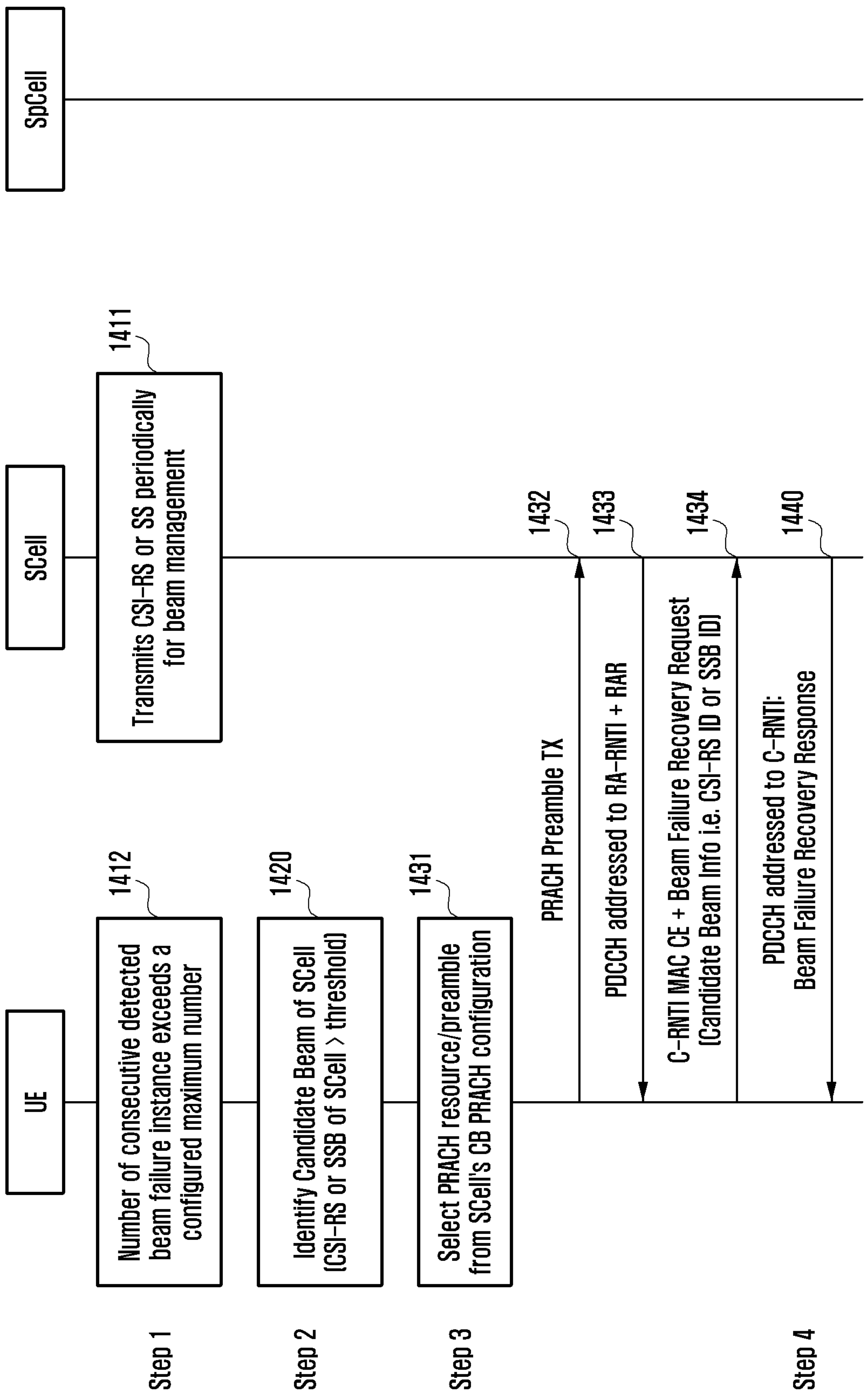
FIG. 14 illustrates beam failure recovery procedure for SCell based on Method 9 according to an embodiment of the disclosure.

FIG. 14 illustrates beam failure recovery procedure for SCell based on Method 9 according to an embodiment of the disclosure.

Beam Failure Detection (Step 1): The SCell transmits SSs or CSI-RSs periodically for beam management at operation 1411. UE monitors SSs or CSI-RSs transmitted periodically by the SCell to assess if a beam failure trigger condition has been met and also to identify a new candidate beam. The signal (SS or CSI-RS) to measure for detecting beam failure on an SCell can be configured by gNB in RRCReconfiguration message. The UE detects a beam failure on SCell if number of detected beam failure instances within a defined time duration (beamFailureDetectionTimer) exceeds a configured maximum number at operation 1412. A Beam Failure Instance means that all serving beam fails (i.e., hypothetical PDCCH BLER determined based on measurement of SS or CSI-RS is above a threshold).

Candidate Beam Selection (Step 2): The UE identifies candidate beam of SCell at operation 1420. The UE may select an SS block with SS-RSRP above rsrp-ThresholdSSB or a CSI-RS with CSI-RSRP above csirs-dedicatedRACH-Threshold.

Beam Failure Recovery Request Transmission Using the Contention-Based RACH on SCell (Step 3):

For Beam Failure Recovery Request Transmission for recovering beam of SCell, it is proposed that UE transmits a Beam Failure Recovery Request MAC CE using the message 3 of the contention-based RACH procedure on SCell. Here it is assumed that UL grant is not available for transmitting the Beam Failure Recovery Request. So UE initiates the contention based random access procedure.

Specifically, the UE selects PRACH preamble and/or PRACH occasion from SCell's CB PRACH configuration at operation 1431. The UE transmits a PRACH preamble to SCell at operation 1432, and receives a RAR on a PDCCH addressed to RA-RNTI from SCell at operation 1433. In the UL grant received in RAR, UE transmits Beam Failure Recovery Request at operation 1434. The beam failure recovery request is a MAC CE and the MAC CE may include one or more CSI-RS ID or SSB ID of selected SSB or CSI-RS. C-RNTI MAC CE is also transmitted at operation 1434. It is to be noted that MAC entity can send Beam Failure Recovery Request to gNB via any cell of its Cell group. In an embodiment, Beam Failure Recovery Request can be a RRC message instead of MAC CE.

Beam Failure Recovery Request Response (Step 4): After transmitting the Beam Failure Recovery Request in UL grant received in RAR at operation 1434, contention resolution timer is started. UE monitors for beam failure recovery response while contention resolution timer is running. If the UE receives the PDCCH transmission addressed to the C-RNTI from SCell while contention resolution timer is running at operation 1440, Beam Failure Recovery is considered successfully completed (or random access procedure is successfully completed).

In order for this Beam Failure Recovery Response transmission from SCell, the SCell can generate its own Beam Failure Recovery Response for the specific UE using the information of the specific UE measurement and SCell beam characteristics.

If the contention resolution timer is expired, UE performs Steps 2 to 4 again. If the contention resolution timer is expired and UE has already transmitted beam failure recovery request for configured number of times, Beam Failure Recovery Request procedure is considered unsuccessful and UE may trigger radio link failure.

Method 10

Figure 15:
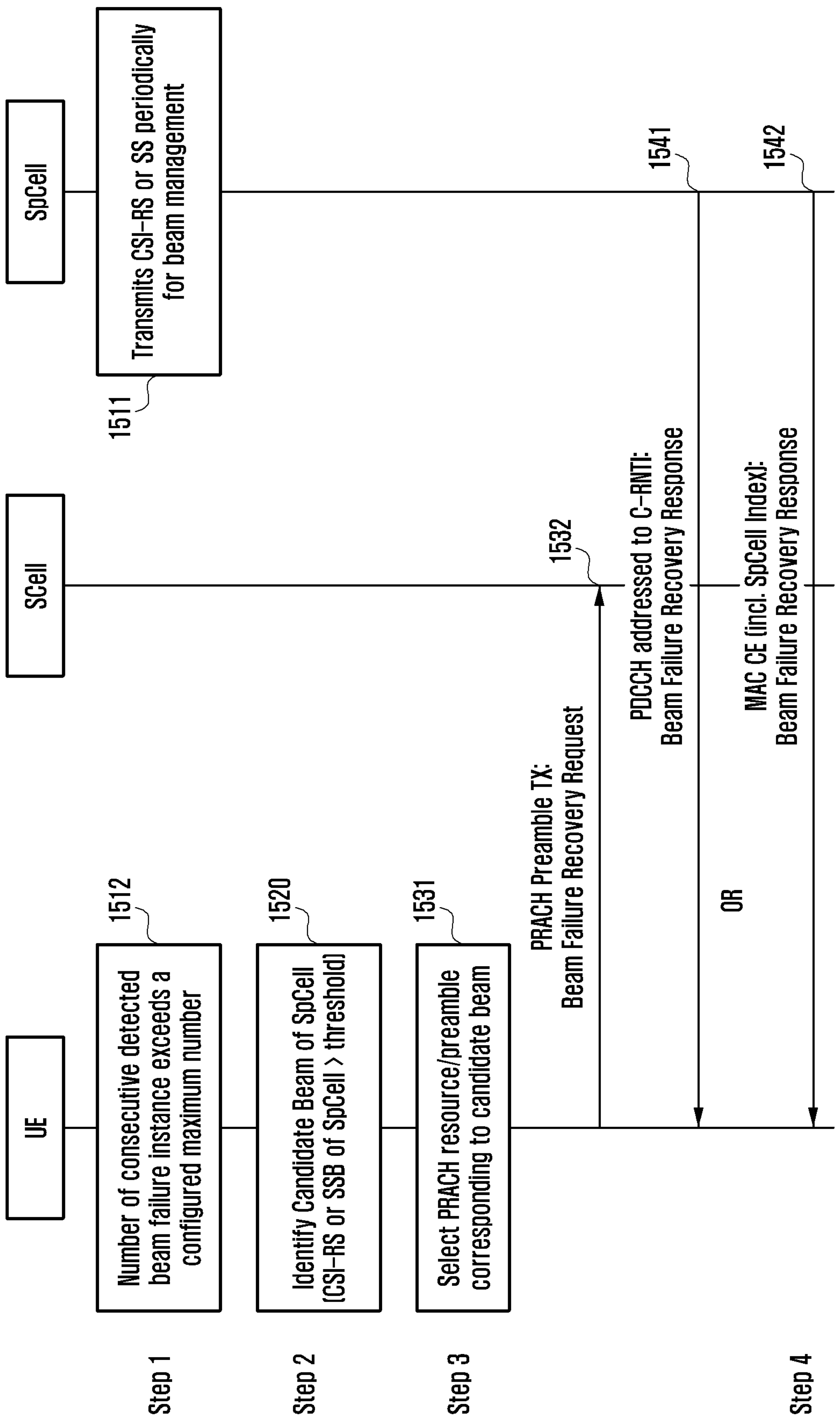
FIG. 15 illustrates beam failure recovery procedure for SpCell using SCell based on Method 10 according to an embodiment of the disclosure.

FIG. 15 illustrates beam failure recovery procedure for SpCell using SCell based on Method 10 according to an embodiment of the disclosure.

For beam failure recovery for SpCell on SCell, it is proposed that UE is configured with PRACH preambles and/or PRACH occasions on SCell for SpCell's beam failure recovery. This configuration can be provided to UE in RRC message. This is a significant change from the existing system wherein PRACH preambles and PRACH occasions of SpCell for beam recovery are only provided for SpCell, i.e., mapped to beam (i.e., SSBs or CSI RSs of SpCell). PRACH preamble(s) and/or PRACH occasion(s) of SCell for beam recovery are associated to beams (i.e., SSBs or CSI RSs) of SpCell and SCells. As an example, the PRACH resource configuration of SCell may have Quasi-co-location information for mapping the beams from SpCell and beams from SCells, simultaneously (i.e., SSB index of SpCell and SSB index of SCell, SSB index of SpCell and CSI_RS index of SCell, CSI RS index of SpCell and SSB index of SCell, CSI RS index of SpCell and CSI RS index of SCell).

Note that this configuration of PRACH occasion(s) could be transmitted from SpCell and/or SCell.

Beam Failure Detection (Step 1): The SpCell transmits SSs or CSI-RSs periodically for beam management at operation 1511. UE monitors SSs or CSI-RSs transmitted periodically by the SpCell to assess if a beam failure trigger condition has been met and also to identify a new candidate beam. The signal (SS or CSI-RS) to measure for detecting beam failure on an SCell can be configured by gNB in RRCReconfiguration message. The UE detects a beam failure on SpCell if number of detected beam failure instances within a defined time duration (beamFailureDetectionTimer) exceeds a configured maximum number (pre-defined or signaled to UE by gNB in RRC message) at operation 1512. A Beam Failure Instance means that all serving beam fails (i.e., hypothetical PDCCH BLER determined based on measurement of SS or CSI-RS is above a threshold).

Candidate Beam Selection (Step 2): For beam failure recovery on SpCell, it is proposed that UE is configured with PRACH preambles and PRACH occasions on SCell for SpCell. This configuration can be provided to UE in RRC message. The UE identifies candidate beam of SpCell at operation 1520. PRACH preamble and/PRACH occasions on SCell for beam recovery are associated to beam (i.e., SSB or CSI RS) on SpCell. The UE may identify the SS blocks of SpCell with SS-RSRP above rsrp-ThresholdSSB among the SS blocks in candidateBeamRSList or the CSI-RSs of SpCell with CSI-RSRP above csirs-dedicatedRACH-Threshold among the CSI-RSs in candidateBeamRSList. If at least one of the SS blocks of SpCell with SS-RSRP above rsrp-ThresholdSSB among the SS blocks in candidateBeamRSList or the CSI-RSs of SpCell with CSI-RSRP above csirs-dedicatedRACH-Threshold among the CSI-RSs in candidateBeamRSList is available then UE selects an SS block with SS-RSRP above rsrp-ThresholdSSB among the SS blocks in candidateBeamRSList or a CSI-RS with CSI-RSRP above csirs-dedicatedRACH-Threshold among the CSI-RSs in candidateBeamRSList. candidateBeamRSList, csirs-dedicatedRACH-Threshold and rsrp-ThresholdSSB are signaled by gNB to UE.

Beam Failure Recovery Request Transmission (Step 3): For Beam Failure Recovery Request Transmission for recovering beam of the SpCell, it is proposed that UE select PRACH preamble corresponding to the selected SS block of the said SpCell or CSI-RS of the said SpCell from the set of SCell's Random Access Preambles for beam failure recovery request transmission for the said SpCell at operation 1531. If multiple PRACH preambles are mapped to selected SS block or CSI-RS, UE selects one PRACH preamble randomly from the mapped PRACH preambles. UE selects the first available PRACH occasion corresponding to the selected SS block of said SpCell or CSI-RS of said SpCell from the set of Random Access Resources for beam failure recovery request transmission for the said SpCell at operation 1531. UE then transmits selected PRACH preamble over the selected PRACH occasion of SCell at operation 1532.

Beam Failure Recovery Request Response (Step 4): In an embodiment, for receiving response for Beam Failure Recovery Request transmitted by UE for recovering beam of SpCell, it is proposed that UE start the bfr-ResponseWindow (i.e., ra-response Window configured in beam failure recovery configuration) at the start of the first PDCCH occasion after a fixed duration of X symbols from the end of the preamble transmission and UE monitors the PDCCH of the SpCell identified by the C-RNTI while bfr-ResponseWindow is running. UE may monitor PDCCH in beam failure recovery search space, if configured. If the UE receives the PDCCH transmission addressed to the C-RNTI from SpCell while bfr-ResponseWindow is running at operation 1541, Beam Failure Recovery is considered successfully completed (or random access procedure is successfully completed).

In an alternate embodiment, for receiving response for Beam Failure Recovery Request transmitted by UE for recovering beam of SpCell, it is proposed that UE start the bfr-ResponseWindow (i.e., ra-response Window configured in beam failure recovery configuration) and monitor for beam failure recovery response while bfr-ResponseWindow is running. In an embodiment, beam failure recovery response is a MAC CE and includes the serving cell Index of Cell for which beam recovery request was transmitted. The MAC CE may also include candidate beam information, i.e., SSB ID or CSI-RS ID. If the UE receives the beam failure recovery response MAC CE including the Index of serving cell for which beam recovery request was transmitted while bfr-ResponseWindow is running at operation 1542, Beam Failure Recovery is considered successfully completed (or random access procedure is successfully completed).

In another embodiment, beam failure recovery response can be a RRC message and includes the Index of serving cell for which beam recovery request was transmitted. The RRC message may also include candidate beam information, i.e., SSB ID or CSI-RS ID. If the UE receives the beam failure recovery response including the Index of serving cell for which beam recovery request was transmitted while bfr-ResponseWindow is running Beam Failure Recovery is considered successfully completed (or random access procedure is successfully completed).

In another embodiment, beam failure recovery response can be a PDCCH addressed to C-RNTI including DCI indicating beam failure recovery response and includes the Index of serving Cell for which beam recovery request was transmitted. The DCI may also include candidate beam information, i.e., SSB ID or CSI-RS ID. If the UE receives the PDCCH addressed to C-RNTI including DCI indicating beam failure recovery response and includes the Index of Serving Cell for which beam recovery request was transmitted while bfr-ResponseWindow is running Beam Failure Recovery is considered successfully completed (or random access procedure is successfully completed).

If the bfr-ResponseWindow is expired, UE performs Steps 2 to 4 again. If the bfr-ResponseWindow is expired and UE has already transmitted PRACH preamble for configured number of times (pre-defined or signaled to UE by gNB in RRC message), Beam Failure Recovery Request procedure (or random access procedure) is considered unsuccessful and UE may trigger radio link failure.

Figure 16A:
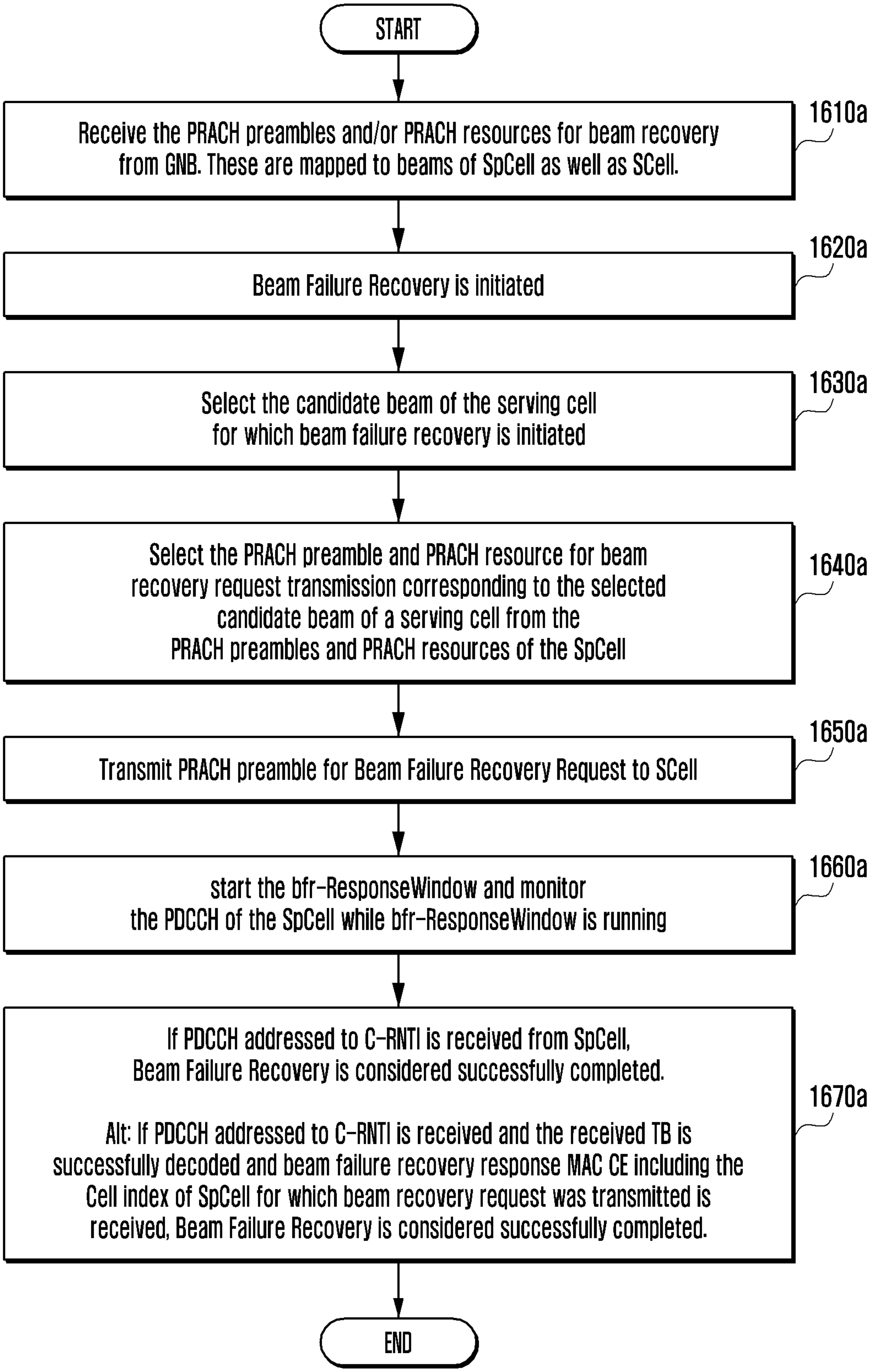
FIG. 16A illustrates a generalized UE procedure for beam failure recovery for any serving cell based on Method 10 according to an embodiment of the disclosure.
Figure 16B:
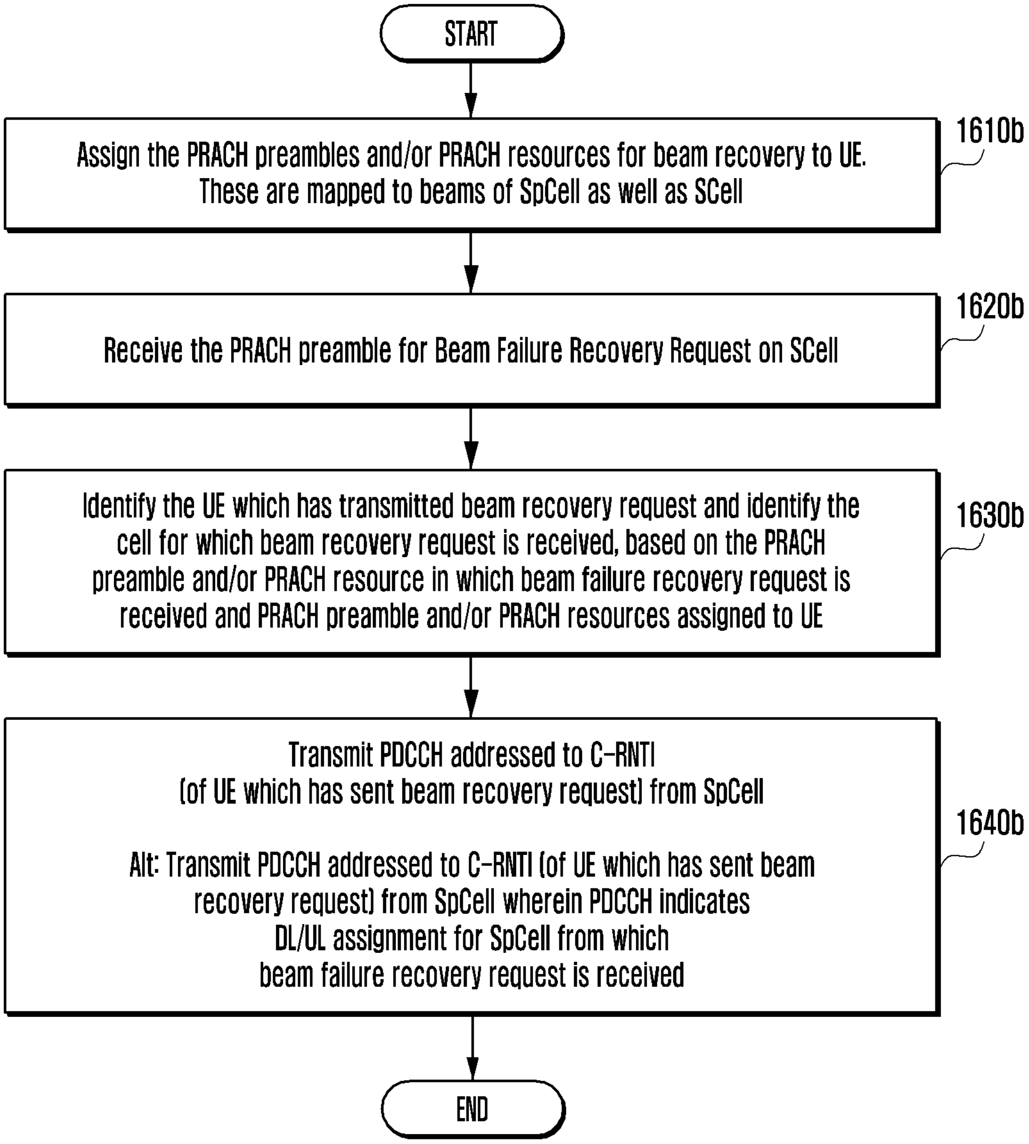
FIG. 16B illustrates the gNB procedure for beam failure recovery for any serving cell based on Method 10 according to an embodiment of the disclosure.

FIGS. 16A and 16B illustrate a generalized UE procedure and the gNB procedure for beam failure recovery for any serving cell based on the above procedure proposed for recovering beam failure.

Referring to FIG. 16A, a UE receives configuration information on the PRACH preambles and/or PRACH occasions for beam failure recovery from gNB at operation 1610*a*. These are mapped to beams of SpCell as well as SCell. If beam failure recovery is initiated at operation 1620*a*, the UE selects the candidate beam of the serving cell for which beam failure recovery is initiated at operation 1630*a*, and selects the PRACH preamble and PRACH occasion for beam failure recovery request transmission corresponding to the selected candidate beam of a serving cell from the PRACH preambles and PRACH occasions of the SpCell at operation 1640*a*. The UE transmits a PRACH preamble for beam failure recovery request to SCell at operation 1650*a*. The UE starts the bfr-ResponseWindow and monitors the PDCCH of the SpCell while bfr-ResponseWindow is running at operation 1660*a*. If PDCCH addressed to C-RNTI is received from SpCell, Beam Failure Recovery is considered successfully completed at operation 1670*a*. Alternatively, if PDCCH addressed to C-RNTI is received and the received TB is successfully decoded and beam failure recovery response MAC CE including the Cell index of SpCell for which beam recovery request was transmitted is received, Beam Failure Recovery is considered successfully completed.

Referring to FIG. 16B, a gNB assigns the PRACH preambles and/or PRACH occasions for beam failure recovery to UE at operation 1610*b*. These are mapped to beams of SpCell as well as SCell. The gNB receives the PRACH preamble for beam failure recovery request on SCell at operation 1620*b*. The gNB identifies the UE which has transmitted beam failure recovery request and identifies the cell for which beam failure recovery request is received, based on the PRACH preamble and/or PRACH occasion in which beam failure recovery request is received and PRACH preamble and/or PRACH occasions assigned to UE at operation 1630*b*. The gNB transmits a beam failure recovery response (i.e., PDCCH addressed to C-RNTI of the UE which has sent beam failure recovery request) from SpCell at operation 1640*b*. Alternatively, the gNB transmits a beam failure recovery response, i.e., PDCCH addressed to C-RNTI of UE which has sent the beam failure recovery request from SpCell wherein the PDCCH indicates DL/UL assignment for SpCell from which beam failure recovery request is received. In an embodiment, if beam failure recovery search space is configured the beam failure recovery response is transmitted in beam failure recovery search space.

DRX Operation for Beam Recovery

Figure 17:
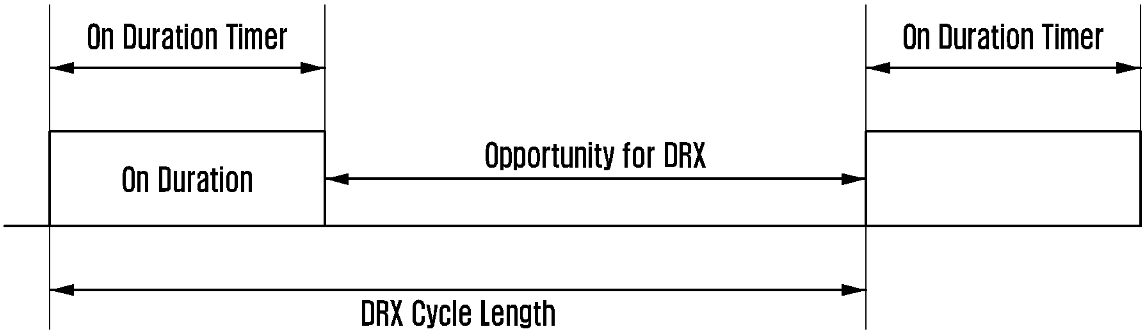
FIG. 17 shows a Discontinuous Reception (DRX) cycle configured for a UE in RRC connected state to extend battery life.
Figure 18:
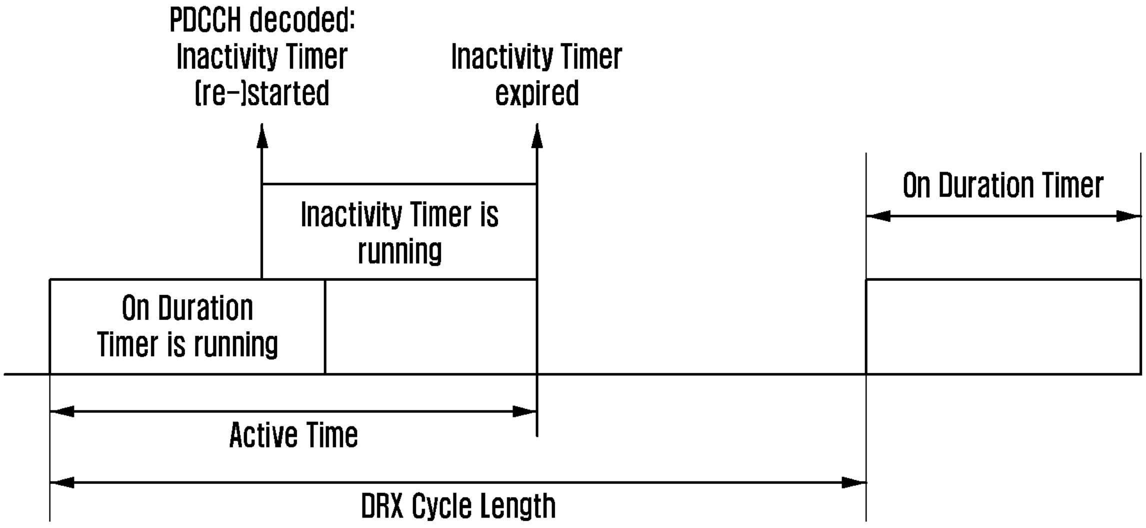
FIG. 18 shows a DRX cycle configured for a UE in RRC connected state to extend battery life.

FIGS. 17 and 18 show a Discontinuous Reception (DRX) cycle configured for a UE in RRC connected state to extend battery life.

DRX functionality can be configured for an RRC connected UE so that it does not always need to monitor the downlink channels. Referring to FIG. 17, A DRX cycle consists of an 'On Duration' during which the UE shall monitor the scheduling channel i.e., PDCCH and a 'DRX Period' during which a UE has the opportunity to skip reception of downlink channels for battery saving purposes.

Referring to FIG. 18, during the On Duration, UE waits for, after waking up, to receive PDCCHs. If the UE successfully decodes a PDCCH it starts the inactivity timer. Inactivity timer is the duration that UE waits to successfully decode a PDCCH, from the last successful decoding of a PDCCH, failing which it can go back to sleep. The UE shall restart the inactivity timer following a single successful decoding of a PDCCH for a first transmission only (i.e., not for retransmissions).

When a DRX cycle is configured, the Active Time includes the time while:

- drx-onDurationTimer or drx-InactivityTimer or drx-RetransmissionTimerDL or drx-RetransmissionTimerUL or ra-ContentionResolutionTimer is running; or
- a Scheduling Request (SR) is sent on PUCCH and is pending; or
- a PDCCH indicating a new transmission addressed to the C-RNTI of the MAC entity has not been received after successful reception of a Random Access Response for the preamble not selected by the MAC entity among the contention based PRACH preambles.

If the DRX is configured following operation is performed by UE during the Active Time:

- monitor the PDCCH;
- if the PDCCH indicates a DL transmission:
  - start the drx-HARQ-RTT-TimerDL for the corresponding HARQ process in the first symbol after the end of the corresponding transmission carrying the DL HARQ feedback;
  - stop the drx-RetransmissionTimerDL for the corresponding HARQ process.
- if the PDCCH indicates a UL transmission:
  - start the drx-HARQ-RTT-TimerUL for the corresponding HARQ process in the first symbol after the end of the first repetition of the corresponding PUSCH transmission;
  - stop the drx-RetransmissionTimerUL for the corresponding HARQ process.
- if the PDCCH indicates a new transmission (DL or UL):
  - start or restart drx-InactivityTimer in the first symbol after the end of the PDCCH reception.

As discussed earlier beam failure recovery procedure is used to recover beam.

Figure 19A:
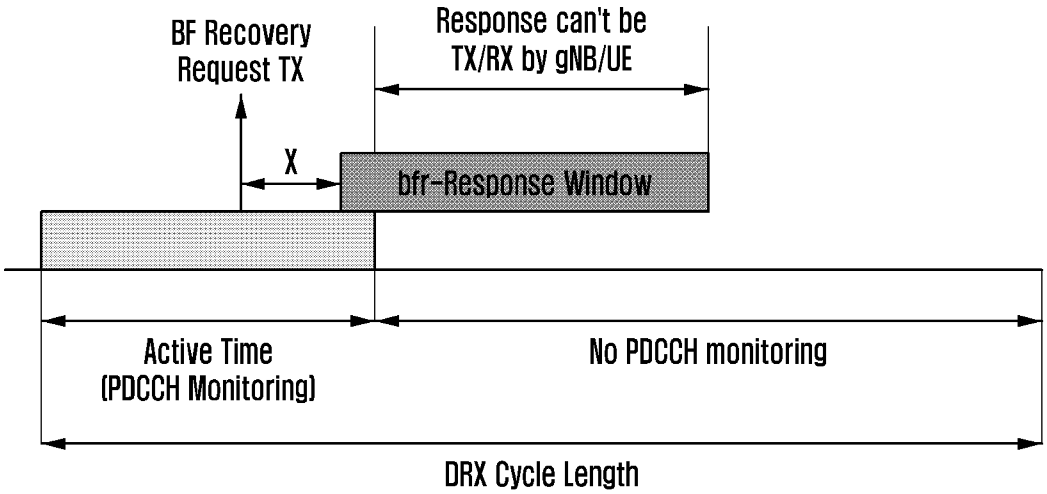
FIG. 19A shows a DRX cycle configured for a UE which transmits PRACH preamble indicating Beam failure recovery request during the active time.
Figure 19B:
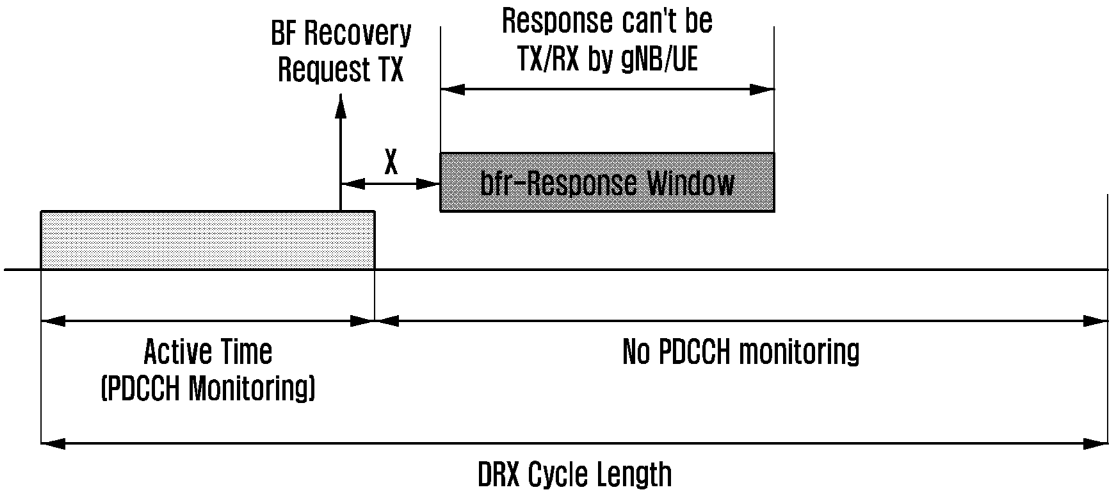
FIG. 19B shows a DRX cycle configured for a UE which transmits PRACH preamble indicating Beam failure recovery request during the active time.

FIGS. 19A and 19B show a DRX cycle configured for a UE which transmits PRACH preamble indicating Beam failure recovery request during the active time.

The beam failure recovery response is transmitted by gNB in bfr-Response Window which starts at X symbols from the end of preamble transmission for Beam failure recovery request. Referring to FIG. 19A, only a portion of bfr-Response Window belongs to active time. Referring to FIG. 19B, the entire bfr-Response Window is outside the active time. So UE cannot receive the response and hence cannot recover from beam failure. One possible way to recovery is to monitor for response during the active time of next DRX cycle. However this leads to significant delay in recovering beam and it is possible that beam recovery timer may expire leading to declaration of radio link failure.

In case of contention based random access is initiated for beam failure recovery, similar situation occurs for ra-ResponseWindow wherein UE monitors for RAR in ra-ResponseWindow after transmitting the PRACH preamble.

Figure 20A:
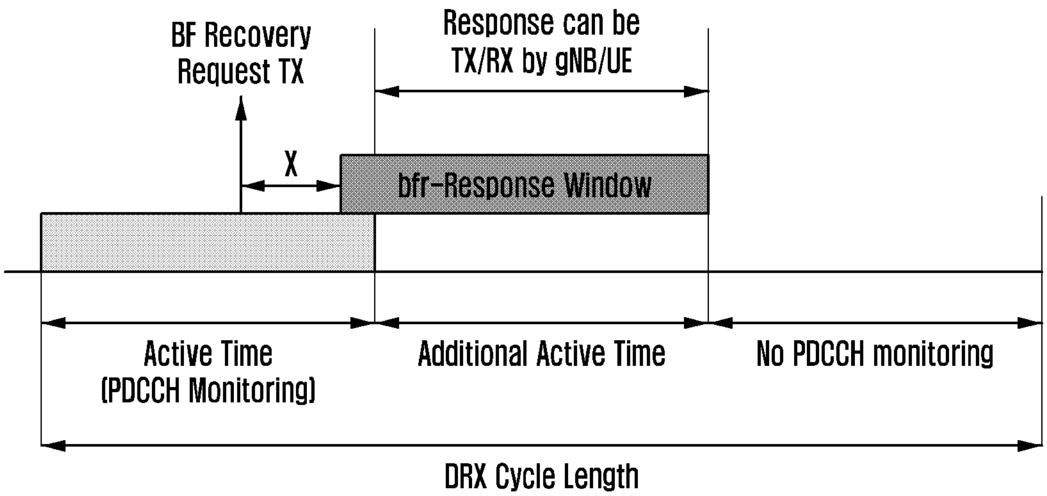
FIG. 20A shows a DRX cycle configured for a UE which transmits PRACH preamble indicating Beam failure recovery request during the active time according to an embodiment of the disclosure.
Figure 20B:
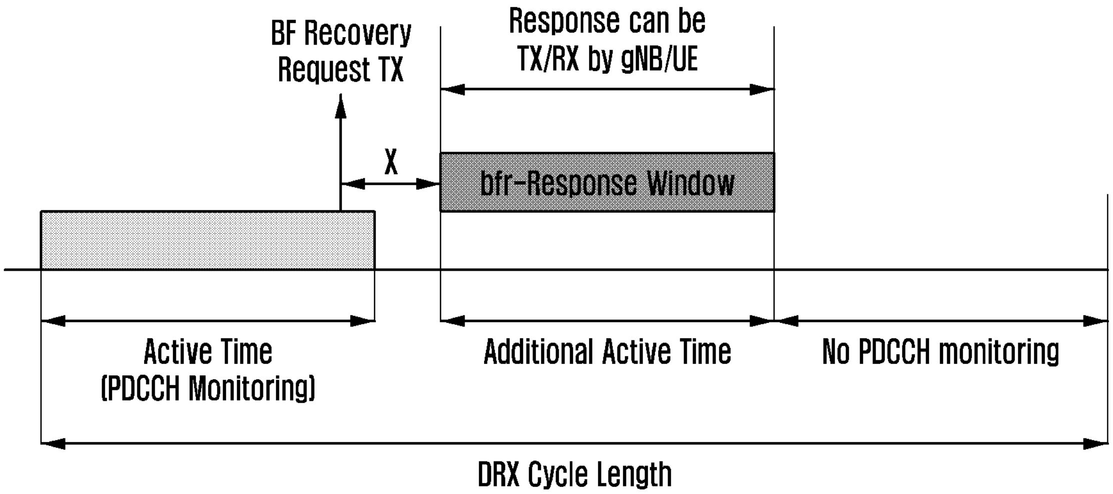
FIG. 20B shows a DRX cycle configured for a UE which transmits PRACH preamble indicating Beam failure recovery request during the active time according to an embodiment of the disclosure.

FIGS. 20A and 20B show a DRX cycle configured for a UE which transmits PRACH preamble indicating Beam failure recovery request during the active time according to an embodiment of the disclosure.

Referring to FIGS. 20A and 20B, active time also includes the time duration while bfr-Response Window (i.e., ra-response Window configured in beam failure recovery configuration) is running. If DRX is configured and bfr-Response Window is running, UE shall perform the operations (described earlier) defined for active time. If the contention free Random Access Preamble for beam failure recovery request was transmitted by the MAC entity, start the bfr-ResponseWindow at the start of the first PDCCH occasion after a fixed duration of X symbols from the end of the preamble transmission and monitor the PDCCH of the SpCell for response to beam failure recovery request identified by the C-RNTI while bfr-ResponseWindow is running, regardless of DRX configuration.

Figure 21:
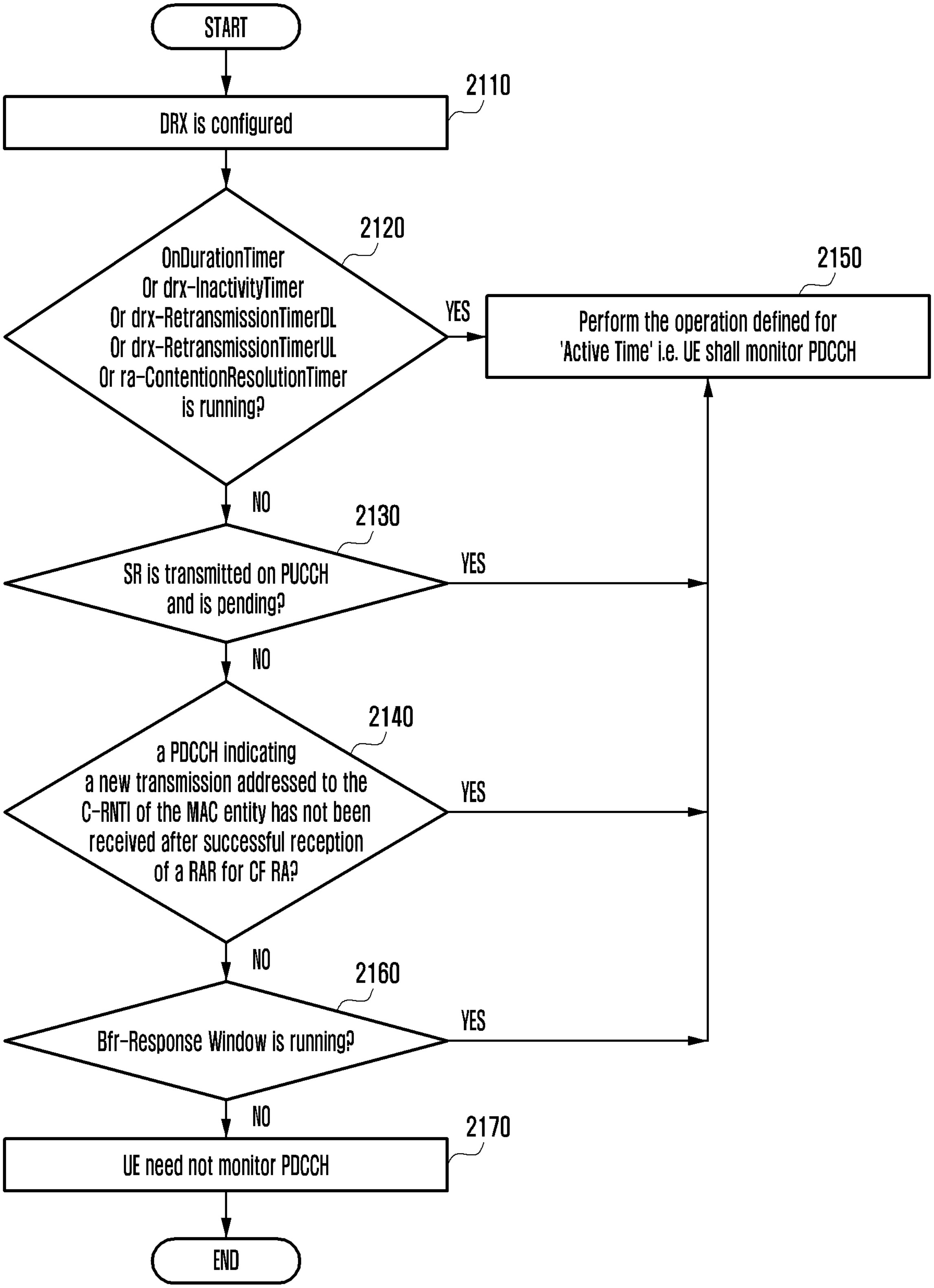
FIG. 21 shows the UE operation when DRX is configured according to an embodiment of the disclosure.

FIG. 21 shows the UE operation when DRX is configured according to an embodiment of the disclosure.

Referring to FIG. 21, if DRX is configured at operation 2110, the UE determines whether OnDurationTimer or drx-InactivityTimer or drx-RetransmissionTimerDL or drx-RetransmissionTimerUL or ra-ContentionResolutionTimer is running at operation 2220; or whether SR is transmitted on PUCCH and is pending at operation 2130; or whether a PDCCH indicating a new transmission addressed to the C-RNTI of the MAC entity has not been received after successful reception of a RAR for CF RA at operation 2140. If it is determined that OnDurationTimer or drx-InactivityTimer or drx-RetransmissionTimerDL or drx-RetransmissionTimerUL or ra-ContentionResolutionTimer is running at operation 2120, or that SR is transmitted on PUCCH and is pending at operation 2130, or that the PDCCH indicating the new transmission addressed to the C-RNTI of the MAC entity has not been received after successful reception of the RAR for CF RA at operation 2140, the UE performs the operation defined for 'Active Time,' i.e., the UE shall monitor PDCCH at operation 2150.

In addition, the UE determines whether Bfr-Response Window is running at operation 2160. If it is determined that the Bfr-Response Window is running at operation 2160, the UE performs the operation defined for 'Active Time,' i.e., the UE shall monitor PDCCH at operation 2150.

Otherwise, i.e., if it is determined that neither OnDurationTimer nor drx-InactivityTimer nor drx-RetransmissionTimerDL nor drx-RetransmissionTimerUL nor ra-ContentionResolutionTimer is running at operation 2120, and SR is not transmitted on PUCCH or is not pending at operation 2130, and the PDCCH indicating the new transmission addressed to the C-RNTI of the MAC entity has not been received after successful reception of the RAR for CF RA at operation 2140, and the Bfr-Response Window is not running at operation 2160, the UE need not monitor PDCCH at operation 2170.

In another embodiment of the disclosure, active time also includes the time duration while ra-ResponseWindow or bfr-Response Window is running.

If DRX is configured and bfr-Response Window is running, UE shall perform the operations (described earlier) defined for active time. If the contention free Random Access Preamble for beam failure recovery request was transmitted by the MAC entity, start the bfr-ResponseWindow at the start of the first PDCCH occasion after a fixed duration of X symbols from the end of the preamble transmission and monitor the PDCCH of the SpCell for response to beam failure recovery request identified by the C-RNTI while bfr-ResponseWindow is running, regardless of DRX configuration.

Figure 22:
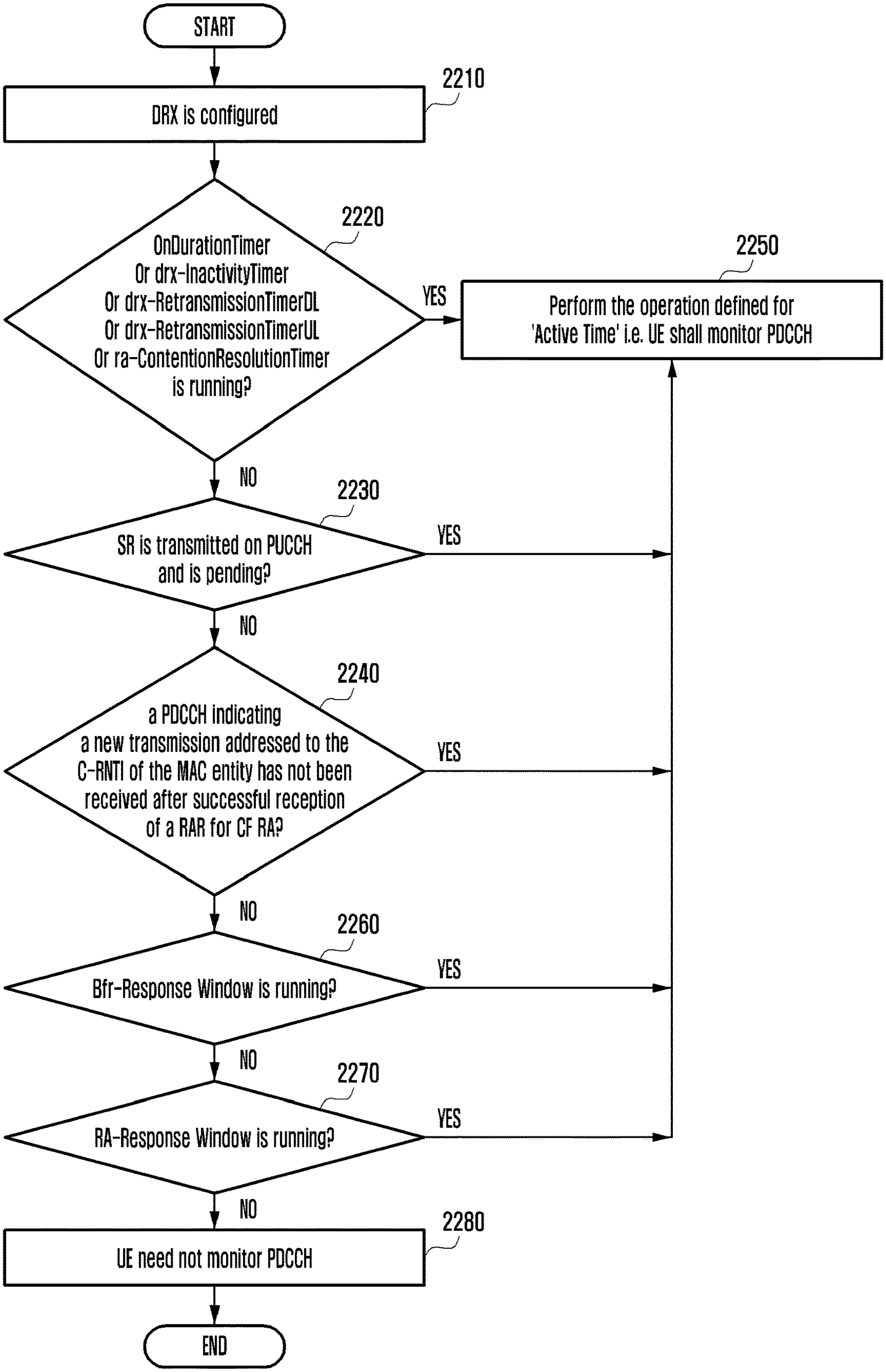
FIG. 22 shows the UE operation when DRX is configured according to another embodiment of the disclosure.

If DRX is configured and ra-ResponseWindow is running, UE shall perform the operations (described earlier) defined for active time. Once the Random Access Preamble is transmitted and regardless of the possible occurrence of a measurement gap or DRX configuration, the MAC entity shall: monitor the PDCCH of the SpCell for Random Access Response(s) identified by the RA-RNTI(s) while ra-ResponseWindow is running;

FIG. 22 shows the UE operation when DRX is configured according to another embodiment of the disclosure.

Referring to FIG. 22, if DRX is configured at operation 2210, the UE determines whether OnDurationTimer or drx-InactivityTimer or drx-RetransmissionTimerDL or drx-RetransmissionTimerUL or ra-ContentionResolutionTimer is running at operation 2220; or whether SR is transmitted on PUCCH and is pending at operation 2230; or whether a PDCCH indicating a new transmission addressed to the C-RNTI of the MAC entity has not been received after successful reception of a RAR for CF RA at operation 2240. If it is determined that OnDurationTimer or drx-InactivityTimer or drx-RetransmissionTimerDL or drx-RetransmissionTimerUL or ra-ContentionResolutionTimer is running at operation 2220, or that SR is transmitted on PUCCH and is pending at operation 2230, or that the PDCCH indicating the new transmission addressed to the C-RNTI of the MAC entity has not been received after successful reception of the RAR for CF RA at operation 2240, the UE performs the operation defined for 'Active Time,' i.e., the UE shall monitor PDCCH at operation 2250.

In addition, the UE determines whether Bfr-Response Window is running at operation 2260; or whether RA-Response Window is running at operation 2270. If it is determined that the Bfr-Response Window is running at operation 2160, or that the RA-Response Window is running at operation 2270, the UE performs the operation defined for 'Active Time,' i.e., the UE shall monitor PDCCH at operation 2250.

Otherwise, i.e., if it is determined that neither OnDurationTimer nor drx-InactivityTimer nor drx-RetransmissionTimerDL nor drx-RetransmissionTimerUL nor ra-ContentionResolutionTimer is running at operation 2220, and SR is not transmitted on PUCCH or is not pending at operation 2230, and the PDCCH indicating the new transmission addressed to the C-RNTI of the MAC entity has not been received after successful reception of the RAR for CF RA at operation 2240, and the Bfr-Response Window is not running at operation 2260, and the RA-Response Window is not running at operation 2270, the UE need not monitor PDCCH at operation 2280.

In another embodiment of the disclosure active time also includes the time duration while beam recovery timer is running. If DRX is configured and beam recovery timer is running, UE shall perform the operations (described earlier) defined for active time.

Figure 23:
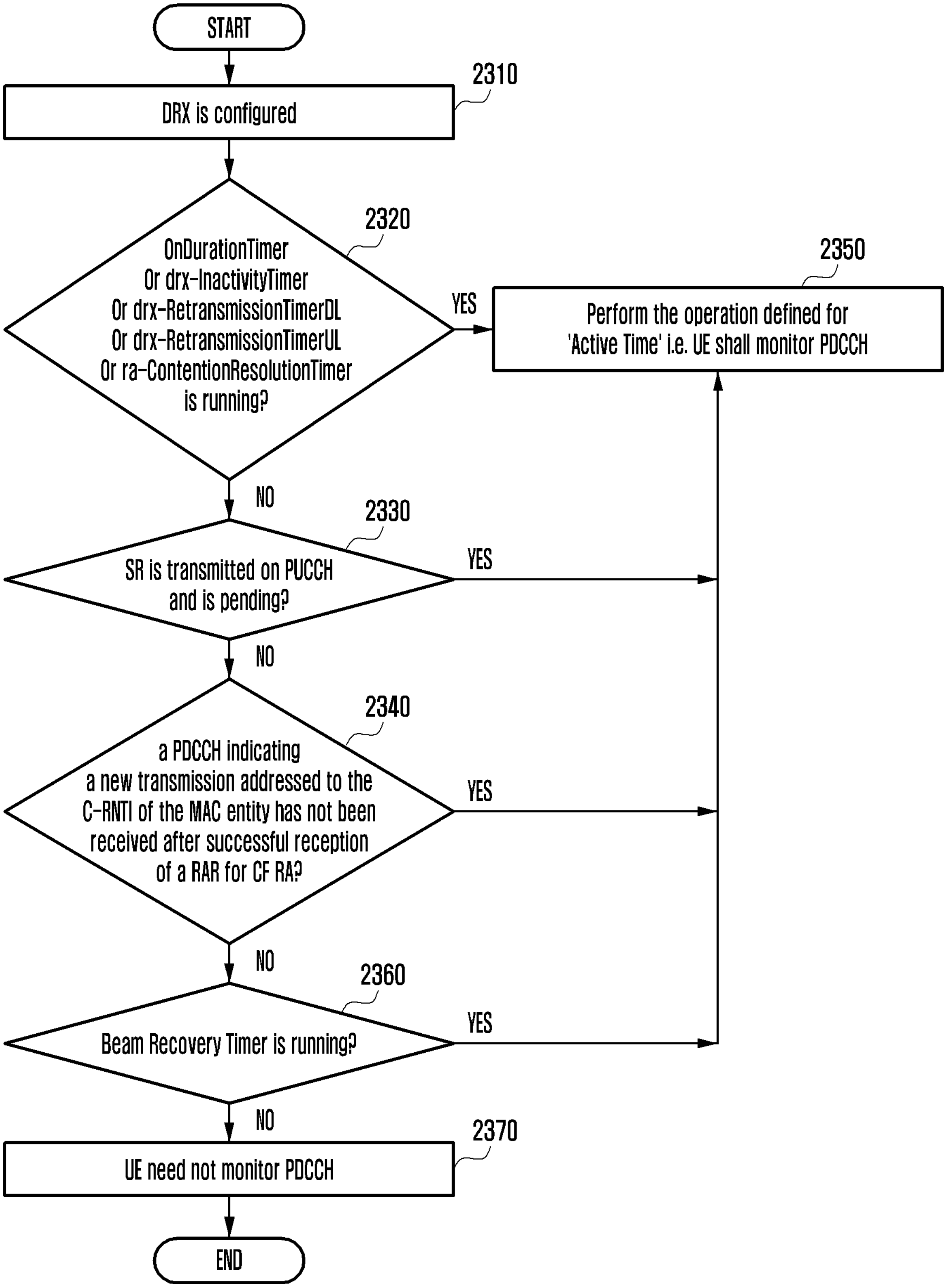
FIG. 23 shows the UE operation when DRX is configured according to another embodiment of the disclosure.

FIG. 23 shows the UE operation when DRX is configured according to another embodiment of the disclosure.

Referring to FIG. 23, if DRX is configured at operation 2310, the UE determines whether OnDurationTimer or drx-InactivityTimer or drx-RetransmissionTimerDL or drx-RetransmissionTimerUL or ra-ContentionResolutionTimer is running at operation 2320; or whether SR is transmitted on PUCCH and is pending at operation 2330; or whether a PDCCH indicating a new transmission addressed to the C-RNTI of the MAC entity has not been received after successful reception of a RAR for CF RA at operation 2340. If it is determined that OnDurationTimer or drx-InactivityTimer or drx-RetransmissionTimerDL or drx-RetransmissionTimerUL or ra-ContentionResolutionTimer is running at operation 2320, or that SR is transmitted on PUCCH and is pending at operation 2330, or that the PDCCH indicating the new transmission addressed to the C-RNTI of the MAC entity has not been received after successful reception of the RAR for CF RA at operation 2340, the UE performs the operation defined for 'Active Time,' i.e., the UE shall monitor PDCCH at operation 2350.

In addition, the UE determines whether Beam Recovery Timer is running at operation 2360. If it is determined that the Beam Recovery Timer is running at operation 2360, the UE performs the operation defined for 'Active Time,' i.e., the UE shall monitor PDCCH at operation 2350.

Otherwise, i.e., if it is determined that neither OnDurationTimer nor drx-InactivityTimer nor drx-RetransmissionTimerDL nor drx-RetransmissionTimerUL nor ra-ContentionResolutionTimer is running at operation 2320, and SR is not transmitted on PUCCH or is not pending at operation 2330, and the PDCCH indicating the new transmission addressed to the C-RNTI of the MAC entity has not been received after successful reception of the RAR for CF RA at operation 2340, and the Beam Recovery Timer is not running at operation 2360, the UE need not monitor PDCCH at operation 2370.

In another embodiment of the disclosure active time also includes the time duration while random access procedure initiated for beam failure recovery is ongoing. If DRX is configured and beam failure recovery procedure is ongoing, UE shall perform the operations (described earlier) defined for active time.

Figure 24:
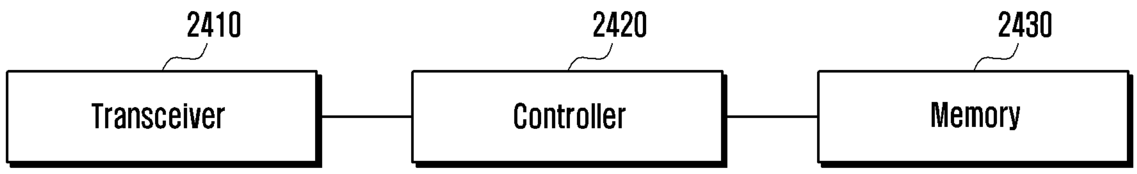
FIG. 24 is a block diagram of a terminal according to an embodiment of the disclosure.

FIG. 24 is a block diagram of a terminal according to an embodiment of the disclosure.

Referring to FIG. 24, the terminal includes a transceiver 2410, a controller 2420 and a memory 2430. The transceiver

2410, the controller 2420 and the memory 2430 are configured to perform the operations of the UE illustrated in the figures, e.g., FIGS. 1 to 23 (specifically, FIG. 2A, 4A, 6A, 12A, or 16A), or described above. Although the transceiver 2410, the controller 2420 and the memory 2430 are shown as separate entities, they may be realized as a single entity like a single chip. Or, the transceiver 2410, the controller 2420 and the memory 2430 may be electrically connected to or coupled with each other.

The transceiver 2410 may transmit and receive signals to and from other network entities, e.g., a base station.

The controller 2420 may control the UE to perform functions according to one of the embodiments described above.

Specifically, the controller 2420 may be configured to control the transceiver 2410 to receive first configuration information on a SpCell and second configuration information on a SCell from a base station. The controller 2420 may be configured to detect beam failure on at least one of the SpCell or the SCell. The controller 2420 may be configured to select a PRACH preamble and a PRACH occasion configured for beam failure recovery request transmission on the SCell based on the second configuration information if the beam failure on the SCell is detected, and to control the transceiver 2410 to transmit the selected PRACH preamble over the selected PRACH occasion to the base station. In addition, the controller 2420 may be configured to select a SS block or a CSI RS of the SCell with a signal quality greater than a preconfigured threshold, wherein the PRACH preamble is selected among PRACH preambles corresponding to the SS block or the CSI RS. In an embodiment based on Method 2, the controller 2420 may be configured to monitor PDCCH of the SpCell addressed to C-RNTI, wherein the PDCCH indicates downlink or uplink assignment for the SCell. In another embodiment based on Method 3, the controller 2420 may be configured to monitor MAC CE including an index of the SCell. In another embodiment based on Method 7, the first configuration information is used to configure PRACH preambles and PRACH occasions on the SpCell for the SpCell, and the second configuration information is used to configure PRACH preambles and PRACH occasions on the SpCell for the SCell.

In addition, the controller 2420 may be configured to control the transceiver 2410 to transmit a beam failure recovery request to the base station, to determine active time including a time duration to monitor a beam failure recovery response on a control channel in response to the beam failure recovery request, and to monitor the control channel based on the terminal being in the active time. In an embodiment, the active time may include the time duration while a beam failure recovery response window is running. The beam failure recovery response window may start at a pre-define number of symbols from end of transmission for the beam failure recovery request. In another embodiment, the active time may include the time duration while a random access response window or a beam failure recovery timer is running. The random access response window may refer to the time window to monitor RA response(s) for the beam failure recovery (using contention-free Random Access Preamble). The beam failure recovery timer may refer to a timer for the beam failure recovery procedure, which may start if beam failure instance indication has been received from lower layers and stop if a random access procedure for a beam failure recovery is successfully completed.

The controller 2420 may refer to a circuitry, an ASIC, or at least one processor.

In an embodiment, the operations of the terminal may be implemented using the memory 2430 storing corresponding program codes. Specifically, the terminal may be equipped with the memory 2430 to store program codes implementing desired operations. To perform the desired operations, the controller 2420 may read and execute the program codes stored in the memory 2430 by using a processor or a central processing unit (CPU).

Figure 25:
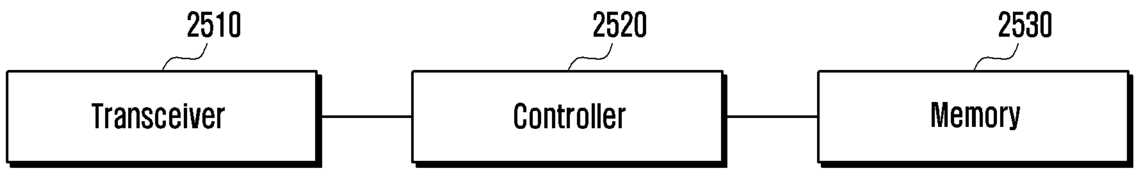
FIG. 25 is a block diagram of a base station according to an embodiment of the disclosure.

FIG. 25 is a block diagram of a base station according to an embodiment of the disclosure.

Referring to FIG. 25, a base station includes a transceiver 2510, a controller 2520 and a memory 2530. The transceiver 2510, the controller 2520 and the memory 2530 are configured to perform the operations of the network (e.g., gNB) illustrated in the figures, e.g., FIGS. 1 to 23 (specifically, FIG. 2B, 4B, 6B, 12B, or 16B), or described above. Although the transceiver 2510, the controller 2520 and the memory 2530 are shown as separate entities, they may be realized as a single entity like a single chip. The transceiver 2510, the controller 2520 and the memory 2530 may be electrically connected to or coupled with each other.

The transceiver 2510 may transmit and receive signals to and from other network entities, e.g., a terminal.

The controller 2520 may control the base station to perform functions according to one of the embodiments described above. Specifically, the controller 2520 may be configured to assign PRACH preambles and PRACH occasions for beam failure recovery request for a SpCell and a SCell to the terminal, to control the transceiver 2510 to receive a PRACH preamble for the beam failure recovery request over a PRACH occasion from the terminal. The controller 2520 may be configured to identify a cell in which the beam failure recovery request is received based on the PRACH preamble and the PRACH occasion in which the beam failure recovery request is received, and the PRACH preambles and the PRACH occasions assigned to the terminal. The controller 2520 may be configured to control the transceiver 2510 to transmit a beam failure recovery request response to the terminal based on the identification of the cell. In an embodiment based on Method 2, the controller 2510 may be configured to control the transceiver to transmit the beam failure recovery request response based on PDCCH of the SpCell addressed to C-RNTI if the beam failure recovery request is identified for beam failure recovery on the SCell. The PDCCH may indicate downlink or uplink assignment for the SCell. In another embodiment based on Method 3, the controller 2510 may be configured to control the transceiver to transmit the beam failure recovery request response based on MAC CE including an index of the SCell if the beam failure recovery request is identified for beam failure recovery on the SCell. In another embodiment, the PRACH preambles and the PRACH occasions on the SpCell may be assigned for the beam failure recovery request for the SCell.

The controller 2520 may refer to a circuitry, an ASIC, or at least one processor.

In an embodiment, the operations of the base station may be implemented using the memory 2530 storing corresponding program codes. Specifically, the base station may be equipped with the memory 2530 to store program codes implementing desired operations. To perform the desired operations, the controller 2520 may read and execute the program codes stored in the memory 2530 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a terminal in a wireless communication system, the method comprising:
detecting a beam failure on a serving cell, the serving cell is a secondary cell (SCell);
if an uplink grant is not available for transmitting a media access control (MAC) control element (CE) for a beam failure recovery, transmitting, to a base station, a random access preamble for the beam failure recovery on a special cell (SpCell);
receiving, from the base station, a random access response comprising an uplink grant in response to the random access preamble for the beam failure recovery; and
transmitting, to the base station, the MAC CE for the beam failure recovery,
wherein the MAC CE for the beam failure recovery includes information on indicating that the beam failure is detected on the SCell with an index i.

2. The method of claim 1, wherein the MAC CE for the beam failure recovery comprises information on a synchronization signal block (SSB) or a channel status information reference signal (CSI-RS) with a reference signal received power (RSRP) above a threshold.

3. The method of claim 2,
wherein the MAC CE for the beam failure recovery is identified by a logical channel identifier (LCID) in a MAC subheader.

4. The method of claim 1, further comprising:
if the uplink grant is available, transmitting, to the base station, the MAC CE for the beam failure recovery.

5. The method of claim 1, wherein the random access response is identified by a random access RNTI (RA-RNTI).

6. A method performed by a base station in a wireless communication system, the method comprising:
transmitting, to a terminal, information on a maximum number for beam failure detection;
receiving, from the terminal, random access preamble for a beam failure recovery on a special cell (SpCell);
transmitting, to the terminal, a random access response comprising an uplink grant in response to the random access preamble for the beam failure recovery; and
receiving, from the terminal, a media access control (MAC) control element (CE) for the beam failure recovery,
wherein the MAC CE for the beam failure recovery includes information on indicating that the beam failure is detected on a secondary cell (SCell) with an index i.

7. The method of claim 6, wherein the MAC CE for the beam failure recovery comprises information on a synchronization signal block (SSB) or a channel status information reference signal (CSI-RS) with a reference signal received power (RSRP) above a threshold.

8. The method of claim 7,
wherein the MAC CE for the beam failure recovery is identified by a logical channel identifier (LCID) in a MAC subheader.

9. The method of claim 6, further comprising:
in case that a serving cell is the SCell and the uplink grant is available, receiving, from the terminal, the MAC CE for the beam failure recovery.

10. The method of claim 6, wherein the random access response is identified by a random access RNTI (RA-RNTI).

11. A terminal in a wireless communication system, the terminal comprising:
a transceiver; and
a controller coupled with the transceiver and configured to:
detect a beam failure on a serving cell, the serving cell is a secondary cell (SCell),
if an uplink grant is not available for transmitting a media access control (MAC) control element (CE) for a beam failure recovery, transmit, to a base station, a random access preamble for the beam failure recovery on a special cell (SpCell),
receive, from the base station, a random access response comprising an uplink grant in response to the random access preamble for the beam failure recovery, and
transmit, to the base station the MAC CE for the beam failure recovery,
wherein the MAC CE for the beam failure recovery includes information on indicating that the beam failure is detected on the SCell with an index i.

12. The terminal of claim 11, wherein the MAC CE for the beam failure recovery comprises information on a synchronization signal block (SSB) or a channel status information reference signal (CSI-RS) with a reference signal received power (RSRP) above a threshold.

13. The terminal of claim 12,
wherein the MAC CE for the beam failure recovery is identified by a logical channel identifier (LCID) in a MAC subheader.

14. The terminal of claim 11, wherein the controller is further configured to:
if the uplink grant is available, transmit, to the base station via the transceiver, the MAC CE for the beam failure recovery.

15. The terminal of claim 11, wherein the random access response is identified by a random access RNTI (RA-RNTI).

16. A base station in a wireless communication system, the base station comprising:
a transceiver; and
a controller coupled with the transceiver and configured to:
transmit, to a terminal, information on a maximum number for beam failure detection,
receive, from the terminal, random access preamble for a beam failure recovery on a special cell (SpCell),
transmit, to the terminal, a random access response comprising an uplink grant in response to the random access preamble for the beam failure recovery, and
receive, from the terminal, a media access control (MAC) control element (CE) for the beam failure recovery,
wherein the MAC CE for the beam failure recovery includes information on indicating that the beam failure is detected on a secondary cell (SCell) with an index i.

17. The base station of claim 16, wherein the MAC CE for the beam failure recovery comprises information on a synchronization signal block (SSB) or a channel status information reference signal (CSI-RS) with a reference signal received power (RSRP) above a threshold.

18. The base station of claim 17,
wherein the MAC CE for the beam failure recovery is identified by a logical channel identifier (LCID) in a MAC subheader.

19. The base station of claim 16, further comprising:

in case that a serving cell is the SCell and the uplink grant is available, receiving, from the terminal via the transceiver, the MAC CE for the beam failure recovery.

20. The base station of claim 16, wherein the random access response is identified by a random access RNTI (RA-RNTI).

* * * * *